US 7,746,361 B2

(12) United States Patent  (10) Patent No.: US 7,746,361 B2
Cao  (45) Date of Patent: Jun. 29, 2010

(54) METHOD OF REALISING A BOUNDARY OF A ROTATED OBJECT

(75) Inventor: Cuong Hung Robert Cao, Panania (AU)

(73) Assignee: Canon Kabushiki Kaisha, Tokyo (JP)

( * ) Notice: Subject to any disclaimer, the term of this patent is extended or adjusted under 35 U.S.C. 154(b) by 1203 days.

(21) Appl. No.: 11/201,177

(22) Filed: Aug. 11, 2005

(65) Prior Publication Data

US 2006/0038835 A1    Feb. 23, 2006

(30) Foreign Application Priority Data

Aug. 19, 2004   (AU) ............................... 2004904745

(51) Int. Cl.
*G09G 5/00*    (2006.01)
(52) U.S. Cl. .................. 345/649; 345/655; 345/658
(58) Field of Classification Search .............. 345/649, 345/655
See application file for complete search history.

(56) References Cited

U.S. PATENT DOCUMENTS

| 4,815,009 | A | * | 3/1989 | Blatin | .......................... 345/441 |
| 5,271,093 | A | * | 12/1993 | Hata et al. | .................... 345/420 |
| 5,283,557 | A | * | 2/1994 | Memarzadeh | ............... 345/698 |
| 5,325,474 | A | | 6/1994 | Kumazaki et al. | ........... 395/133 |
| 5,471,550 | A | * | 11/1995 | Kurachi | ....................... 382/200 |
| 5,815,596 | A | * | 9/1998 | Ahuja et al. | ................. 382/173 |
| 5,835,095 | A | * | 11/1998 | Smith et al. | ................... 345/421 |
| 5,920,688 | A | * | 7/1999 | Cooper et al. | ............... 345/650 |
| 6,567,182 | B1 | | 5/2003 | Kumar et al. | ............... 358/1.15 |
| 2001/0055024 | A1 | * | 12/2001 | Funakubo et al. | ........... 345/589 |

FOREIGN PATENT DOCUMENTS

AU           199947508 B2      3/2000

* cited by examiner

*Primary Examiner*—Xiao M Wu
*Assistant Examiner*—Maurice McDowell, Jr.
(74) *Attorney, Agent, or Firm*—Fitzpatrick, Cella, Harper & Scinto

(57) ABSTRACT

A method is described for determining a discrete boundary for an object to be rendered into a raster pixel image having a plurality of scanlines. In the method, the object is rotated by an integer multiple of 90 degrees, and an outline of the rotated object is decomposed into line segments. For each scanline to be rendered, points of intersection between the line segments and the scanline are determined, and each point of intersection is rounded to an adjacent position selected from a finite set of positions on the scanline using a rule chosen according to the amount of rotation. The rounded points of intersection delimiting the discrete boundary. If the object is rotated by odd multiple of 90 degrees the method includes the steps of identifying points of intersection that satisfy a predetermined criterion; and shifting the identified points of intersection prior to rounding.

21 Claims, 34 Drawing Sheets

METHOD OF REALISING A BOUNDARY OF A ROTATED OBJECT

CROSS-REFERENCE TO RELATED PATENT APPLICATIONS

This application claims the right of priority under 35 U.S.C. §119 based on Australian Patent Application No 2004904745, filed 19 Aug. 2004, which is incorporated by reference herein in its entirety as if fully set forth herein.

FIELD OF INVENTION

The present invention relates to electronic image generation and, in particular, relates to accurately and efficiently realizing a boundary for a rotated object.

BACKGROUND

Traditionally, software applications such as word processors create page-based documents where each page contains graphic objects such as text, lines, fill regions and image data. When representing the document data on a display device or a printing device, such software applications typically send commands defined in terms of the graphics interface services of a native operating system within which the software application operates.

One such operating system is Microsoft Windows™, which has graphics interface services typically known as the graphics device interface (GDI) layer. The GDI layer is generally an application programming interface (API) providing a rich set of graphics features to all applications. Typically, a graphics rendering system renders the graphics objects received from the GDI layer, generating pixels which are then sent to a target device for storage, display, or printing. Rendering is the process by which the graphics objects received from the GDI layer are converted to pixels by the graphics rendering system.

The graphics rendering system may, at times, be requested to render a page at 90, 180, or 270 degrees rotation, as illustrated in FIGS. 3A to 3D.

There are various reasons why a page may be rotated from the original data. A printer may be limited regarding the orientation of a printed page. If a printer is only capable of printing an A4 portrait page, then a page created in A4 landscape needs to be rotated before the page can be printed. Also, a user may request a specific page rotation based on his/her requirements. Typically, modern day printer drivers allow a user to create output formats for special purposes. Such formats include birthday cards, n-up pages (multiple pages scaled to fit on the one page), double-sided pages, letters, cards and even books.

For example, FIG. 4A shows a rendering 400 of the page 300 of FIG. 3A using 4 pages per sheet, two of the renderings (marked page 2 and page 3) being rotated by 180 degrees. Page 400 may be folded in half along Fold 1 401 and then folded again along Fold 2 402 to form a "card" that has four upright renderings on it. The resulting card can be seen in FIGS. 4B and 4C.

In such cases, original data passed by the GDI layer needs to be transformed by the graphics rendering system and then rendered according to the specific format requested by the user. Often such formats require page data to be rotated at a specific angle to produce the final output.

To rotate a page containing graphics objects, each object on a page is rotated by a specified angle. The page boundary may also be rotated depending on the final output requirement.

FIGS. 3B, 3C and 3D show renderings of the example page 300 of FIG. 3A, rotated 90, 180 and 270 degrees respectively. It may not always be necessary to rotate a page. For example, there is no use in rotating FIG. 3A to produce FIG. 3C when printing. However, such inversion may be useful when rendering the page 300 to a screen. There are also circumstances where the objects on the page are to be rotated but the page itself is not. An example of this is shown in FIG. 3E, where the page boundary is the same as that of page 300, but the data is printed 2-up with each of the two renderings rotated by 90 degrees.

An object boundary is typically described by a path made up of a number of points. Since this path is described as a continuous entity, using a defined point system, these continuous paths must be resolved into discrete pixel values at the rendering stage. Typically, paths are broken up and dealt with in monotonically increasing order. A variety of rules are available to resolve a continuous path into its equivalent discrete format. These rules are typically known as pixelization rules. A couple of well known pixelization rules are the GDI pixelization rule and the PostScript pixelization rule. The GDI pixelization rule uses the Grid Intersection Quantization rule in order to determine which pixels are activated by a path.

Representing a continuous signal, i.e. a path defined as a set of points, with a discrete approximation causes errors to be introduced in representing a final pixelized object. Typically, there are problems representing very small objects as the paths themselves are not discrete, but their final representation must be, so much of the original "signal" is lost in the digital conversion. Also, since pixelization rules typically do not take the rotation of an object into account, any shift or arbitration required to resolve a path into a pixel is typically not rotation invariant. That is, if a path is rendered at 90 degrees, and the same path is rendered at 180 degrees, then it is unlikely that the same set of pixels is turned on for each of the rendered paths.

Traditionally, there are a number of ways of accurately rendering an object to be rotated. The most basic method is to render the object with no rotation to produce pixel data and then to rotate the rendered pixel data. Since the original path has been quantized, the rotated version will be pixel accurate. However, this method requires large amounts of memory and CPU resources for a full page and is slow if done on an object-per-object basis.

Another method used to produce pixel-accurate rotations is to produce the pixedges of a path (pixedges are the edges of each pixel) and then rotate the pixedges. Since the pixedges define the exact boundary of the object to be rendered, the same pixels will be filled regardless of the rotation of the objects. This method is very cumbersome, since each edge defines a pixel boundary, and consequently the path data for the entire set of edges defining the boundary of an object may be huge. Compared with the original points of the path, the pixedge data uses more memory and typically takes more time to rotate. Rendering objects in such a manner is expensive in terms of CPU resources consumed.

An example is shown in FIGS. 5A-C. The object 500 shown in FIG. 5A has an object boundary 501 as shown in FIG. 5B. FIG. 5C shows a quantized path 502 derived from the boundary 501. The path 502 can be accurately rotated since it has been quantized. However, where the original path 501 only has 7 points, the quantized version 502 has 31 points. Clearly, rotating many such quantized objects would consume a large amount of CPU resources.

In some known graphic rendering systems, rendering is a two-stage process. In these rendering systems, graphics objects are first converted into an intermediate language before the rendering process begins. This intermediate form, containing all the converted graphic objects, is known as a display list. In one such system, the first stage of the process converts each graphic object received from the GDI layer into an intermediate edge-based object graphics format, such that all edges are sorted in ascending y-order, then ascending x-order. The x and y axes correspond respectively to the scan lines and pixel locations on such scan lines in a rasterized display. The output from the first stage is typically a display list of edges and their associated fill priority (z-order), along with other information such as whether an edge is a clipping edge or a filling edge. The output from the first stage is sometimes called a job. The job contains all the information needed by the second stage to render the page.

The second stage of the process involves a rendering module parsing the job and generating the pixels for the output device for each scanline down the page.

For renderers that use such a two-stage approach in which information is stored in an intermediate form, each object has to be converted to the intermediate form. However, it is often the case that not all the objects stored in the display list will actually be part of the rendered output. For example, the second stage of the rendering system may only be asked to render a specific part of a page, or the objects that are stored in the intermediate format may actually lie on and/or outside the bounds of the page. These cases represent a problem for edge-based renderers because the edges of the objects that lie outside the region to be rendered still need to be tracked. Such edges that lie outside the region to be rendered need to be tracked because they may enter the region to be rendered. Edges are typically tracked scanline by scanline, and thus tracking such objects can be time consuming and greatly slow the performance of the renderer.

There are a couple of methods used to deal with objects that do not lie within the region to be rendered. The first method is the simplest, and simply involves tracking the edges of all objects in the display list and only rendering pixel data when the edges are within the region to be rendered. Another method is to clip all objects to the current rendering boundary. This involves tracing a path in and out of the region to be rendered and clipping any part of the path that lies outside the region to be rendered. This task is not trivial and requires precious CPU resources to trace a path and determine the points that lie outside the area to be rendered. Furthermore, if another part of the page needs to be rendered, a new display list has to be constructed. Also, because an object boundary is represented by edges that typically use a fixed format to represent the edge position, accuracy problems can arise when clipping the boundary. For example, consider the line joining the two points, (0, −4) and (55¾, 56). This line crosses the x-axis at about 3.72. If this line is clipped to the x-axis and the accuracy of the points of the line is limited to ¹⁄₁₆, then 3.6875 would replace 3.72. Hence, accuracy has been lost in the clipping of the line. This loss in accuracy can lead to distortion of the final rendered output of an object.

Another problem with edge-based renderers lies in the speed of updating edges for the next scanline. This is because the x position of each edge needs to be updated to the next scanline according to the dx value of an edge. The updating of the edge also depends on the type of edge, further increasing the complexity of updating the edges. Typically, as each edge on a scanline is encountered, an edge update function is called. This function takes the current position of the edge, determines the real x position for the next scanline, and then determines the integer position for the next scanline. Typically, pages to be printed contain thousands of edges, and each of these edges must be updated by calling the update function for every scanline on which the edge is active. This represents a major part of the rendering time in a two-stage edge rendering system. Current methods used to update edges involve calling one update function that updates an edge according to its type. The problem with the approach is that every time an edge is updated the code must branch according to the edge type, which results in a slow method.

Another method of updating edges is to have a specific update function associated with each edge (using a function pointer). When an edge is to be updated the renderer can simply call the function according to the edge's function pointer. In this case the renderer only needs to set the function pointer once for each edge, and not every scanline, so the branching problems presented above are removed. However, each of these edge functions must be called whenever an edge is updated, so there are still large function call overheads, ultimately restricting the rendering speed.

It is an object of the present invention to overcome or at least ameliorate one or more aspects of the prior art.

SUMMARY OF THE INVENTION

According to a first aspect of the invention there is provided a method of determining a discrete boundary for an object to be rendered into a raster pixel image having a plurality of scanlines, the method comprising the steps of:

receiving the object for rendering;

rotating the object by a predetermined amount that is an integer multiple of 90 degrees;

decomposing an outline of the rotated object into line segments;

determining, for each scanline to be rendered, points of intersection between the line segments and the scanline; and rounding each point of intersection to an adjacent position selected from a finite set of positions on the scanline using a rule chosen according to the amount of rotation, the rounded points of intersection delimiting the discrete boundary.

According to a second aspect of the invention there is provided a method of determining a discrete boundary for an object to be rendered into a raster pixel image having a plurality of scanlines, the method comprising the steps of:

receiving the object for rendering;

rotating the object by a predetermined amount;

decomposing an outline of the rotated object into line segments, wherein each line segment has a start point and an end point;

shifting line segments that satisfy a predetermined criterion by a distance less than or equal to a value dependent on a difference between the end point and the start point of the line segment and on a precision with which the line segment is represented;

determining, for each scanline to be rendered, points of intersection between the line segments and the scanline; and rounding the points of intersection to an adjacent position selected from a finite set of positions on the scanline, the rounded points of intersection delimiting the discrete boundary.

According to a further aspect of the invention there is provided a method of determining a discrete boundary for an object to be rendered into a raster pixel image having a plurality of scanlines, the method comprising the steps of:

receiving the object for rendering;

rotating the object by a predetermined amount;

decomposing an outline of the rotated object into line segments;

determining, for each scanline to be rendered, points of intersection between the line segments and the scanline;

identifying points of intersection that lie on integer values along the scanline;

shifting the identified points of intersection if the identified points of intersection lie on line segments having a negative slope; and rounding each point of intersection to an adjacent integer position on the scanline, the rounded points of intersection delimiting the discrete boundary.

According to a further aspect of the invention there is provided an apparatus for determining a discrete boundary for an object to be rendered into a raster pixel image having a plurality of scanlines, the apparatus comprising:

means for receiving the object for rendering;

means for rotating the object by a predetermined amount that is an integer multiple of 90 degrees;

means for decomposing an outline of the rotated object into line segments;

means for determining, for each scanline to be rendered, points of intersection between the line segments and the scanline; and means for rounding each point of intersection to an adjacent position selected from a finite set of positions on the scanline using a rule chosen according to the amount of rotation, the rounded points of intersection delimiting the discrete boundary.

According to a further aspect of the invention there is provided an apparatus for determining a discrete boundary for an object to be rendered into a raster pixel image having a plurality of scanlines, the apparatus comprising:

means for receiving the object for rendering;

means for rotating the object by a predetermined amount;

means for decomposing an outline of the rotated object into line segments, wherein each line segment has a start point and an end point;

means for shifting line segments having a negative slope, wherein the line segment is shifted by a distance less than or equal to a value dependent on a difference between the end point and the start point of the line segment and on a precision with which the line segment is represented;

means for determining, for each scanline to be rendered, points of intersection between the line segments and the scanline; and means for rounding the points of intersection to an adjacent position selected from a finite set of positions on the scanline, the rounded points of intersection delimiting the discrete boundary.

According to a further aspect of the invention there is provided an apparatus for determining a discrete boundary for an object to be rendered into a raster pixel image having a plurality of scanlines, the apparatus comprising:

means for receiving the object for rendering;

means for rotating the object by a predetermined amount;

means for decomposing an outline of the rotated object into line segments;

means for determining, for each scanline to be rendered, points of intersection between the line segments and the scanline;

means for identifying points of intersection that lie on integer values along the scanline;

means for shifting the identified points of intersection if the identified points of intersection lie on line segments having a negative slope; and means for rounding each point of intersection to an adjacent integer position on the scanline, the rounded points of intersection delimiting the discrete boundary.

According to a further aspect of the invention there is provided a computer program product comprising machine-readable program code recorded on a machine-readable recording medium, for controlling the operation of a data processing apparatus on which the program code executes to perform a method of determining a discrete boundary for an object to be rendered into a raster pixel image having a plurality of scanlines, the method comprising the steps of:

receiving the object for rendering;

rotating the object by a predetermined amount that is an integer multiple of 90 degrees;

decomposing an outline of the rotated object into line segments;

determining, for each scanline to be rendered, points of intersection between the line segments and the scanline; and rounding each point of intersection to an adjacent position selected from a finite set of positions on the scanline using a rule chosen according to the amount of rotation, the rounded points of intersection delimiting the discrete boundary.

According to a further aspect of the invention there is provided a computer program product comprising machine-readable program code recorded on a machine-readable recording medium, for controlling the operation of a data processing apparatus on which the program code executes to perform a method of determining a discrete boundary for an object to be rendered into a raster pixel image having a plurality of scanlines, the method comprising the steps of:

receiving the object for rendering;

rotating the object by a predetermined amount;

decomposing an outline of the rotated object into line segments, wherein each line segment has a start point and an end point;

shifting line segments that satisfy a predetermined criterion by a distance less than or equal to a value dependent on a difference between the end point and the start point of the line segment and on a precision with which the line segment is represented; and determining, for each scanline to be rendered, points of intersection between the line segments and the scanline; and rounding the points of intersection to an adjacent position selected from a finite set of positions on the scanline, the rounded points of intersection delimiting the discrete boundary.

According to a further aspect of the invention there is provided a computer program product comprising machine-readable program code recorded on a machine-readable recording medium, for controlling the operation of a data processing apparatus on which the program code executes to perform a method of determining a discrete boundary for an object to be rendered into a raster pixel image having a plurality of scanlines, the method comprising the steps of:

receiving the object for rendering;

rotating the object by a predetermined amount;

decomposing an outline of the rotated object into line segments;

determining, for each scanline to be rendered, points of intersection between the line segments and the scanline;

identifying points of intersection that lie on integer values along the scanline;

shifting the identified points of intersection if the identified points of intersection lie on line segments having a negative slope; and rounding each point of intersection to an adjacent integer position on the scanline, the rounded points of intersection delimiting the discrete boundary.

According to a further aspect of the invention there is provided a system for determining a discrete boundary for an object to be rendered into a raster pixel image having a plurality of scanlines, the system comprising:

data storage that stores information about the object, the information having a predetermined precision; and a processor in communication with said data storage and programmed to:

rotate the object by a predetermined amount that is an integer multiple of 90 degrees;

decompose an outline of the rotated object into line segments having a start point and an end point and being represented at the predetermined precision;

shifting line segments that satisfy a predetermined criterion by a distance less than or equal to a value dependent on a difference between the end point and the start point of the line segment and on the predetermined precision; and determine, for each scanline to be rendered, points of intersection between the line segments and the scanline, wherein the points of intersection are rounded to an adjacent position selected from a finite set of positions on the scanline using a rule chosen according to the amount of rotation, the rounded points of intersection delimiting the discrete boundary.

BRIEF DESCRIPTION OF THE DRAWINGS

One or more embodiments of the present invention will now be described with reference to the drawings, in which.

BRIEF DESCRIPTION OF THE TABLES

Figure 13A:
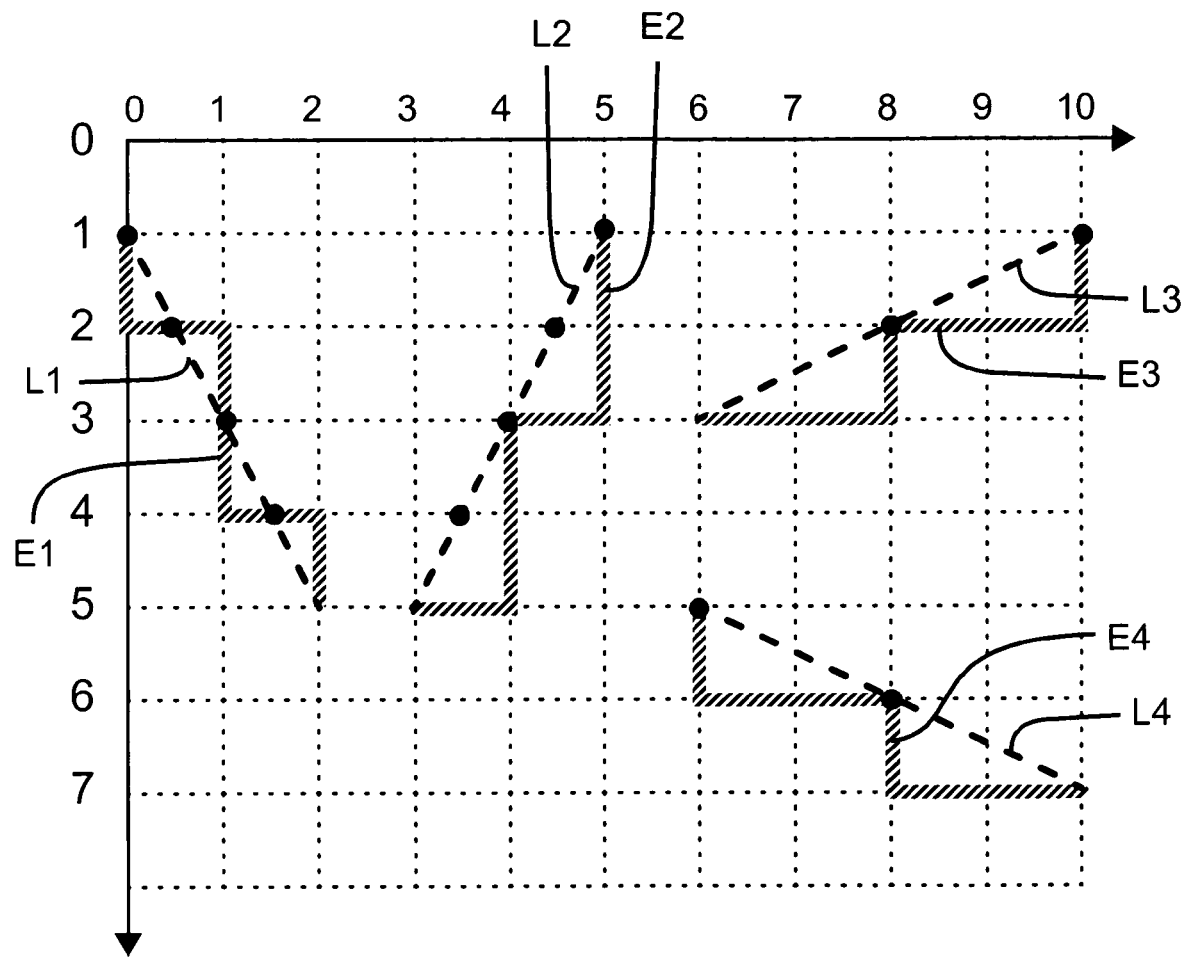
FIG. 13A shows an example of four line segments and the resulting pixedges produced after applying the GDI pixelization rules.
Figure 14A:
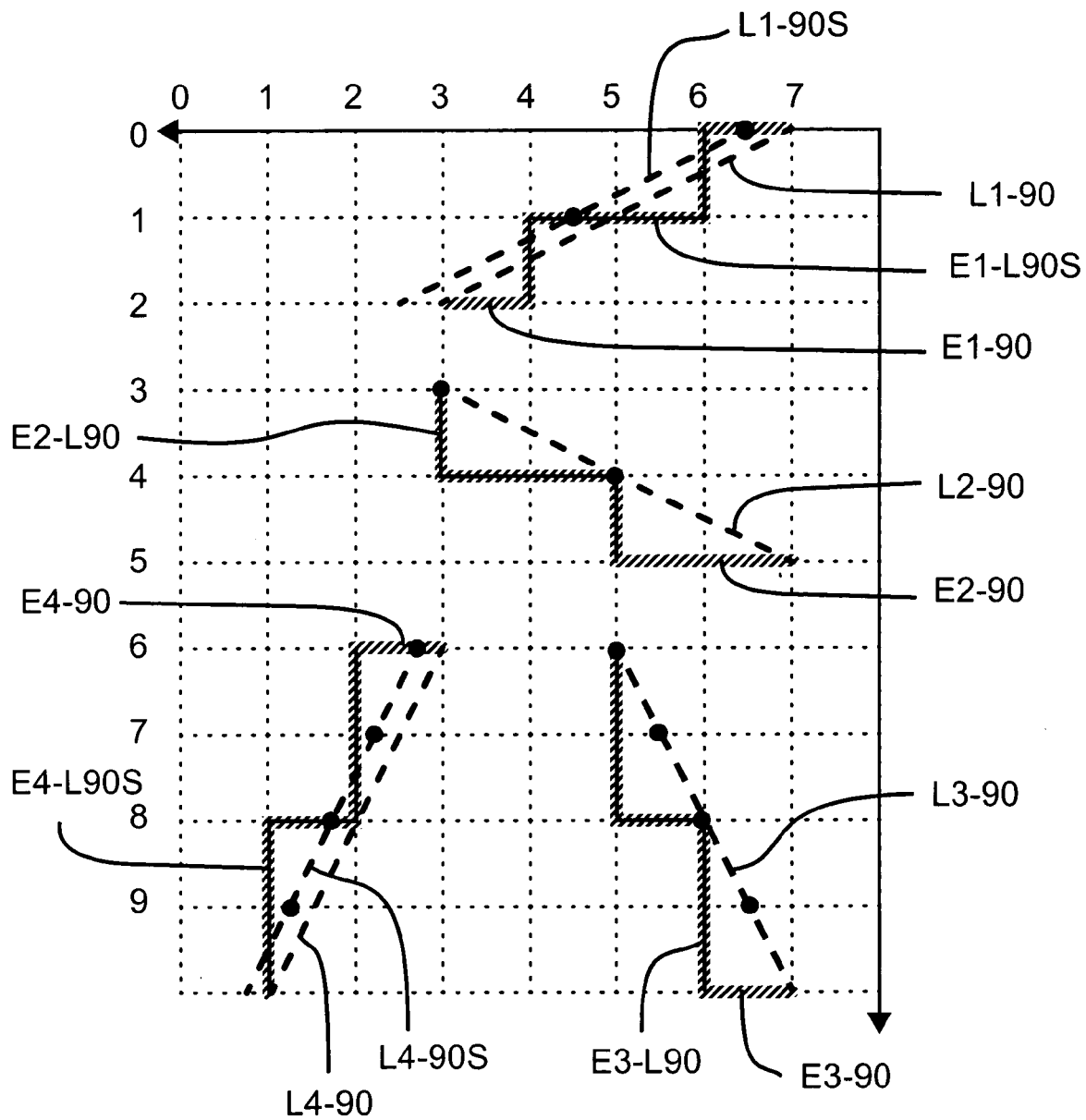
FIG. 14A shows the pixedges that result from applying the methods of the present disclosure to the four line segments shown in FIG. 13A after the line segments have been rotated by 90 degrees.
Figure 14B:
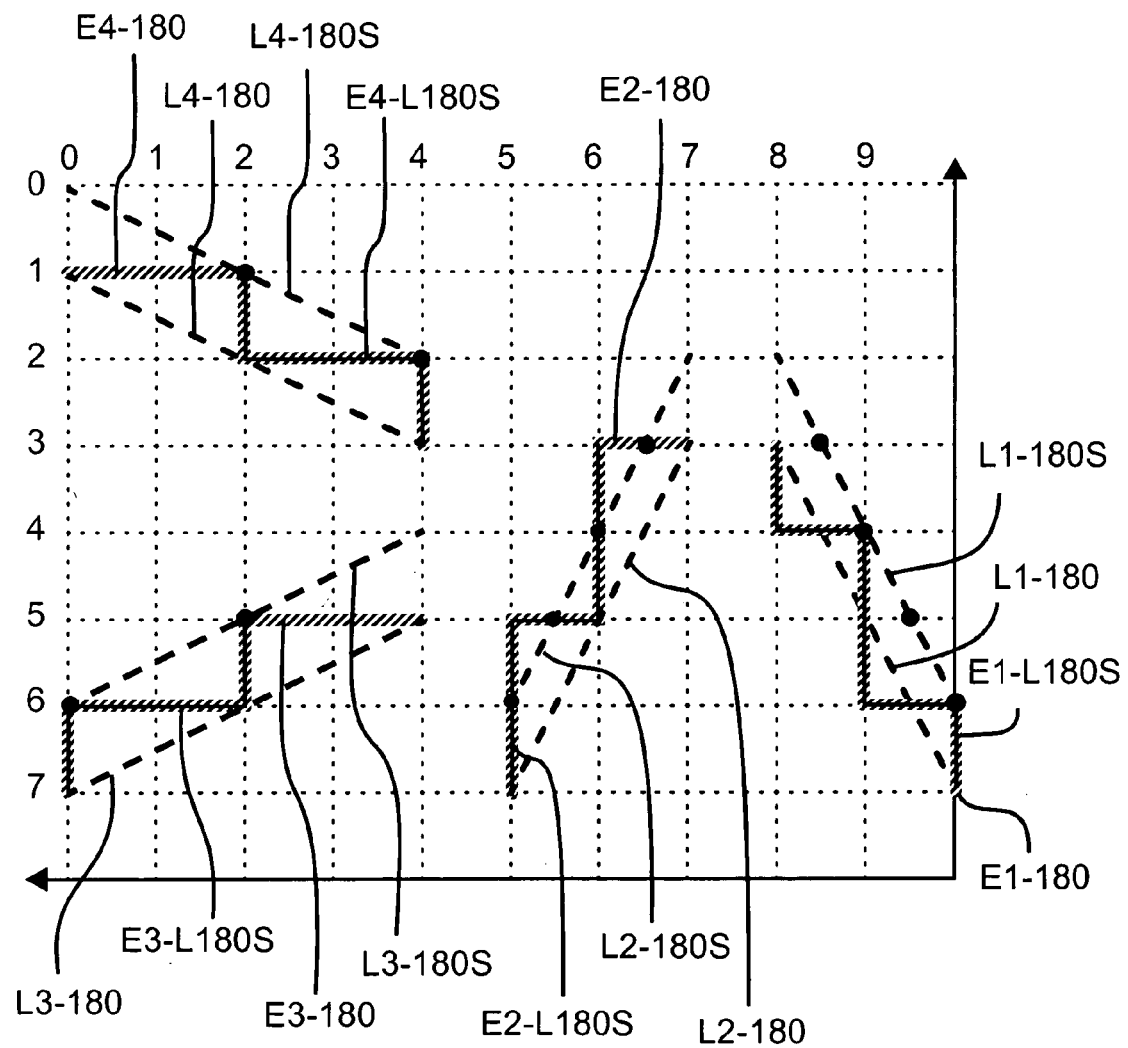
FIG. 14B shows the pixedges that result from applying the method of the present disclosure to the four line segments shown in FIG. 13A after the line segments have been rotated by 180 degrees.
Figure 14C:
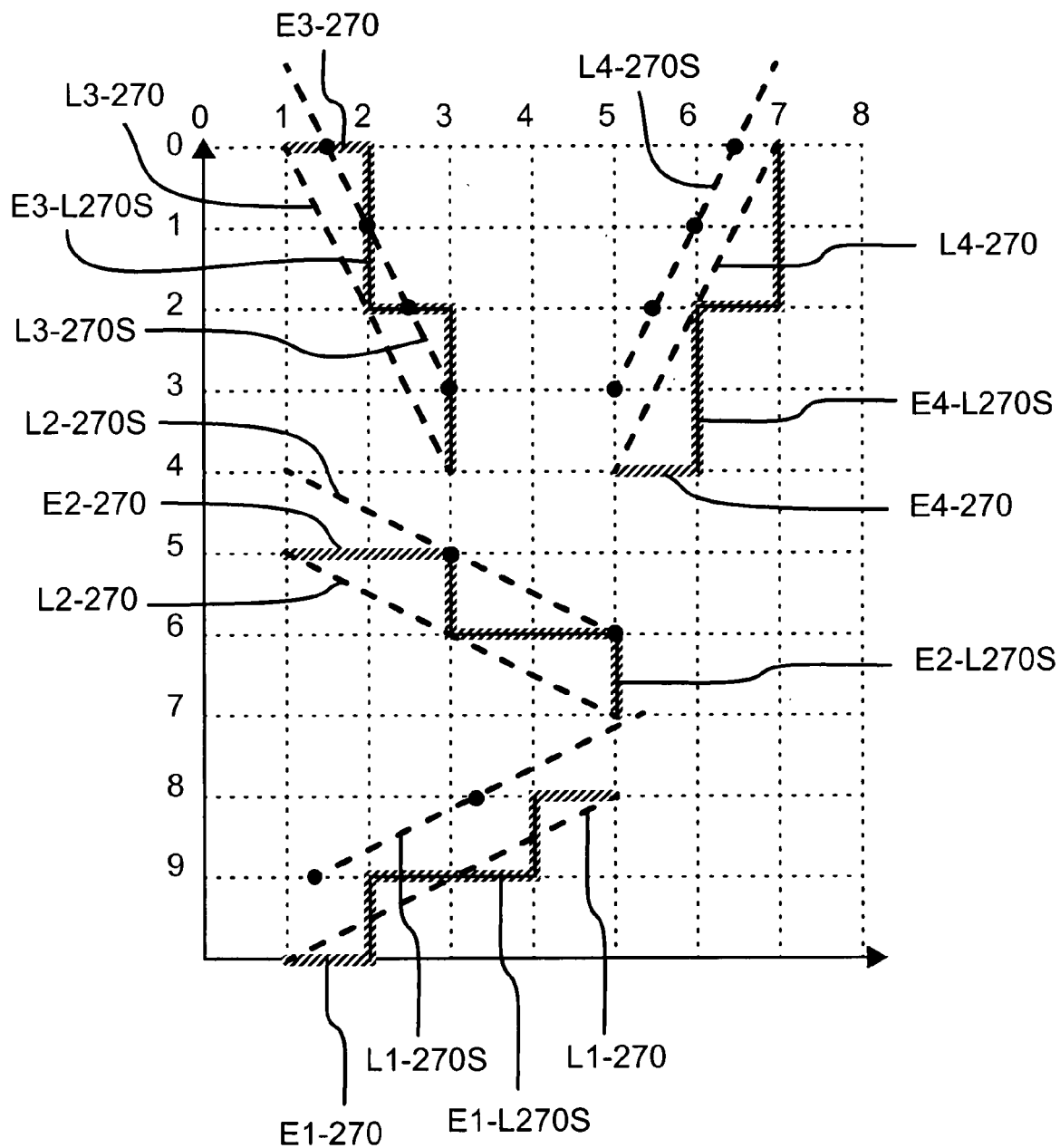
FIG. 14C shows the pixedges that result from applying the method of the present disclosure to the four line segments shown in FIG. 13A after the line segments have been rotated by 270 degrees.

The embodiments of the present invention are also described with reference to the tables listed at the end of the detailed description and before the claims, in which:

Table 1 illustrates the application of the rounding rules of the present disclosure to the line segments shown in FIG. 13A;

Table 2 illustrates the application of the rounding rules of the present disclosure to the line segments shown in FIG. 14A;

Table 3 illustrates the application of the rounding rules of the present disclosure to the line segments shown in FIG. 14B; and Table 4 illustrates the application of the rounding rules of the present disclosure to the line segments shown in FIG. 14C.

DETAILED DESCRIPTION INCLUDING BEST MODE

The present disclosure relates to an efficient and accurate method for the realization of a rotation invariant object boundary. Specifically, rules are defined for rendering objects that have been rotated 90, 180 or 270 degrees, where the reference rotation is 0 degrees and the reference pixelization rule is the ceiling rounding rule.

Figure 2:
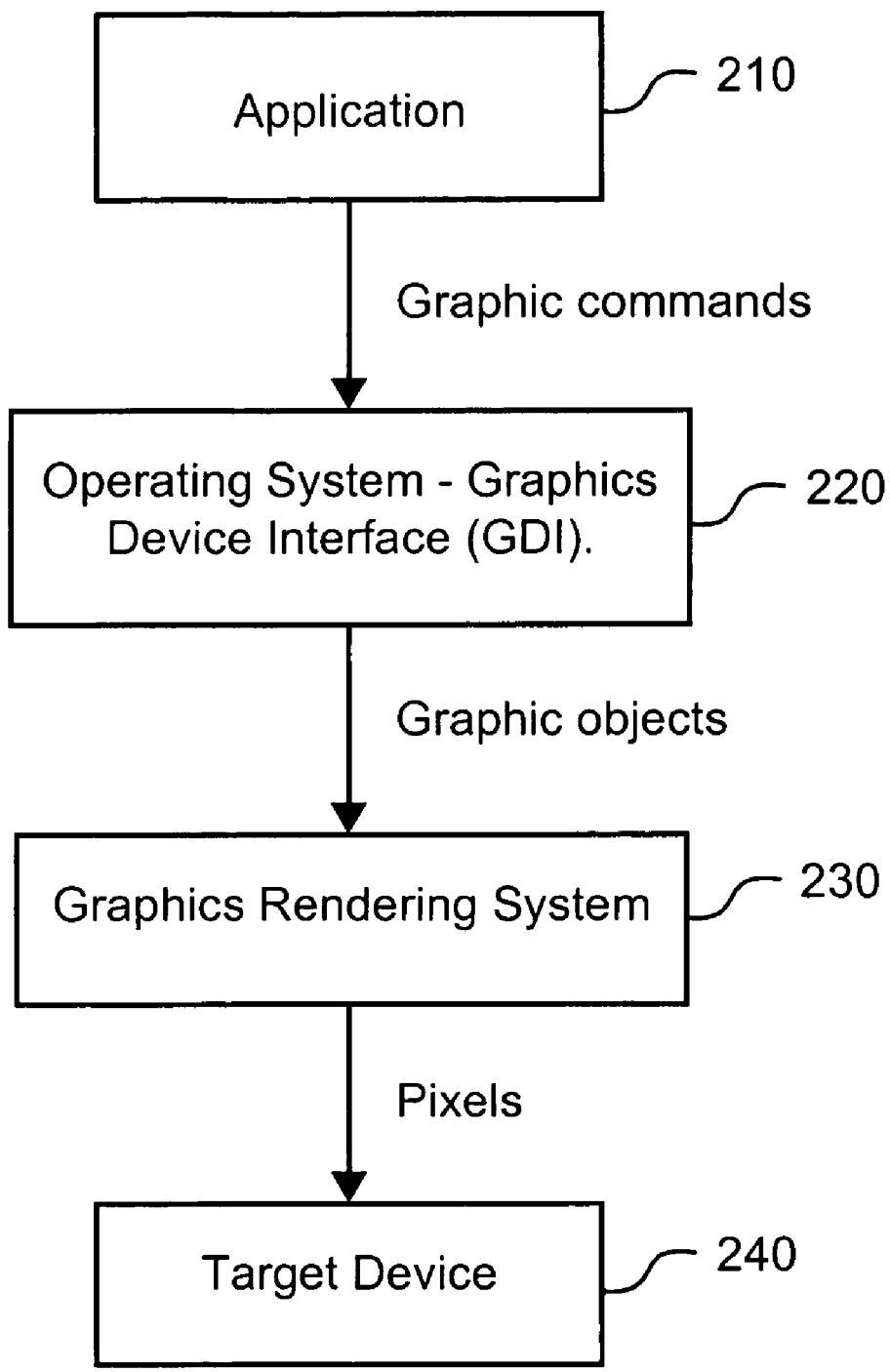
FIG. 2 is a schematic block diagram of a render pipeline in which the arrangements of the present disclosure may be implemented.
Figure 3A:
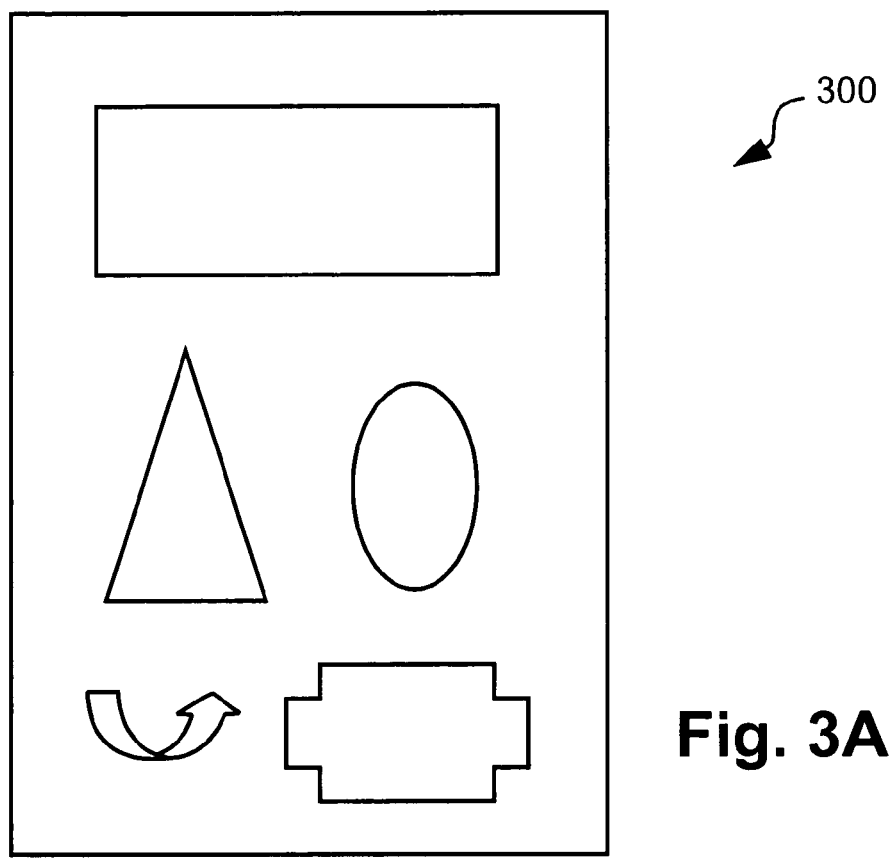
FIG. 3A is a diagram of an example page created by a graphics application.
Figure 3B:
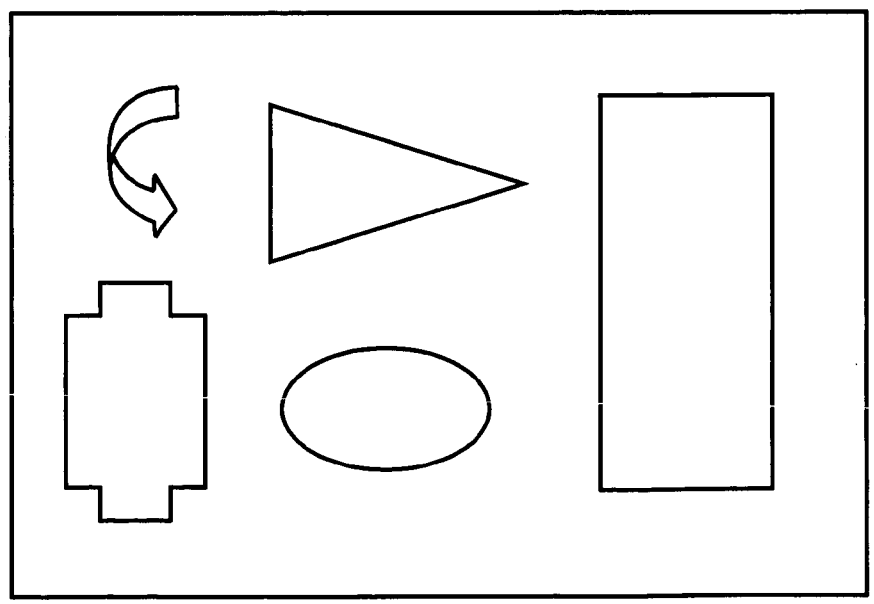
FIG. 3B is a diagram of a rendering of the page of FIG. 3A rotated by 90 degrees.
Figure 3C:
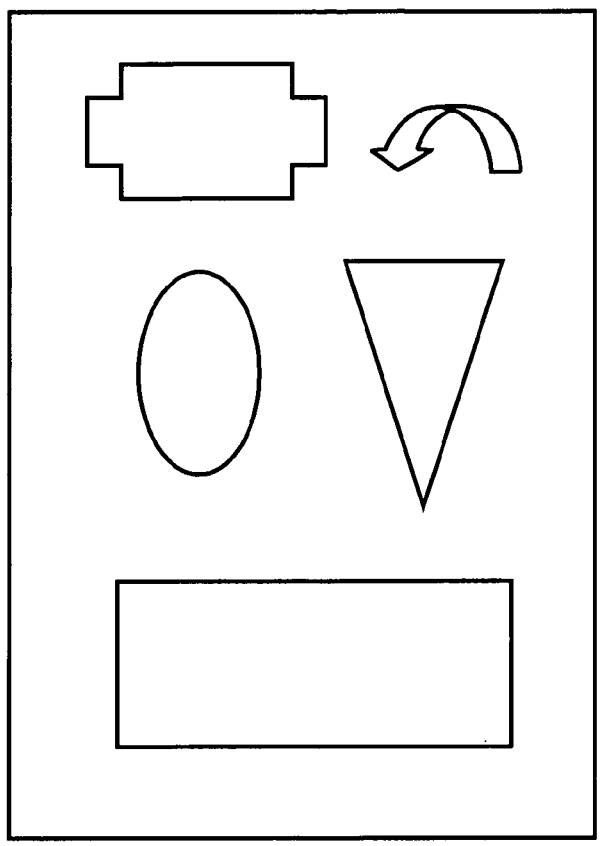
FIG. 3C is a diagram of a rendering of the page of FIG. 3A rotated by 180 degrees.
Figure 3D:
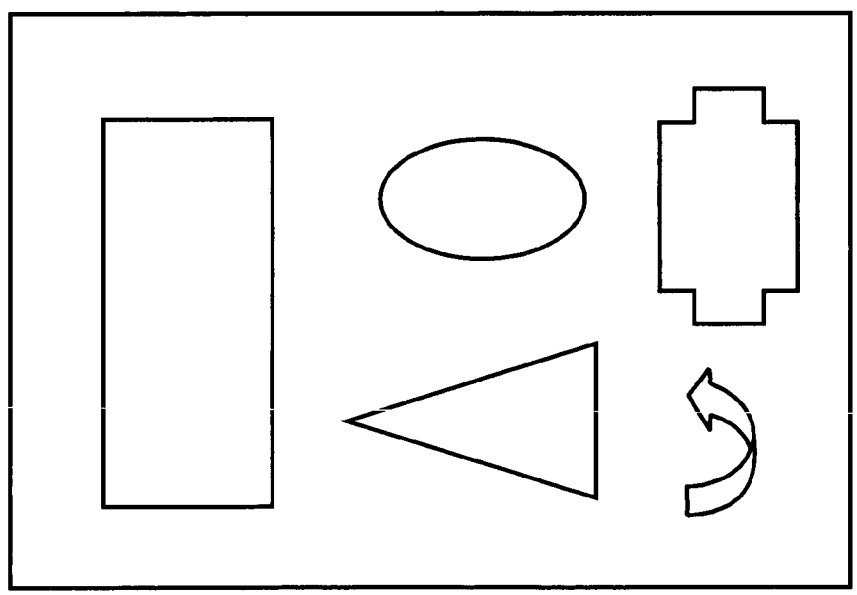
FIG. 3D is a diagram of a rendering of the page of FIG. 3A rotated by 270 degrees.
Figure 3E:
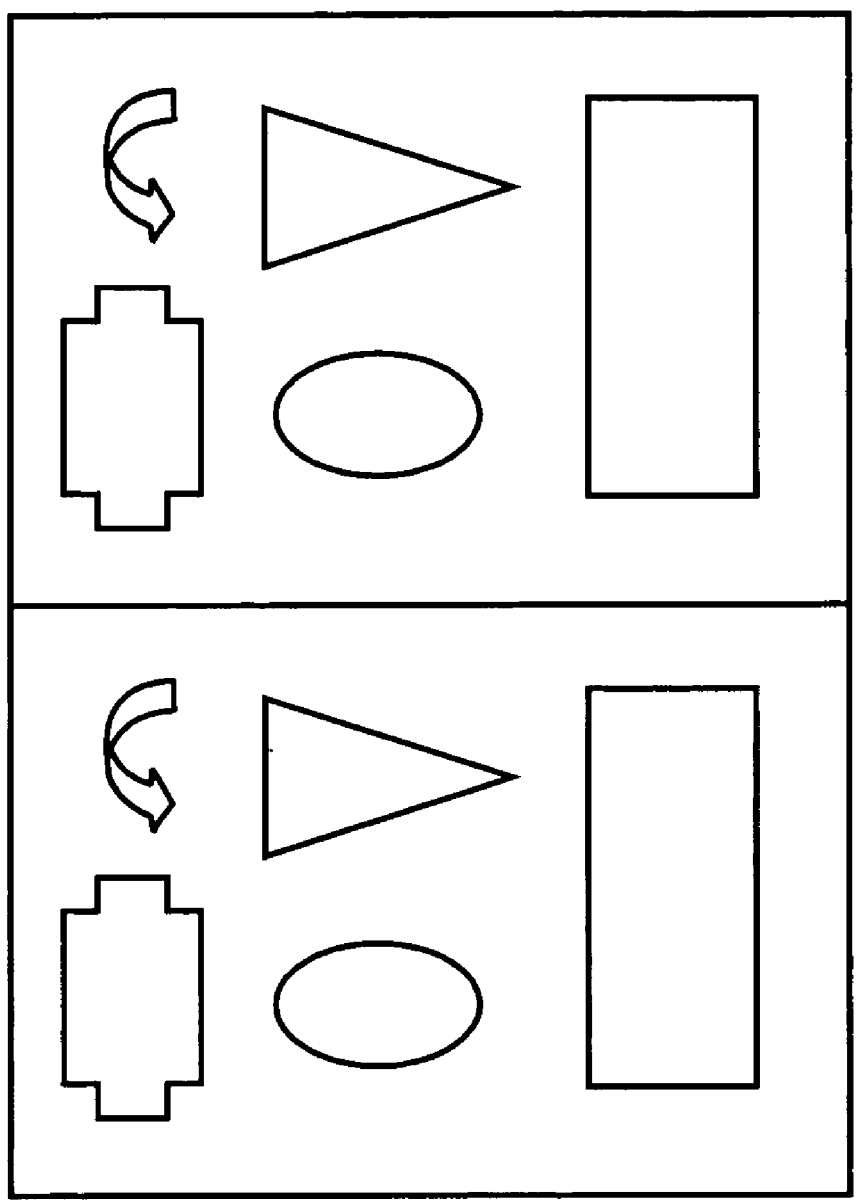
FIG. 3E is a diagram of a rendering of the page of FIG. 3A, using 2 pages per sheet, each page rotated by 90 degrees.
Figure 4A:
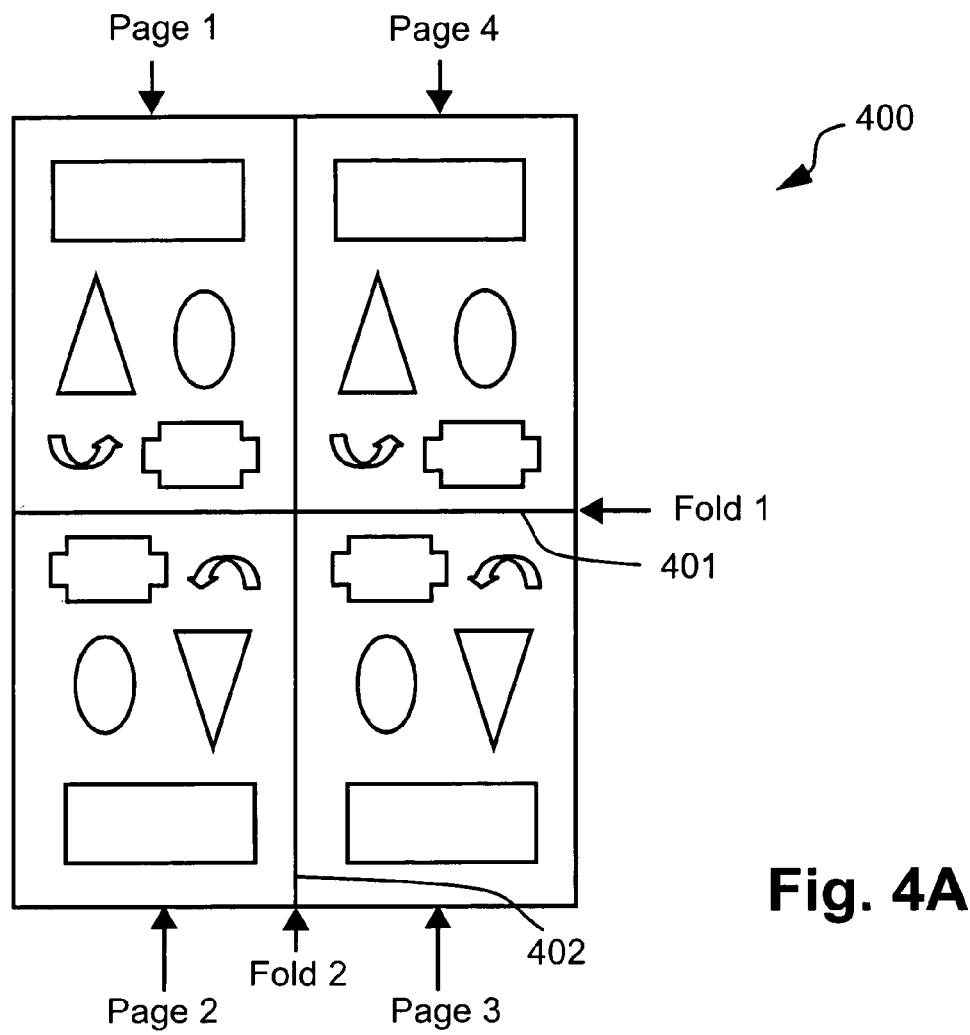
FIG. 4A is a diagram of a rendering of the page of FIG. 3A, using 4 pages per sheet, the bottom two pages rotated by 180 degrees.
Figure 4B:
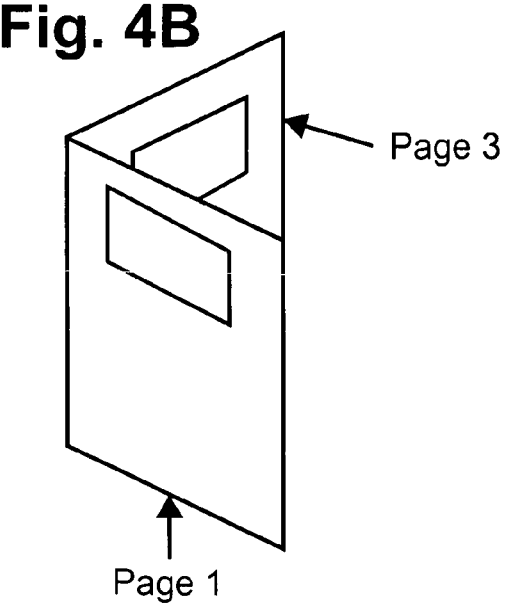
FIG. 4B shows a card obtained by folding the rendering shown in FIG. 4A.
Figure 4C:
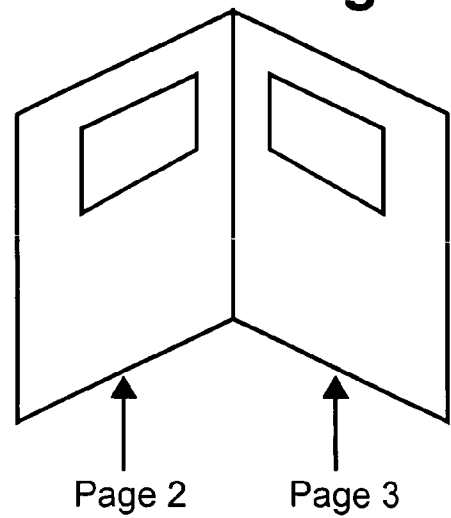
FIG. 4C shows an alternate view of the card of FIG. 4B.
Figure 5A:
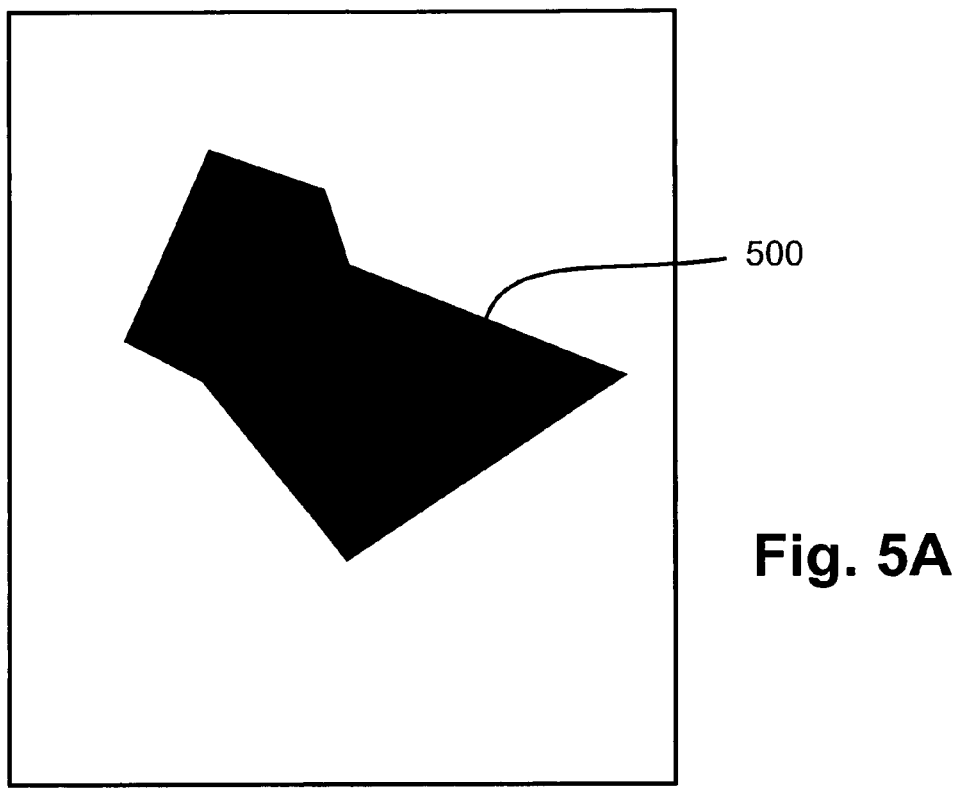
FIG. 5A is a diagram of an example object created by a graphics application.
Figure 5B:
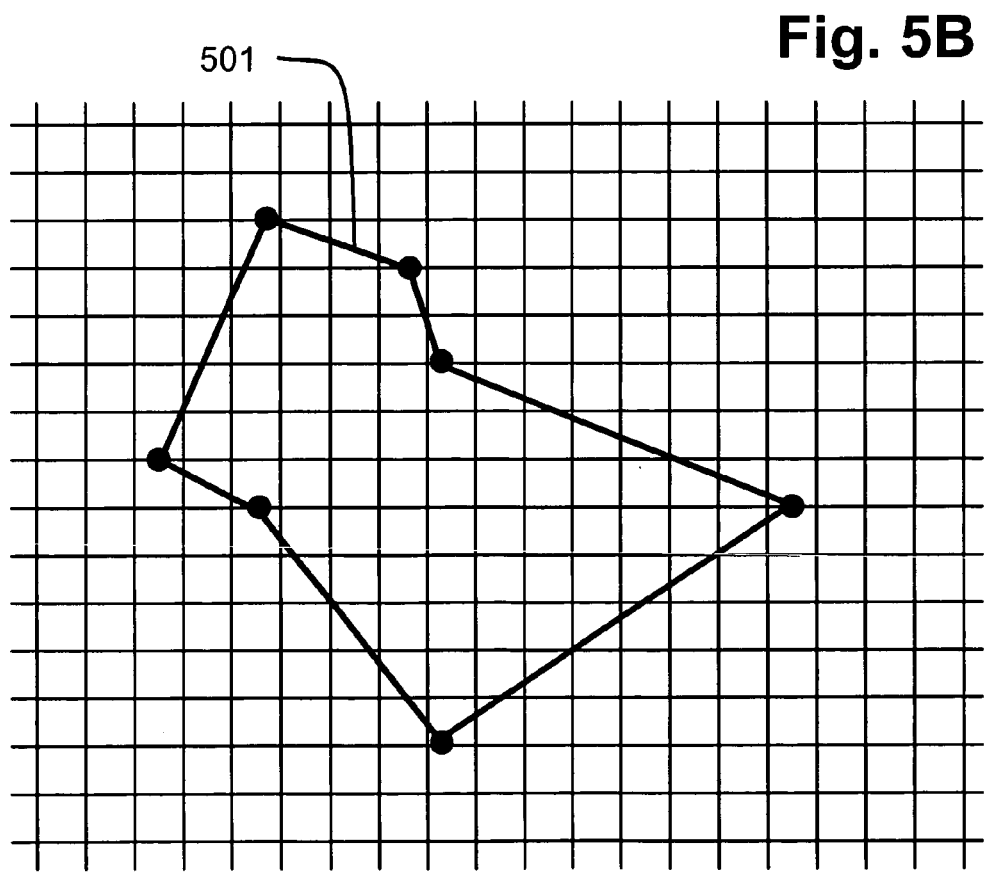
FIG. 5B is a diagram of the points that represent the boundary of the object shown in FIG. 5A.
Figure 5C:
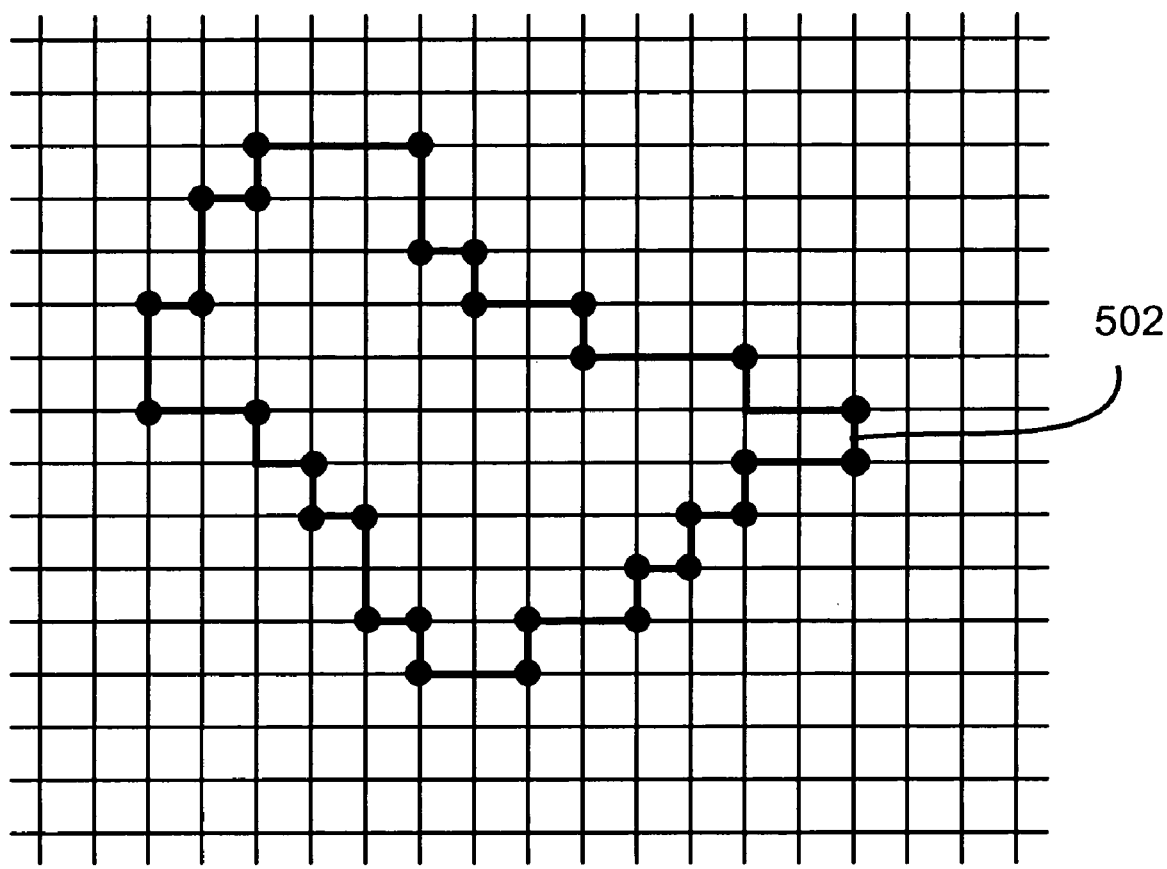
FIG. 5C shows the path and points of the object shown in FIG. 5A converted to pixel edges.

FIG. 2 shows a software application 210, a GDI layer 220, a graphics rendering system 230, and a target device 240. The application 210 passes each page of a document as a series of commands defined in terms of the graphic interfaces services which describe the graphic objects of the page. The GDI layer 220 mediates between the application program 210 and the target device 240, such that the GDI layer 220 enables the graphics rendering system 230 to support a much smaller set of functionality, such as drawing rectangular blocks of image data, and filling simple regions with a flat color. The GDI layer 220 also provides graphics objects to the graphics rendering system 230 in a format that is efficient for the graphics rendering system 230, using a resolution of the target device 240. The graphics rendering system 230 renders the graphics objects received from the GDI layer 220, generating pixels, which are sent to the target device 240.

Data is passed to the graphics rendering system 230 from the GDI layer 220 as a series of drawing commands (or graphic objects). Typically, as a minimum, these drawings commands specify:

an object boundary—also known as the edges of an object;

the pixel data to be rendered;

a clipping region;

a raster operation; and object transform requirements.

The graphics rendering system 230 converts each graphics object into a raster equivalent. There are numerous algorithms available to achieve a final rendered display depending on system requirements and the requirements of the final output. A well-known algorithm is the Painter's Algorithm, where each object is rendered to a framestore, or page buffer, as it is received from the GDI layer 220. Objects with a higher z-order are simply rendered to the frame buffer, overwriting any previously rendered object. Compositing can be carried out by calculating pixel data for a new object and combining such pixel data with pixel data already in the frame buffer.

Another method of rendering is a two-stage approach where, in the first stage, the graphics objects to be rendered are converted into an intermediate format (known as a display list) in which objects are stored in an edge based format. The second stage involves rendering the display list one scanline at a time. No matter which type of graphics rendering system 230 is used, each object must eventually be converted to pixels.

Graphics applications 210 provide many different types of graphics objects, such as bitmaps, text, flat-colored fill regions, and styled lines. A user can use these graphics objects to create a page of graphics data as desired. The graphics rendering system 230 may, at times, be requested to render a page at 90, 180, or 270 degrees rotation.

For applications that lack the ability to rotate pages, or for graphics rendering systems that can provide rotated output or special purpose outputs that require rotation, the graphics rendering system 230 needs to carry out the rotation in order to produce the required output. In this case, the graphics objects are received from the graphics application 210 via the GDI layer 220 as unrotated objects. The GDI layer 220 may provide an explicit command to tell the graphics rendering system 230 that a page should be rotated, and/or each individual object may have a related page transform matrix. When creating special purpose outputs, the graphics rendering system 230 may manipulate the transform matrix of objects before the objects are rendered in order to meet user requirements. The graphics rendering system 230 uses the object/page transform to rotate each object into the desired position. An object is rotated by applying the transform matrix to every point describing the boundary of the object. A boundary for the rotated object may then be realized using the methods described below.

DEFINITIONS

The following terms are used in the present disclosure:

A segment is a straight line defined by two points.

An edge describes the boundary (or part of a boundary) of an object. An edge is formed from a continuous set of segments.

Edge tracking refers to the process of determining the position of the segment for a next scanline. That is, the edge position is tracked to the next scanline, depending on the slope of the current segment being tracked within an edge.

A pixedge is a segment that describes a single side of a pixel. A pixedge may be defined by two integer points.

An x crossing is described as the x point at which a segment leaves an integer scanline value. An x crossing value is rounded up or down, depending on the rotation rules, to determine the position of a pixedge for the part of the segment in question.

Rotation rules are the rules applied to segments to determine pixedges. The rules are dependent on how the segment has been rotated compared to its original orientation. The rotation rules use rounding rules, which may be rotation dependent, to determine an x crossing value and convert the result into an integer position and hence define a pixedge.

A Fixed point number is an integer that is used to represent a fractional number. In binary format, a specified number of bits is used to represent the fractional part of a number and a specified number of bits are used to represent the integer part of a number.

Rounding Rules

Figure 6:
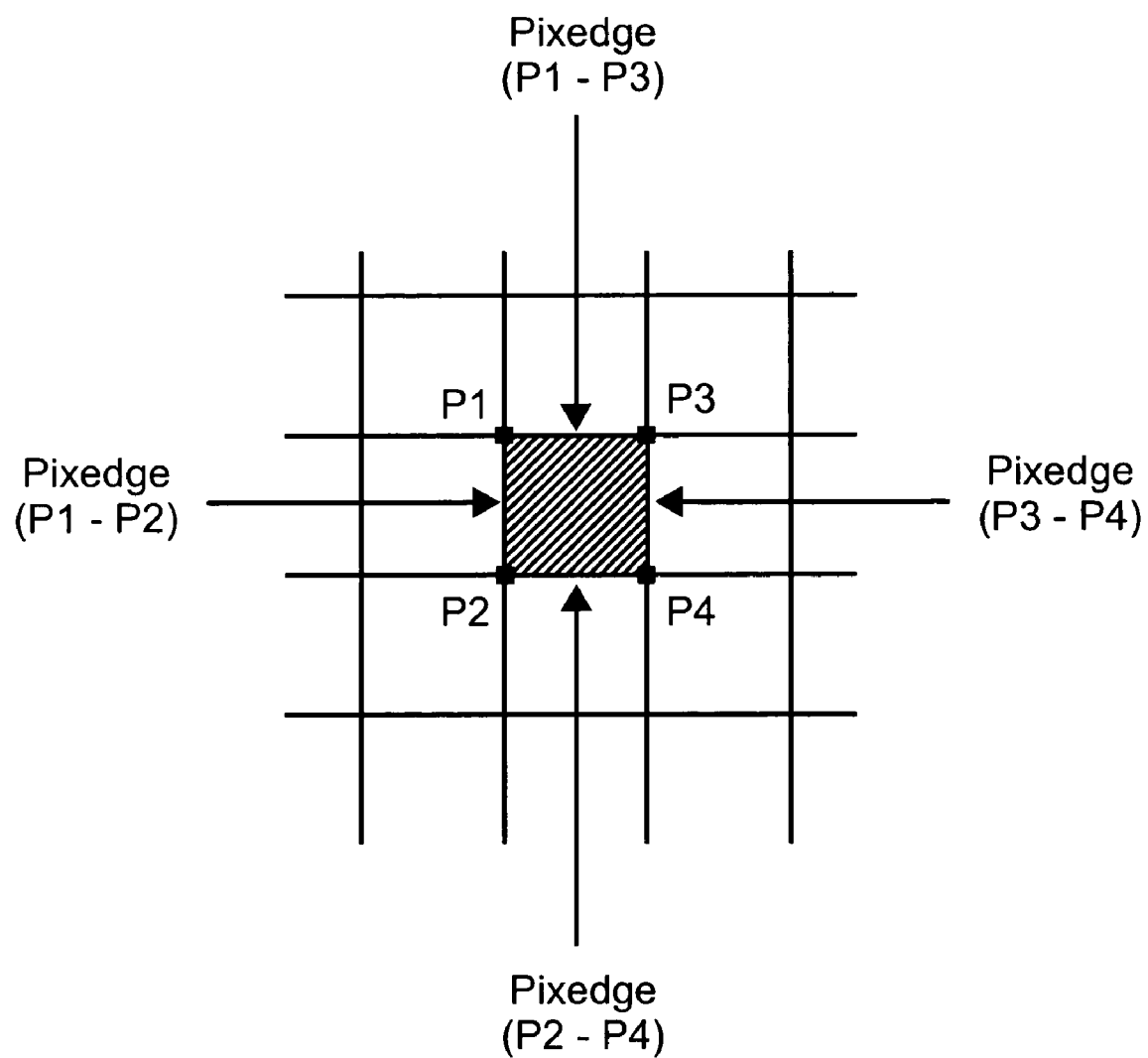
FIG. 6 is a diagram illustrating pixedges.

Rounding rules describe the way in which a point on a path is rounded to produce a resulting pixedge. FIG. 6 shows a pixel delimited by the four points P1, P2, P3 and P4. The pixel has four pixedges, (P1-P3), (P1-P2), (P2-P4) and (P3-P4). Typically, for each scanline on which a simple object lies, left and right pixedges are determined from the left and right side of the object. The left and right pixedges describe the area in which the object's pixels are to be activated on the scanline. The rounding rules consist of a y rounding rule and an x rounding rule, which are used together to identify pixedges of an object.

The y rounding rule is used to determine the first and last scanline on which to calculate an x crossing. An x crossing is the point at which a segment leaves a scanline.

X rounding rules are used to round an x crossing value to an integer value to define the start of a pixedge. The type of x and y rounding rules used in the present disclosure depend on the rotation of the object they are being applied to.

Ceiling Rounding Rules

The GDI pixelization rule uses the Grid Intersection Quantization rule in order to determine which pixels are activated by a path. Since this rule is cumbersome to calculate, the rule can be closely approximated by the y ceiling rounding rule and the x ceiling rounding rule. Collectively, these rounding rules are known as the ceiling rounding rules.

For any real number N the ceiling of N, written as ceiling (N), is the smallest integer greater than or equal to N. Also, the floor of N, written as floor(N), is the greatest integer less than or equal to N.

The y ceiling rounding rule states:
The first integer scanline on which an x crossing value is calculated is the ceiling of the y coordinate of the start point of the path, ceiling(y).
The last integer scanline on which an x crossing is calculated is the ceiling of the y coordinate of the path end point less one, ceiling(y)−1.
The x ceiling rounding rule states:
Use ceiling(x) to determine the integer value for the path crossing on each scanline on and between the scanlines determined using the y rounding rule. The determined integer values are used to define the pixedges for the realized path.

A renderer may use the above pixelization rules to quantize the left and right sides of an object and thus define the area in which pixels are to be activated.

Figure 12:
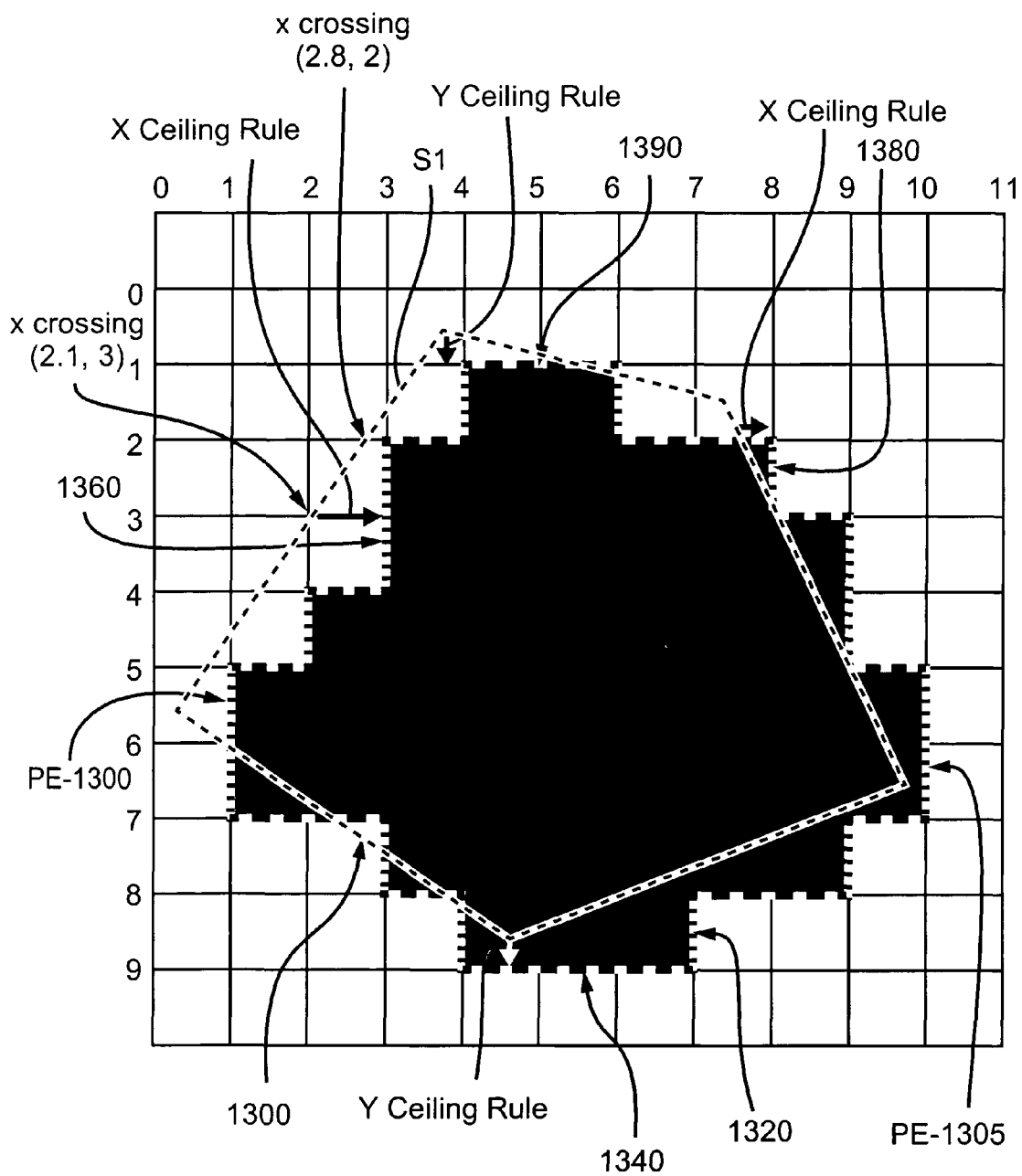
FIG. 12 shows a diagram of an example object that has been pixelized using the ceiling rounding rules.

Shown in FIG. 12 is an example object that has been pixelized by applying the ceiling rounding rules to the object boundary 1300, to produce pixel data having boundary 1320. In the example a scanline N, has the "Y=N" line as its upper border. In the example, the smallest y position is (0.6) at point (3.7, 0.6). Applying the y ceiling rounding rule, the ceiling of this number is 1, so this is the first scanline at which x crossings should be calculated. The maximum y value is 8.5. Applying the y ceiling rounding rule to this yields a scanline value of 8. Therefore, whenever the given path crosses any scanline between 1 and 8 inclusive, an x crossing needs to be calculated. For each new scanline the boundary 1300 crosses, a horizontal pixedge is created to join the vertical pixedges that were determined using the x rounding rule. Vertical pixedges 1360 and 1380 are created from applying the x ceiling rounding rule to the point at which the boundary crosses scanline 3 and scanline 2 respectively. Horizontal pixedges 1390 and 1340 show the application of the y ceiling rounding rule which define the limits of the discrete boundary of the object path 1320.

The resulting pixedges define the boundary of the object, and hence which pixels are activated. For example, consider the x crossings in FIG. 12 at the positions (2.8, 2) and (2.1, 3). The x rounding rule is used to convert a real x crossing value to an integer x value. The resulting value is the starting position of a pixedge. Thus, using the x-ceiling rule, the real x crossing at 2.8 is converted to an integer value of 3, and the real x crossing at 2.1 is also converted to an integer value of 3. Consequently, the realized boundary 1320 includes the two pixedges at 1360.

Floor Rounding Rules

To apply the Y floor rule, the following steps are implemented:
Shift the segment by negative 1 scanline, i.e. up one scanline;
Determine the first integer scanline on which to calculate an x crossing value as the floor of the start point plus one. i.e. (floor(y)+1); and
Determine the last integer scanline on which to calculate an x crossing from the floor of the path end point, floor(y).
The x floor rule is implemented by taking the x crossing value as the floor of the current x position, i.e. floor(x).

Problems Arising from Applying Rounding Rules to Rotated Objects

When applying the standard ceiling rounding rules to the path of a rotated object, and the pixelization rules are not altered, there will always be cases where the unrotated object looks different to a rotated object.

For example, consider an object boundary that has been rotated 90 degrees. The rounding rules applied to this object are applied as if the axes have been swapped (in the sense of the original orientation). This means the path of the original boundary will cross at different points on the axis when compared with the unrotated case. This typically introduces differences between the rotated and unrotated object pixel boundaries.

Figure 7A:
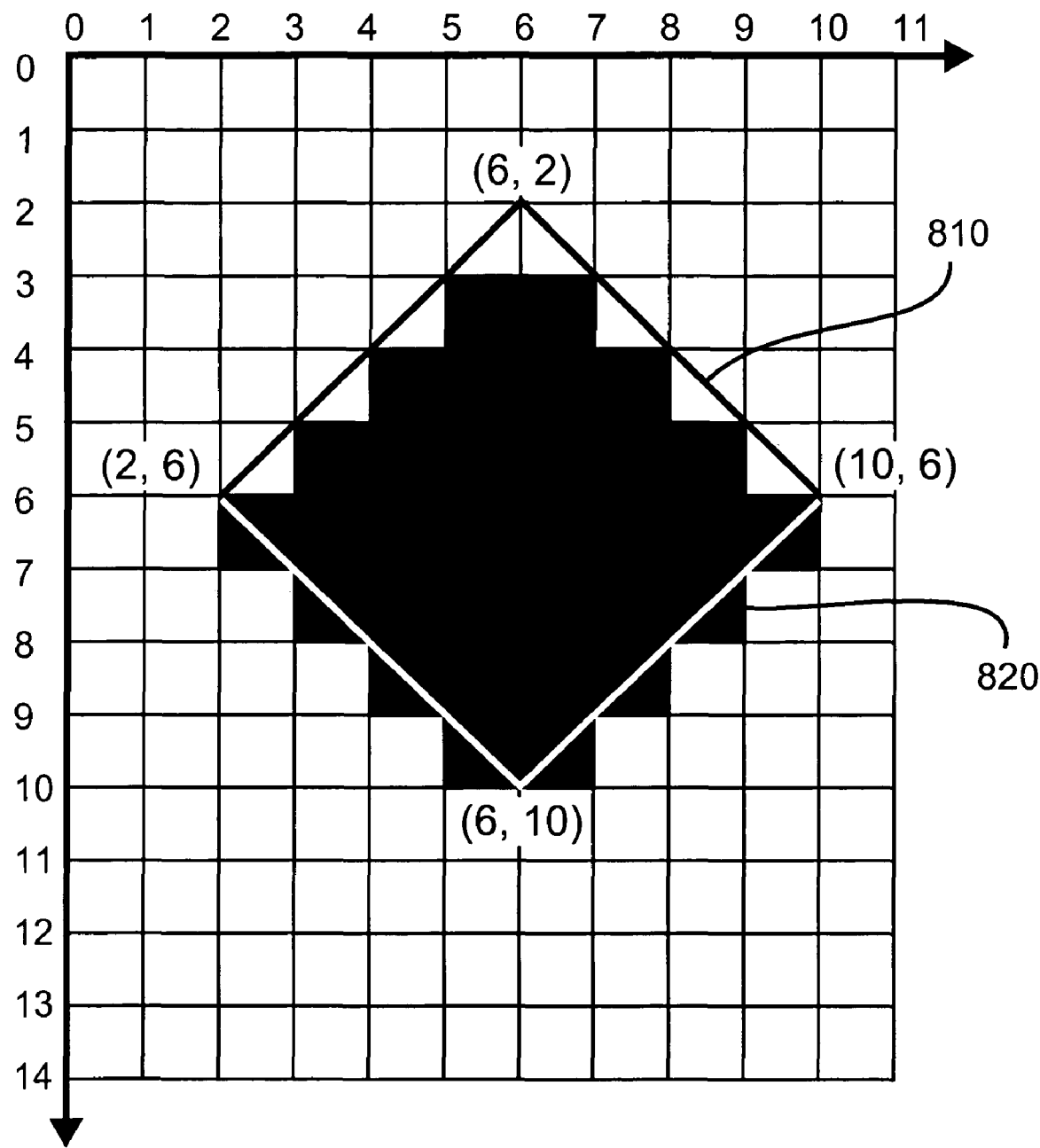
FIG. 7A shows a diagram of a diamond-shaped object on a page and a corresponding pixel representation when rendered using the ceiling rounding rules.
Figure 7B:
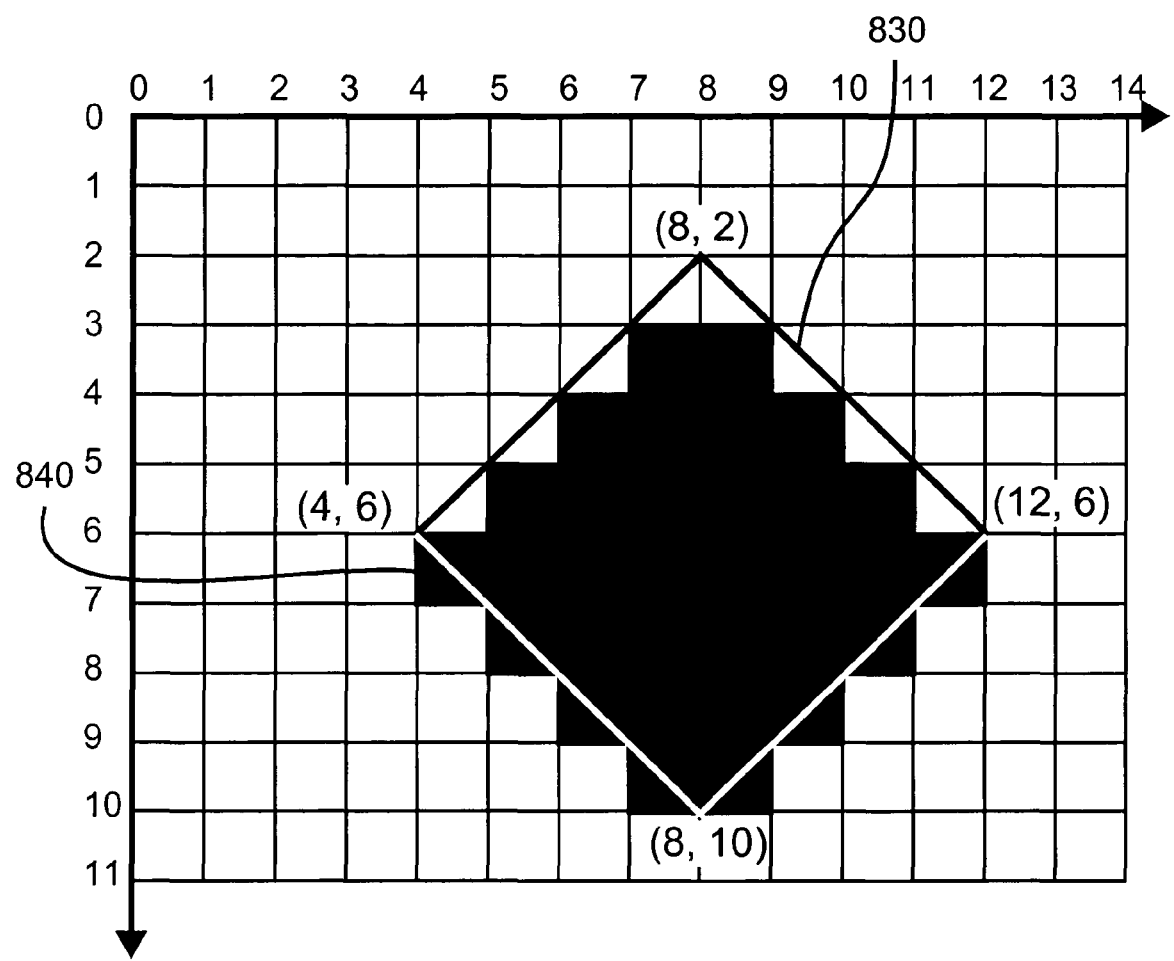
FIG. 7B shows the object of FIG. 7A rotated through 90 degrees, and the corresponding pixel representation when rendered using the ceiling rounding rules.
Figure 7C:
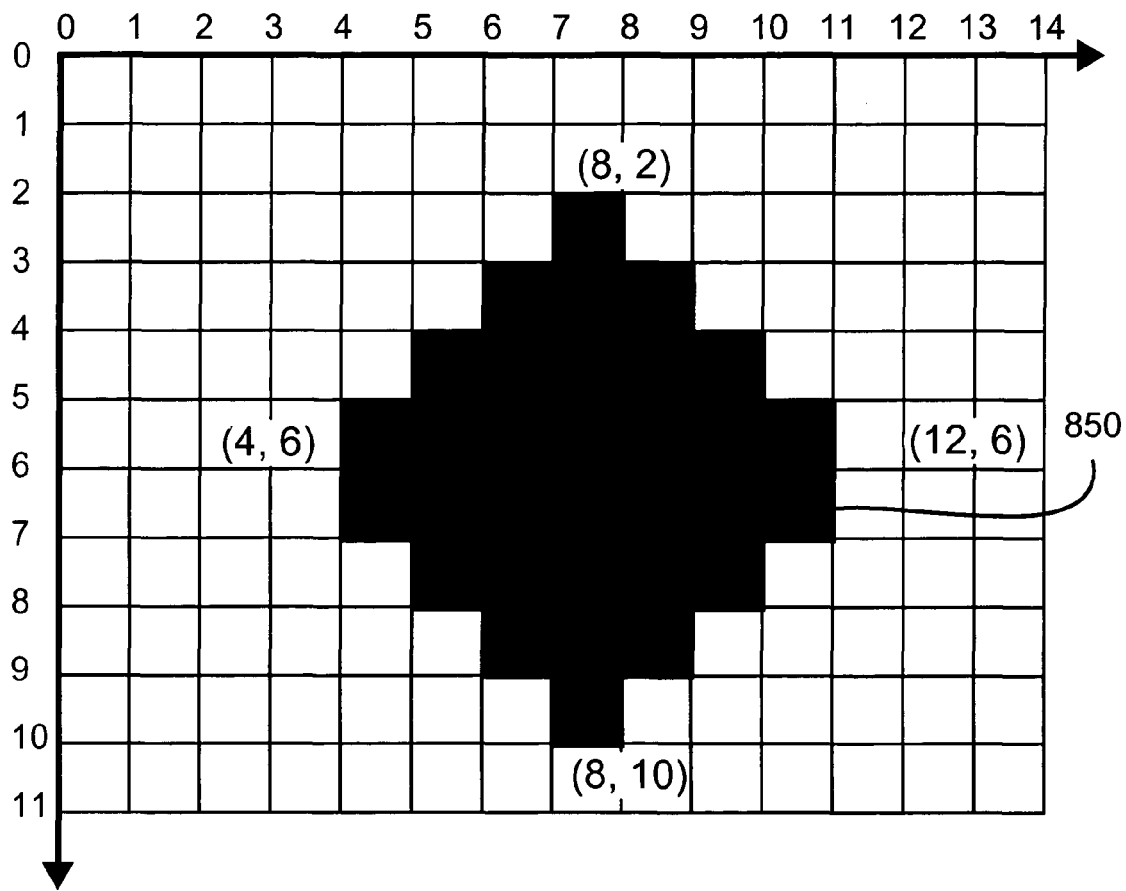
FIG. 7C shows the rasterized image of FIG. 7A rotated by 90 degrees.

An example of this pixelization error can be seen in FIGS. 7A-7C. FIG. 7A shows a diamond 810 delimited by the coordinates (6,2), (10,6), (6,10) and (2,6). FIG. 7B shows diamond 830, which is diamond 810 rotated by 90 degrees. Diamond 830 has coordinates (8,2), (12,6), (8,10) and (4,6). Applying the ceiling rounding rules to the diamonds 810 and 830 produces the rendered objects 820 and 840 respectively. FIG. 7C shows the rendered object 850, which is object 820 of FIG. 7A rotated by 90 degrees. To be rotation invariant, object 850 should be the same as the rendered object 840 of FIG. 7B. It can be clearly seen that there are some differences in the rendered objects 840 and 850. The differences are the result of using the same pixelization rule for different rotations.

Figure 8A:
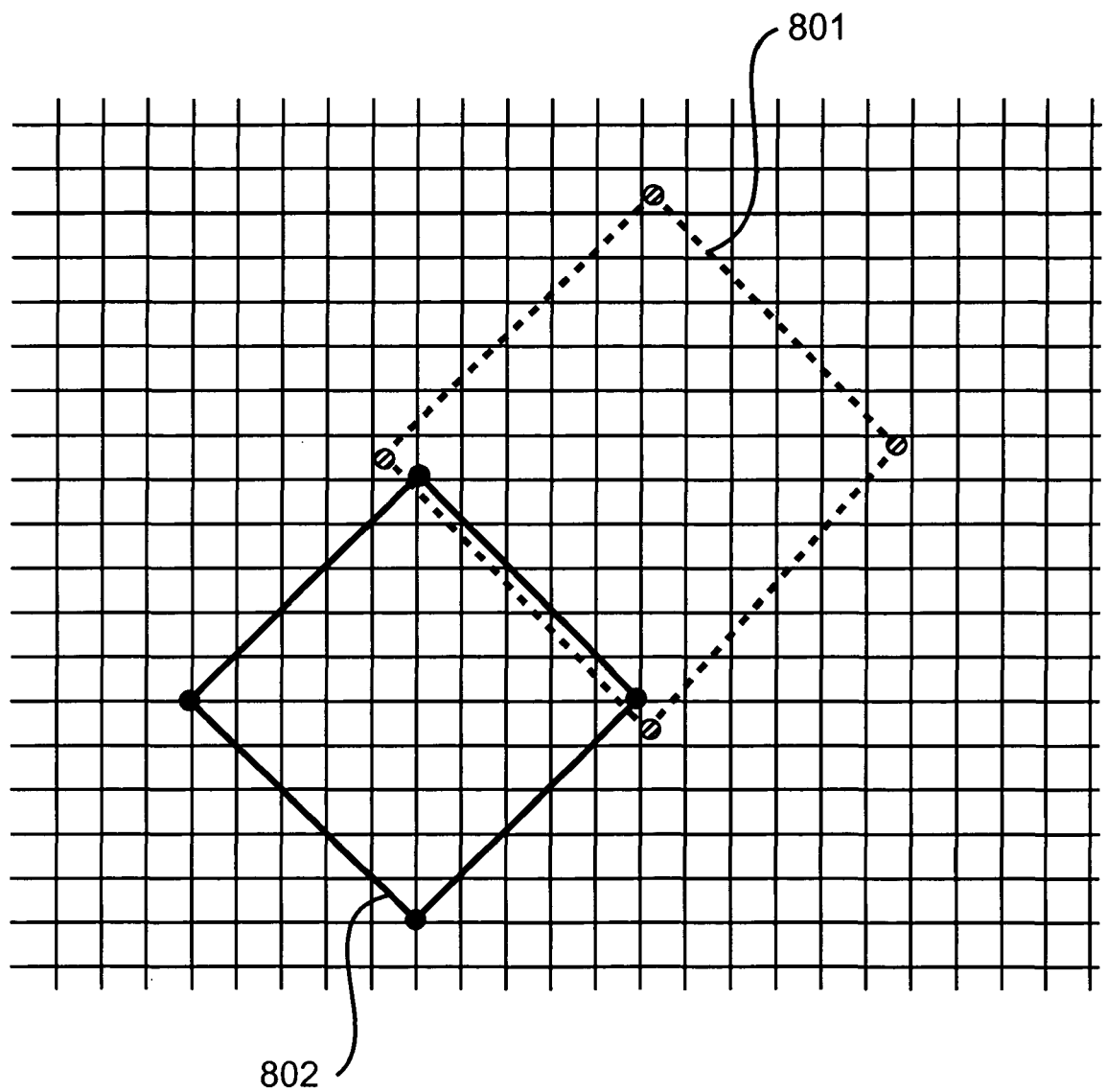
FIG. 8A shows two paths that represent the boundary of two independent graphics objects.
Figure 8B:
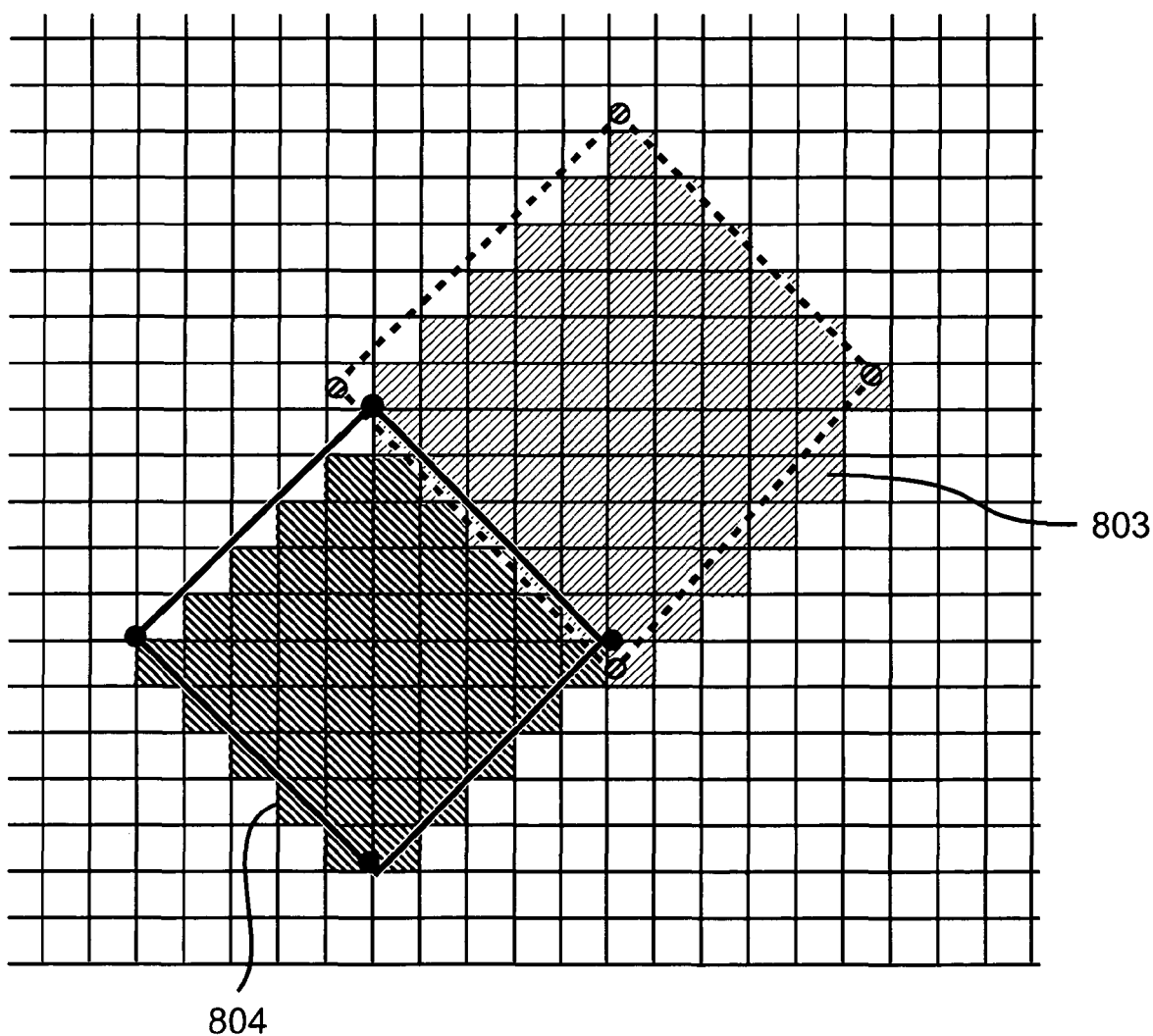
FIG. 8B shows the rasterization of the two paths shown in FIG. 8A.
Figure 8C:
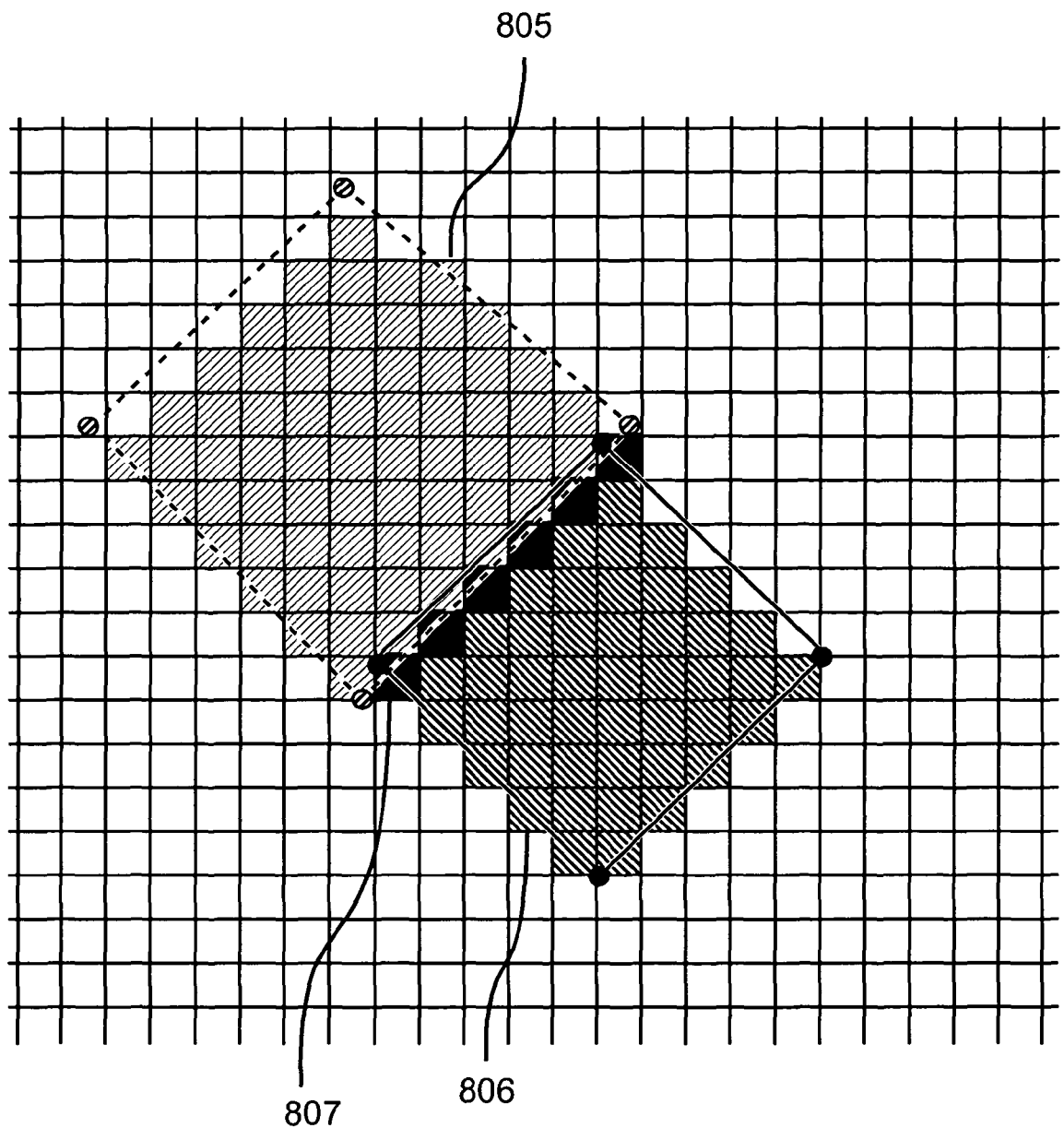
FIG. 8C is a diagram showing the result of rasterizing the paths shown in FIG. 8A after the paths have been rotated by 90 degrees.

In some instances it may be acceptable to have slight inaccuracies in object boundaries, but in other cases the inaccuracies may have undesirable results, for example where two objects lie close together. This case is illustrated in FIG. 8A. The two objects 801, 802 lie side by side. The results of rendering the objects using the ceiling rounding rules are shown in FIG. 8B. The resulting rendered objects 803, 804 lie side by side perfectly. However, when the objects 801, 802 are rotated by 90 degrees and then rendered with the ceiling rounding rules, the resulting rendered objects 805, 806 overlap, as shown in FIG. 8C. This would not be a problem if the adjoining objects are opaque, since the top-most object paints over any previously rendered pixels. However, if the adjoining objects have raster operations that require compositing of the two sets of pixels 805, 806, then any pixels that overlap may come out as a completely different pixel color to the original two objects 801, 802. This different pixel color may contrast with the original objects and produce unacceptable output, as shown, for example, in pixels 807 in FIG. 8C.

Figure 9A:
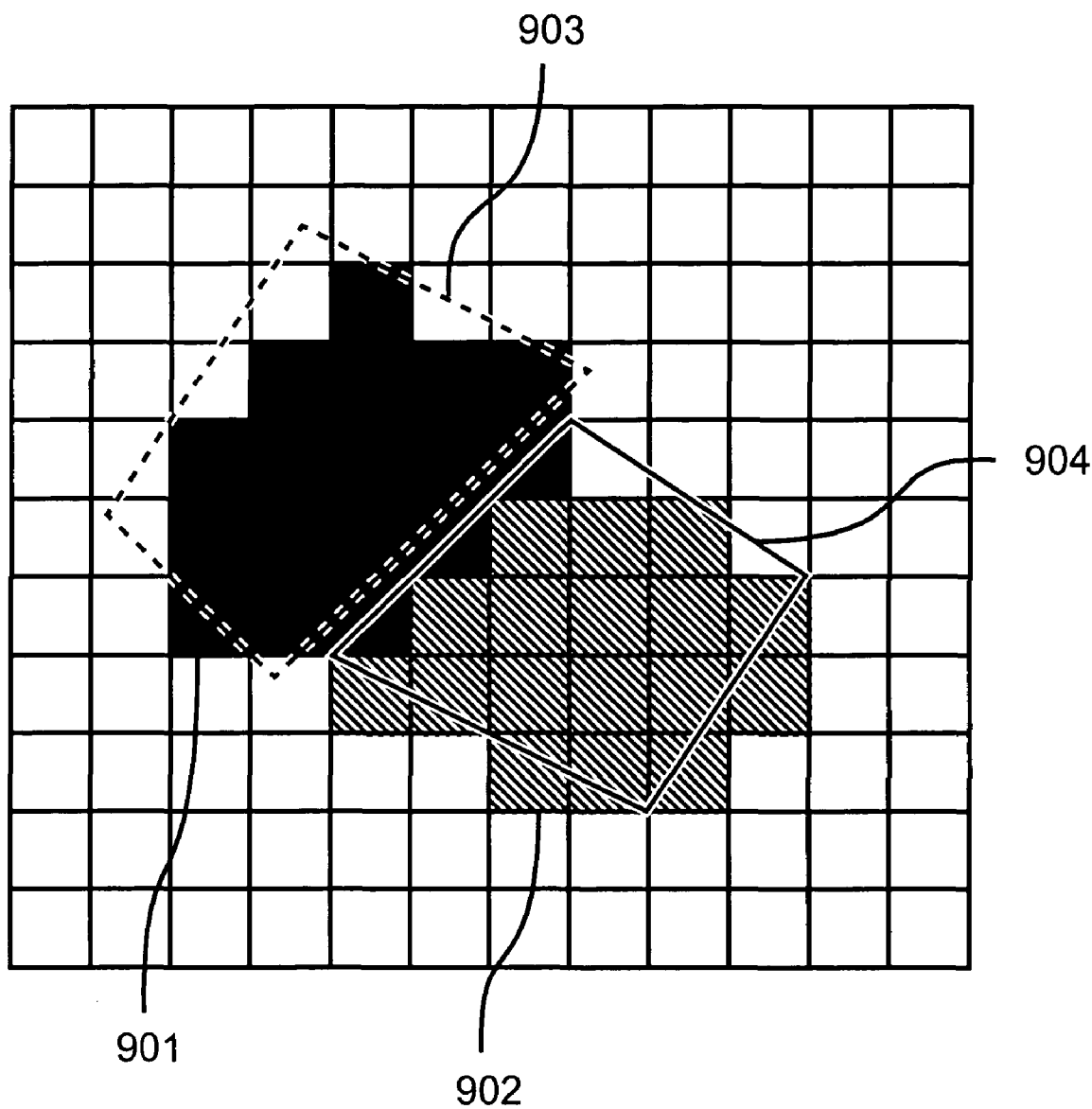
FIG. 9A shows two paths that represent the boundary of two independent graphics objects, and the resulting rasterized pixels after applying the GDI pixelization rules.
Figure 9B:
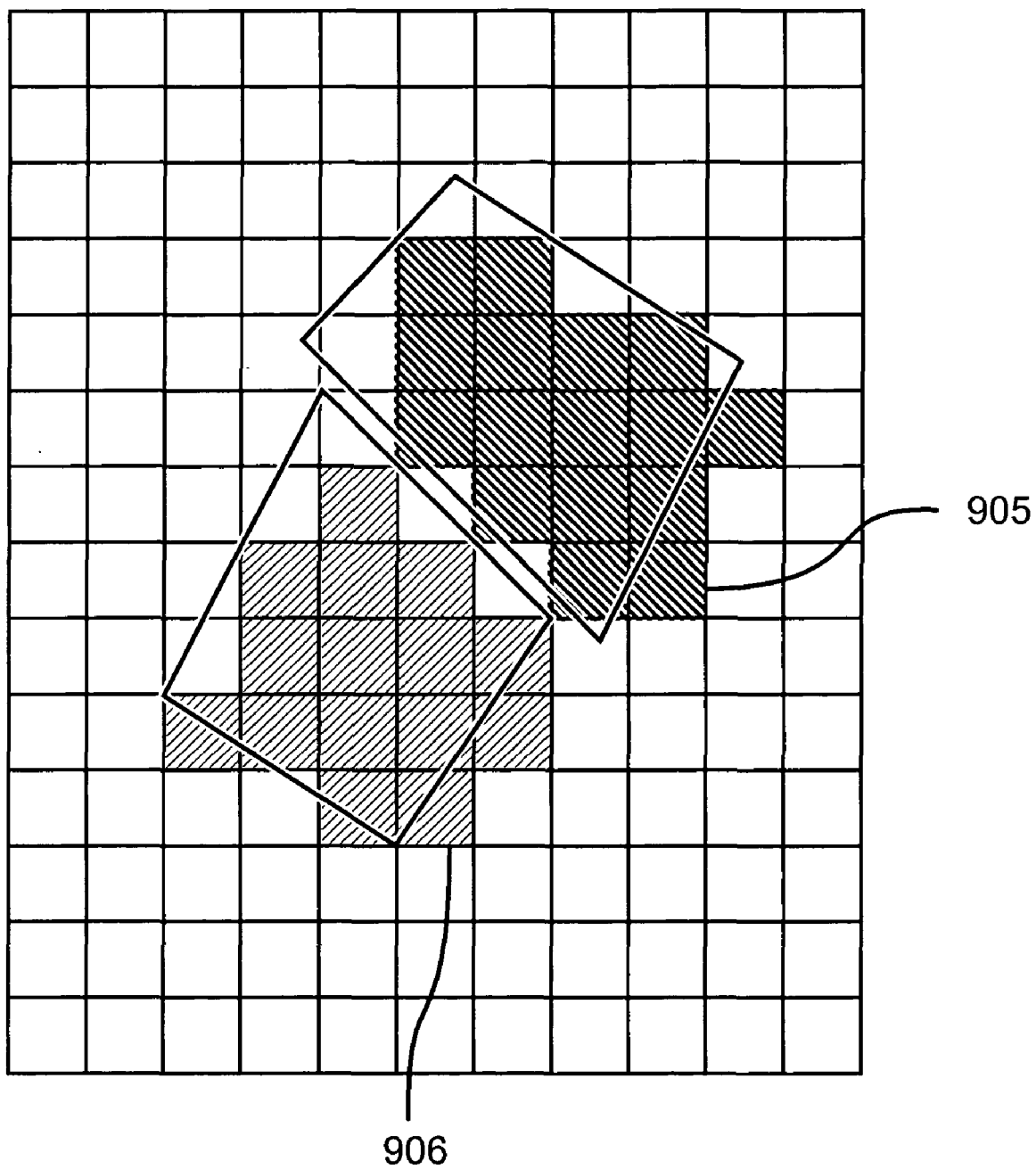
FIG. 9B shows the two paths shown in FIG. 9A rotated by 90 degrees, together with the resulting rasterized pixels after applying the GDI pixelization rules.

Another problem case is where the rendering leaves a gap between two objects. On low resolution devices (say 600 dpi and below) a one pixel gap may be highly visible, especially if the contrast between the two objects and the background color is large. This problem arises where the unrotated version of rendered objects line up perfectly but a rotated version of the objects results in a shifting of one object's boundaries, producing a gap. FIG. 9A shows two objects 901, 902 rendered from their respective boundaries 903, 904. FIG. 9B shows the same two boundaries 903, 904 rotated 90 degrees and the resulting rendered objects 905, 906. The rendered objects 905, 906 have a one-pixel gap between them, which is obviously unacceptable when compared to the unrotated example of FIG. 9A. Even though the examples shown are simple, it can be seen that objects with highly complex paths could produce many discrepancies between rotated and unrotated cases.

Such problem cases may arise because object boundaries having path segments that pass through a scanline on an exact x integer position produce different pixedges depending on the rotation of the object boundary. Typically, there will be a number of path segments that pass through integer positions on any one page of graphics data. Hence, to achieve correctly rotated page output, such segments need to be handled differently.

The method of the present disclosure rotates an object by applying a transformation matrix before the object is rendered. Then, upon rendering, rules that are dependent on the rotation and height of individual path segments are used to render the object in order to achieve rotation invariant rendering. In applying the rules, a shift factor is determined for application to part of an object's boundary to ensure that the object is rendered correctly. The following section derives the maximum shift for a segment.

Derivation of Maximum Shift

A general edge tracking equation $X_r(n)$ is derived to describe the position of a line segment at any given scanline, in terms of an integer and fractional part. From this equation, the allowable maximum shift that a line segment can be moved along the x axis may be defined. This derived shift is the maximum shift such that only those x crossings that occur at an x integer crossing position will be affected by the rounding rules.

Figure 10:
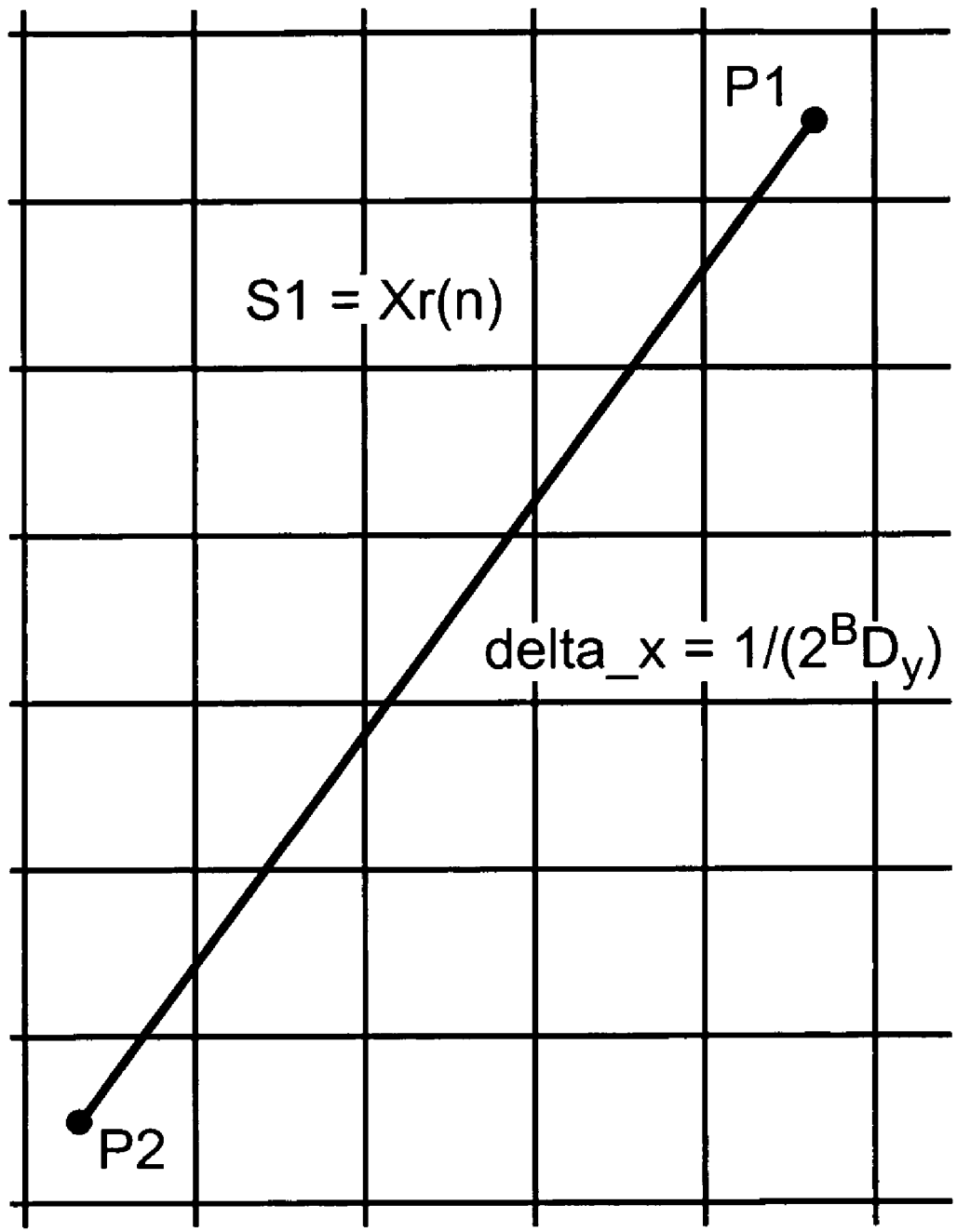
FIG. 10 shows an example of a line segment S1.

This is illustrated by the arbitrary segment $S_1$ shown in FIG. 10. The equation of the line segment is represented as $X_r(n)$. $S_1$ is represented by the two points $P_1$ and $P_2$, where $P_{2,y} > P_{1,y}$. Line $S_1$ has a negative slope.

$X_r(n)$ gives the real x crossing value for a given scanline n. $X_r(n)$ represents the general edge tracking equation.

int_to_fixAB(x) is a function that is equivalent to multiplying x by $2^B$, where A is the number of bits used to represent the integer part of the fixed point number A.B. B is the number of bits used to represent the fractional part of the fixed point number A.B. This function is used to convert an integer x value to the fixed point number A.B.

The value $D_x$ is defined as $P_{2,x} - P_{1,x}$, which is the change in x over the two points P1 and P2.

The value $D_y$ is $P_{2,y} - P_{1,y}$. Since $P_{2,y} > P_{1,y}$, $D_y > 0$.

$D_y/D_x$ describes the slope of the line segment. Since $D_y$ is >0, $D_x$ determines whether the slope is positive or negative.

$X_0$ is the initial X value of the line segment $S_1$, that is $P_{1,x}$.
$Y_0$ is the initial Y value of the line segment $S_1$, that is $P_{1,y}$.
$Y_{off}$ is the offset from $Y_0$ to the floor of the y value, that is, $Y_{off} = Y_0 - \text{floor}(Y_0)$.
$D_i$ is the integer part of $D_x/D_y$, that is, $D_i = \text{INT}(D_x/D_y)$.
$D_f$ is the fractional part of $D_x/D_y$, that is, $D_f = D_x \% D_y$
(Thus, $D_x = D_i * D_y + D_f$).
$X_i$ is the integer part of the number $X_0$, that is, $X_i = \text{floor}(X_0)$.
$X_f$ is the fractional part of the number $X_0$, that is, $X_f = X_0 - \text{int\_to\_fixAB}(X_i)$.
$Y_i$ is the integer part of the number $Y_0$, that is, $Y_i = \text{floor}(Y_0)$.
$Y_f$ is the fractional part of the number $Y_0$, that is, $Y_f = Y_0 - \text{int\_to\_fixAB}(Y_i)$
% represents the modulo operation. This operator returns the integer remainder from an integer division calculation. Whether or not the modulo operator can return a negative number is platform/compiler specific and is not important to the method of the present disclosure.

$X_a(n)$ is the incremental integer part of the general edge tracking equation.

$D_a(n)$ is the incremental fractional part of the general edge tracking equation.

The following calculations are carried out using fixed point numbers. This is of significance because of the use of the modulo (%) operator. Even though the modulo operator returns an integer value, the result may actually represent a fractional number since the calculations are carried out with fixed point numbers.

The edge tracking equation can then be derived from the linear line equation:

$$X_r(y) = X_0 + (y - y_0)\frac{D_x}{D_y}$$

Substitute $$X_0 = X_i + \frac{X_f}{2^B}$$

$$Y_0 = Y_i + \frac{Y_f}{2^B}$$

into the line equation to yield:

$$X_r(y) = X_i + \frac{X_f}{2^B} + \left(y - Y_i - \frac{Y_f}{2^B}\right)\frac{D_x}{D_y}$$

Let n be the integer scanline from the floor of the y start position $Y_0$:

$$n = y - y0$$

Consider n as an integer y position from the y start position and express Xr(y) in terms of n:

$$X_r(n) = X_i + \frac{X_f}{2^B} + \left(n - \frac{Y_f}{2^B}\right)\frac{D_x}{D_y}$$

-continued $$= X_i + n\frac{D_x}{D_y} + \frac{X_f}{2^B} - \frac{Y_f D_x}{2^B D_y}$$

Let $$\frac{D_x}{D_y} = D_i + \frac{D_f}{D_y}$$

and substitute as follows:

$$X_r(n) = X_i + nD_i + n\frac{D_f}{D_y} + \frac{X_f}{2^B} - \frac{Y_f D_x}{2^B D_y}$$

$$X_r(n) = X_i + nD_i + \frac{X_f D_y - Y_f D_x + 2^B n D_f}{2^B D_y}$$

This can be expressed as follows:

$$X_r(n) = \underbrace{X_a(n)}_{M} + \underbrace{(2^B D_a(n) + E)\left(\frac{1}{2^B D_y}\right)}_{N} \quad \text{(Equation 1)}$$

where $$E = (X_f D_y - Y_f D_x) \% 2^B$$

$$D_a(0) = \frac{X_f D_y - Y_f D_x}{2^B} \% D_y$$

$$X_a(0) = X_i + \frac{\frac{X_f D_y - Y_f D_x}{2^B}}{D_y}$$

$$X_a(n) = X_a(n-1) + D_i + \left\lfloor \frac{D_a(n-1) + D_f}{D_y} \right\rfloor$$

$$D_a(n) = [D_a(n-1) + D_f] \% D_y$$

These equations have the following properties:
- $X_r(n)$ is always accurate and cannot overflow;
- $D_a(n)$ always lies between $-D_y$ and $+D_y$ exclusively;
- E is always between $-2^B$ and $+2^B$-exclusively, in the fixed point domain;
- The incremental value of $X_a(n)$ and $D_a(n)$ where n value is greater than 0 can be calculated without division and modulo operations;
- Part M of equation 1 represents the integer value for a given scanline, n; and
- Part N of equation 1 represents the fractional value for a given scanline, n.

From part N of equation 1 (i.e. the fractional part of the incremental edge tracking equation) the minimum fractional position that can be represented is:

$$\text{delta\_x} = \frac{1}{2^B D_y}$$

For pixedge output that is invariant upon page rotation, the rendering module (which tracks a segment to every scanline) must be able to accurately shift the line segment by an amount less than or equal to delta_x in the x direction. Imposing this limit on the shift ensures that integer x crossings are eliminated without affecting the rounding rules for other x crossings.

Figure 11A:
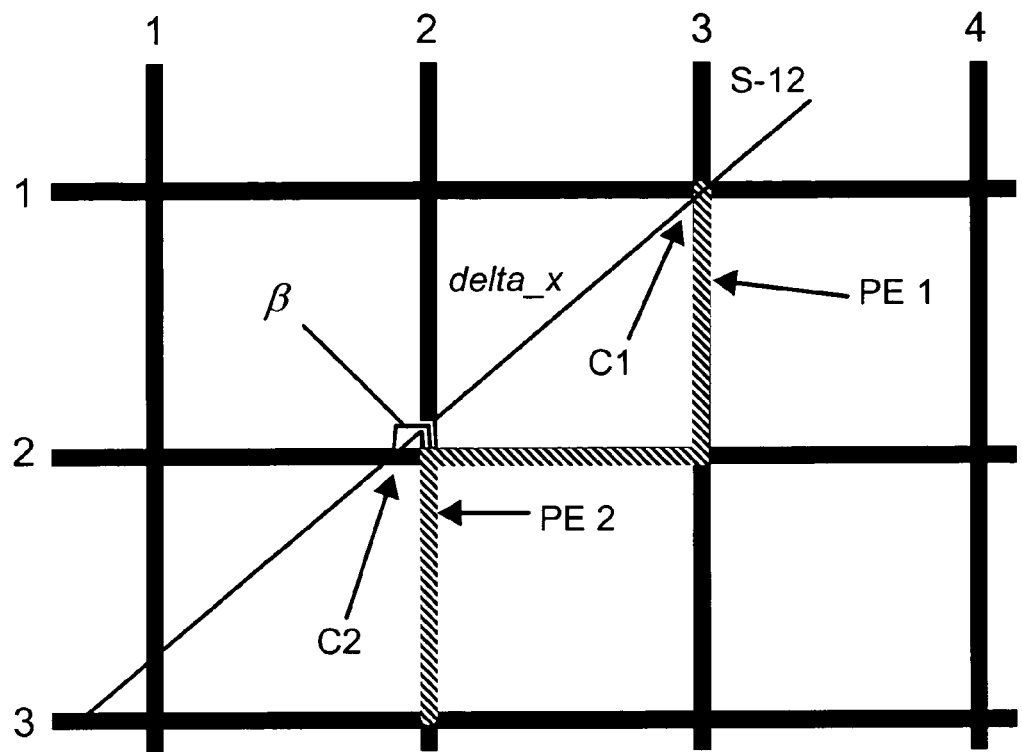
FIG. 11A shows a diagram of an example segment S-12 and corresponding pixedges produced using the ceiling rounding rules.
Figure 11B:
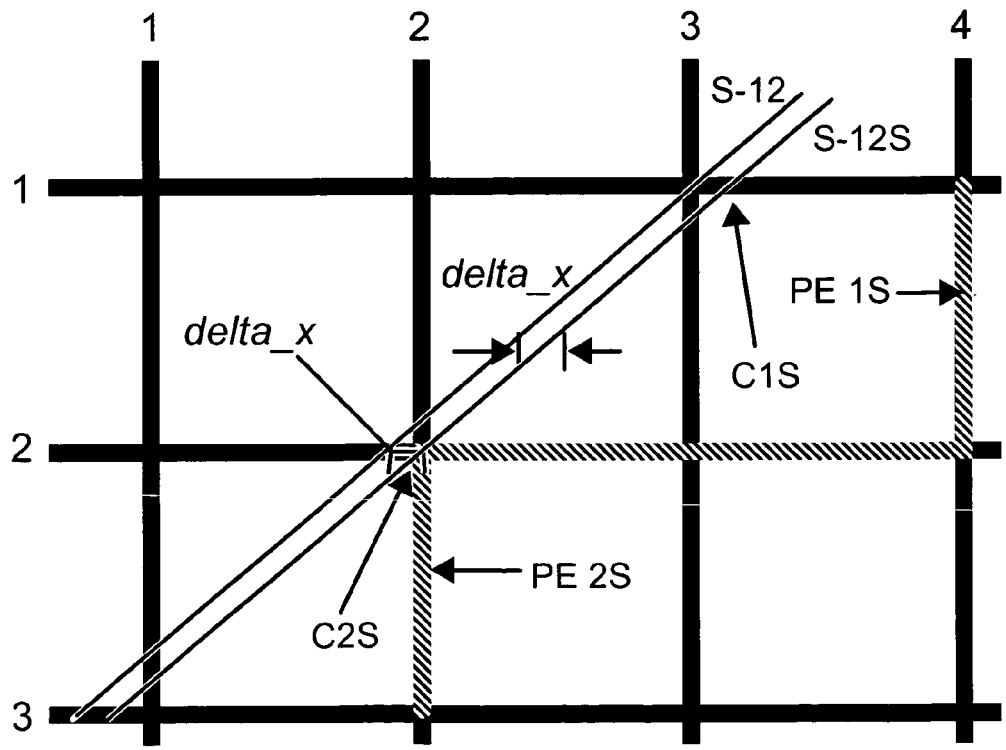
FIG. 11B shows a diagram of a shifted segment and the corresponding pixedges produced using the ceiling rounding rules.
Figure 11C:
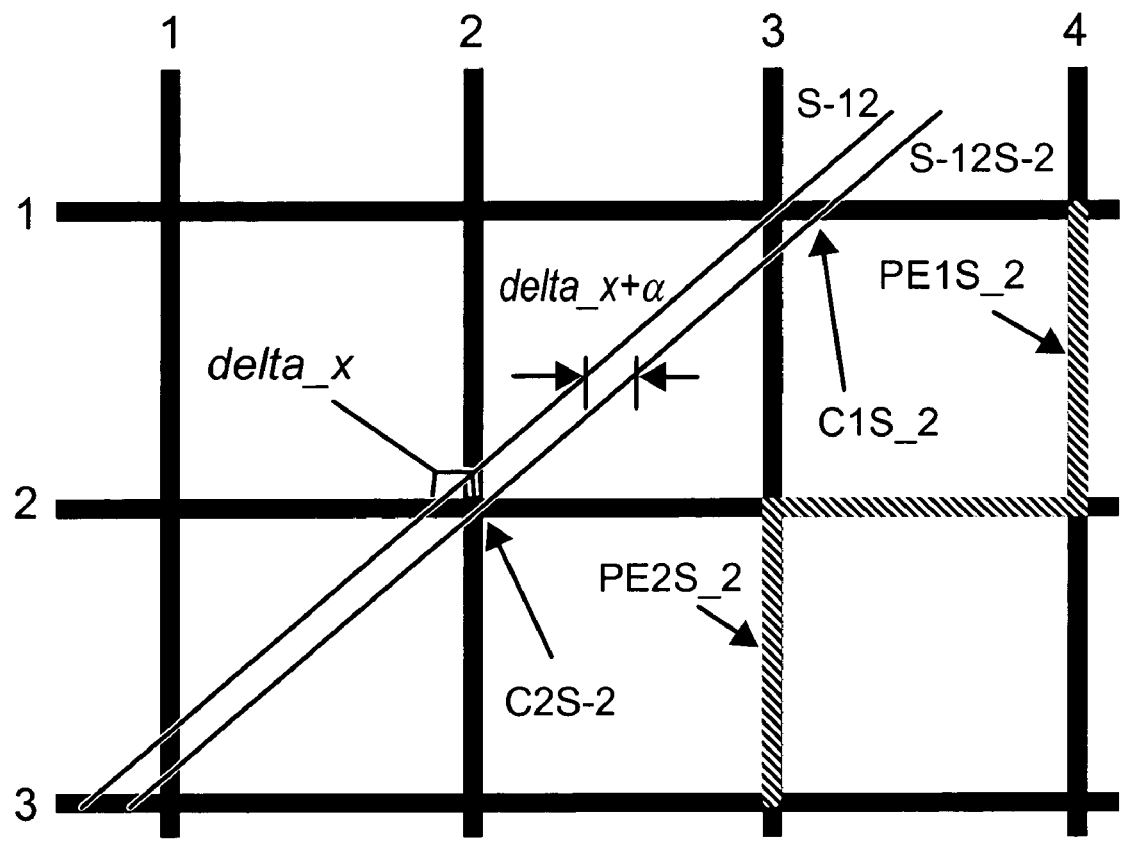
FIG. 11C shows a diagram of a further shifted segment and the corresponding pixedges produced using the ceiling rounding rules.

If a value larger than delta_x is used, then it is possible that an x crossing that occurs, for example, a distance of $$\frac{1}{2^B D_y}$$

away from an integer position will be shifted past the integer position and will consequently produce a different pixedge after the rounding rules are applied. This is illustrated in FIGS. 11A to 11C. The line segment S-12 crosses scanlines at positions C1=(3, 1), i.e. an integer x-crossing, and C2=(1.9, 2). S-12 crosses the scanline at a distance of β away from the x=2 integer position. For this example, β is the closest that the line S-12 can lie to the x=2 integer position without actually touching the integer position. In this case, delta_x is equal to β, because β represents the maximum shift that could be applied to the line S-12 without making the line cross the integer boundary x=2. If the ceiling rounding rule is applied to the line segment S-12 then the crossings at C1 and C2 produce the pixedges PE_1 and PE_2 respectively.

In FIG. 11B, the line S-12 has been shifted by delta_x to produce the line segment S-12S. The crossing points of S12-S are shown as C1S and C2S. If the ceiling rounding rule is applied to the line segment S12-S, then crossings C1S and C2S are both rounded up to produce the pixedges PE_1S and PE_2S respectively. It can be seen that the crossing C1S produces a different pixedge compared to the original crossing point C1 in FIG. 11A. However, the crossing point C2S produces the same pixedge as crossing C2. This illustrates the aim of the delta_x shift, which is to only affect segments that pass through a scanline at an integer x-position. FIG. 11C shows line segment S-12 shifted by delta_x plus α, where α is an arbitrary positive number. The shifted line segment is labeled S-12S_2. In this case the line segment S-12 has been shifted by a value greater than delta_x and this has caused not only the original integer crossing (C1), now labeled C1S-2, to produce a different pixedge, but the original crossing C2, now labeled C2S_2 also produces a different pixedge. This is because the crossing point C2 has been shifted across a scanline position and it cannot be guaranteed to produce the same pixedge as the original crossing point. Thus line segments should be shifted by delta_x or less to avoid producing errant pixedges.

Rotation Invariant Rounding Rules

The rotation rules described below accurately render an object at rotations of 90, 180 and 270 degrees. For rotations of 90 or 270 degrees, negatively-sloped line segments that have integer x crossings produce rotation variant pixedges and therefore need to be shifted off the integer value so as to produce the correct pixedge. As mentioned previously, the aim of the shifting is to nudge a segment off an integer crossing value without affecting the rounding result of any original non-integer x crossing. This shift, combined with the rotation rules, ensures that the lines can be accurately rendered.

The maximum shifting value, delta_x, that a renderer can shift a segment is derived from the general edge-tracking equation. This equation describes the real x value at any integer scanline that a segment passes through in terms of an integer and a fractional part. The position of the segment is limited to discrete values, where the discrete values depend on the ability of the renderer. This limitation is not necessarily the same as that used to represent the points of the segment. For example, the points of a segment may be represented in 28.4 fixed point format, but the renderer may use 18.14 fixed point format for edge tracking, as this provides greater accuracy in determining the position of the segment at a particular scanline.

The rotation rules assume that the reference rule (i.e. the rules used for 0 degrees rotation) produces a correctly rendered object. The reference rules used in the described arrangement are the ceiling rounding rules. The rules are dependent on the reference case using the ceiling rounding rules, that is, the rotation rounding rules will not work if the ceiling rounding rules are not used as a reference for 0 degrees rotation.

However, it will be appreciated that an analogous set of rotation rules may be developed for the case where the floor rounding rules are used for unrotated objects.

The rules are based on a segment that proceeds in the rendering direction, i.e. P1.y<P2.y, such that height is always positive. Such a segment is shown in FIG. 10 as S1. The length delta_x is also shown, being the maximum permissible shift the edge tracker can shift the line segment in the x direction to correctly apply the rotation rules. delta_x is a function of $D_y$, the number of scanlines traversed by the line segment, and the accuracy with which the edge tracker operates.

The following pixelization rules are used to render an object after the object has been rotated by the specified amount.

Where there is no rotation the reference pixelization rule is:

Apply the y ceiling rounding rule to determine first and last scanline on which x crossings are to be determined; and Apply the x ceiling rounding rule to the segment on the set of scanlines determined in the previous step.

The 90 Degree Rotation Rule

For objects that are to be rotated 90 degrees, the following rules are applied to each adjacent pair of points defining a segment in the object's path when determining pixedges. The rules are applied after the 90 degrees transformation matrix has been applied to each point within the object's path. That is, the object is rotated before the pixedges are determined.

A. If the slope of the segment is negative, then create a copy of the segment, then shift the copy in the x direction by −delta_x.

B. Determine the range of scanlines for which x crossings must be calculated, using the y ceiling rounding rule. The first scanline is ceiling(y) where y is the starting y-position of the newly-created segment. The last scanline is (ceiling(y)−1) where y is the end y-position of the newly-created segment.

C. Apply the x floor rounding rule to the newly-created segment over the range of scanlines determined in step B to determine the pixedges for the boundary of the object.

Step A and Step B are mutually exclusive and may be carried out in any order.

The 180 Degree Rotation Rule

For objects that are to be rotated 180 degrees, the following rules are applied to each adjacent pair of points defining a segment within the object's path when determining the pixedges. The rules are applied after the 180 degrees transformation matrix has been applied to each point within the object's path. That is, the object is rotated before the pixedges are determined.

A. Shift the line segment vertically by −1 scanline.

B. Determine the range of scanlines in which to calculate the x-crossing. The first scanline is (floor(y)+1): where y is the starting y-position of the segment. The last scanline is floor(y): where y is the end y-position of the segment.

C. Apply the x floor rounding rule to the segment over the range of scanlines determined in step A to determines the pixedges for the boundary of the object.

Steps A and B are the y-floor rounding rule. Note that Step A can be applied object-wise, that is to all the segments in the object in a single step.

The 270 Degree Rotation Rule

For objects that are to be rotated 270 degrees, the following rules are applied to each adjacent pair of points defining a segment within the object's path when determining the pixedges. The rules are applied after the 270 degrees transformation matrix has been applied to each point within the object's path. That is, the object is rotated before the pixedges are determined.

A. If the slope of the segment is negative, then create a copy of the segment and shift the copy in the x direction by delta_x.

B. Shift the newly created segment vertically by $-_1$ scanline.

C. Determine the range of scanlines in which to calculate the x-crossing. The first scanline is (floor(y)+1): where y is the starting y-position of the newly-created segment. The last scanline is floor(y): where y is the end y-position of the newly-created segment.

D. Apply the x ceiling rounding rule to the newly-created segment over the range of scanlines determined in step B to determine the pixedges for the boundary of the object.

Step A and Step B are mutually exclusive and may be carried out in any order. If Step B is carried out first, it can be applied to the original path such that all the segments are shifted in a single step. Steps B and C are, collectively, the y floor rounding rule.

For an A.B fixed point input space, the renderer must be able to shift a segment by a delta_x value of $1/(2^B D_y)$ or less.

Example of an Application of the Rules

Shown in FIGS. 13A, 13B, 14A, 14B and 14C are illustrative line segments with resulting pixedges for various rotations.

Each of these figures uses the following conventions:

Pixel co-ordinates are shown on the x and y axis;

The x axis pixel coordinates increase to the right;

The y axis pixel coordinates increase down the page;

The origin is always at the top left corner;

A horizontal arrow on the axis indicates the type of x rounding rule applied to the figure. In the case of a left-pointing arrow, the x floor rounding rule has been applied. In the case of a right pointing arrow, the x ceiling rounding rule has been applied;

A vertical arrow on the y axis indicates the type of y rounding rule applied to the figure. In the case of a vertical arrow pointing down the page, the y ceiling rounding rule has been applied. In the case of a vertical arrow pointing up the page, the y flooring rounding rule has been applied;

L stands for line segment;

E denotes a pixedge;

S denotes a shifted line segment;

Thick grey lines represent the pixedges resulting from a unrotated line. The resulting pixedges are rotated inline with the rotation of the specified example to provide a basis for comparison; and Black lines represent the pixedges resulting from a line rotated inline with the rotation of the specified example. Thus, if the rotation has been invariant, the grey lines and black lines coincide.

For the sake of clarity, an object's pixel space for any given scanline is the area in which pixels are rendered with the object's color or image information.

FIG. 13A is a diagram of four lines, L1, L2, L3 and L4 which are monotonic. Also shown are the resulting pixedges, E1, E2, E3, E4 produced by applying the ceiling rounding rules to the four lines L1, L2, L3, L4 respectively. For purposes of illustration, horizontal pixedges have been appended to lines E2, E3 and E4 such that the ends of E2-E4 meet the ends of the corresponding lines L2-L4. The horizontal pixedges such as that between (8,7) and (10,7) are not actually produced by the rounding rules. However, when determining an object from edges, the horizontal pixedges are not important. When traversing a scanline, the vertical edges determine the beginning an end of an object on the scanline.

Figure 13B:
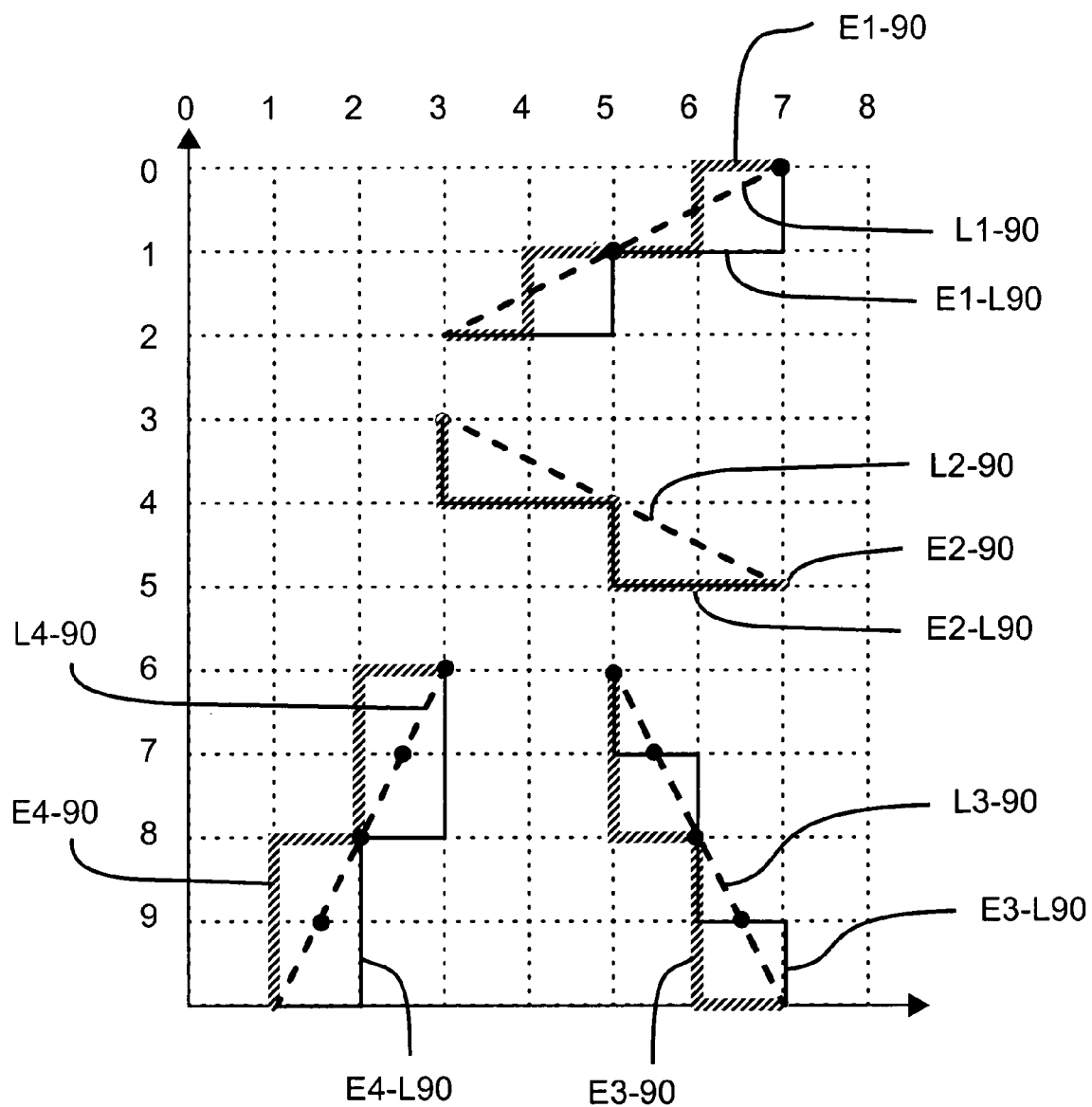
FIG. 13B shows the four line segments of FIG. 13A rotated by 90 degrees, together with the pixedges from FIG. 13A rotated 90 degrees, along with the pixedges produced by applying the GDI pixelization rules to the four rotated line segments.

FIG. 13B shows L1-90, L2-90, L3-90 and L4-90, which are lines L1, L2, L3 and L4 rotated 90 degrees. FIG. 13B also shows pixedges E1-L90, E2-L90, E3-L90 and E4-L90 that are produced by simply applying the prior art ceiling rounding rules to L1-90, L2-90, L3-90 and L4-90. For purposes of comparison the pixedges from FIG. 13A are shown, rotated 90 degrees as E1-90, E2-90, E3-90 and E4-90. Clearly, the resulting pixedges are not consistent for the two rotations. In contrast, FIG. 14A shows the rotation invariant pixedges that are produced using the rounding rules of the present disclosure.

FIGS. 14B and 14C show examples of pixedges produced when applying the rounding rules of the present disclosure to the four segments L1, L2, L3 and L4 at rotations of 180 and 270 degrees. In each case, the pixedge output results match exactly with the original unrotated cases. Note, this comparison is based only on the vertical pixedges. There are some extra horizontal pixedges present at the beginning and end of some edges. These horizontal pixedges, at the beginning and end of an edge, do not actively contribute to the pixel space of an object. When the boundary of an object is defined by edges, it is the vertical pixedges that define the pixel space of the object. The pixel space of an object is the area in which pixels are activated due to an object's fill.

The application of the rounding rules is now discussed in further detail with reference to FIGS. 13A, 13B, 14A, 14B and 14C.

Shown in FIG. 13A, is a diagram of four lines, L1, L2, L3 and L4. Also shown are the resulting pixedges, E1, E2, E3, E4 produced by applying the ceiling rounding rules to the four lines L1, L2, L3, L4 respectively.

The following describes the determination of the edges, E1, E2, E3 and E4 by applying the ceiling rounding rules, that is the x ceiling rounding rule and the y ceiling rounding rule.

The line segment L1 starts at point (0, 1) and ends at point (2, 5). Applying the y ceiling rounding rule, the starting scanline is ceiling(1)=1, and the ending scanline is ceiling (5)−1=4. Thus the x crossing positions should be calculated at scanline 1, 2, 3 and 4. These crossings are indicated by the black dots at (0.0, 1), (0.5, 2), (1.0, 3), and (1.5, 4) shown on L1. Applying the x ceiling rounding rule to the four dots on L1 yields the points (0, 1), (1, 2), (1, 3), and (2, 4). These points make up the pixedges represented by E1.

Line segment L2 starts at (5, 1) and ends at (3, 5). Therefore, according to the y ceiling rounding rule, the start and end scanlines on which x crossings need to be calculated are scanline 1, 2, 3 and scanline 4. The x ceiling rounding rule is then applied to L1, at these crossing points, to produce the pixedges represented by E2.

Line segment L3 starts at (10, 1) and ends at (6, 3). Therefore, according to the y ceiling rounding rule, the start and end scanlines on which x crossings need to be calculated are scanlines 1 and 2. The x ceiling rounding rule is applied to L2, at these crossing points, to produce the pixedges represented by E3.

Line segment L4, starts at (6, 5) and ends at (10, 7). Therefore, according to the y ceiling rounding rule, the start and end scanlines on which x crossings need to be calculated are scanlines 5 and 6. The x ceiling rounding rule is applied to L4, at these crossing points, to produce the pixedges represented by E4.

Table 1 shows the application of the 0 degrees rounding rules to the line segments L1, L2, L3 and L4 and the resulting vertical pixedges produced.

Shown in FIG. 14A are the lines from FIG. 13A rotated 90 degrees. L1-90, L2-90, L3-90 and L4-90 represent the 90 degree rotated versions of L1, L2, L3 and L4 respectively. Also shown are shifted versions of L1-90 and L4-90, denoted L1-90S and L4-90S respectively, which result from applying a −delta_x shift inline with the 90 degrees rotation rules. E1-90, E2-90, E3-90 and E4-90 represent the 90 degree rotated versions of the pixedges E1, E2, E3 and E4 (from FIG. 13A) respectively. Also, E1-L90S, E2-L90, E3-L90 and F4-L90S are the pixedges that result from applying the 90 degrees rotation rules to the line segments L1-90, L2-90, L3-90 and L4-90 respectively. The nomenclature used is that Lx-90S is Line x rotated by 90 degrees and shifted according to the rounding rule.

The line L1-90 starts at point (7, 0) and ends at point (3, 2). According to step A of the 90 degrees rotation rule, since the slope of line L1-90 is negative it needs to be shifted by −delta_x in the x direction, yielding the line L1-90S. In step B of the 90 degrees rotation rules, the y ceiling rounding rule is then applied to L1-90S to determine the first and last scanlines on which the x crossings should be calculated. The y ceiling rounding rule is applied to the start and end positions of the path. The start position of the path is scanline 0. Applying the y ceiling rounding rule to this yields 0. The end position of the path is scanline 2, and applying the y ceiling rounding rule to this yields 1. In step C of the 90 degrees rotation rules, the x floor rounding rule is applied to the point at which the path crosses scanline 0 and then scanline 1. Table 2 shows illustrates the application of the 90 degrees rotation rules to the lines L1-90, L2-90, L3-90 and L4-90 to determine the vertical pixedges produced. Shown in FIG. 14A is E1-L90S, which are the pixedges that result from applying the 90 degrees rounding rules to L1-90. It may be seen that E1-L90S produces the same vertical pixedges as E1-90.

Line segment L2-90, which starts at (3, 3) and ends at (7, 5), has a positive slope with DX of 4, therefore, according to step A of the 90 degree rotation rules, no shifting is required. In step B of the 90 degrees rotation rules, the y ceiling rounding rule is used to determine the start and end scanline to determine x crossings. Step B of the 90 degrees rotation rules yields the scanline values of 3 and 4. Step C of the 90 degrees rotation rules, the x floor rounding rule, is then applied to scanline 3 and 4 to determine the resulting pixedges. Refer to Table 2 for the results of applying the 90 degrees rotation rules to the line L2-90.

Line segment L3-90, which starts at (5, 6) and ends at (7, 10), has a positive slope of 2, therefore, according to step A of the 90 degree rotation rules, no shifting is required. In step B of the 90 degrees rotation rules, the y ceiling rounding rule is used to determine the start and end scanline to determine x crossings. Step B of the 90 degrees rotation rules yields the minimum and maximum scanline values of 6 and 9. Step C of the 90 degrees rotation rules, the x floor rounding rule, is then applied to scanlines 6, 7, 8 and 9 to determine the resulting pixedges. Refer to Table 2 for the results of applying the 90 degrees rotation rules to the line L3-90.

Line segment L4-90, which starts at (3, 6) and ends at (1, 10) has a slope of −2. According to step A of the 90 degrees rotation rules, since the slope of the line segment is negative, the line has to be shifted by −delta_x. L4-90S represents the line segment L4-90 shifted by −delta_x. Applying step B of the 90 degrees rotation rule, the y ceiling rounding rule, to the line segment L4-90S, to determine the start and end scanlines to determine x crossings, yields the minimum and maximum scanline values of 6 and 9. Step C of the 90 degrees rotation rules is then used to determine the pixedges for the line L4-90. Refer to Table 2 for the results of applying the 90 degrees rotation rules to the line L4-90.

The pixedges produced from the line segments L1-90, L2-90, L3-90 and L4-90, after applying the 90 degrees rotation rules, are shown in FIG. 14A as E1-L90S, E2-L90, E3-L90 and E4-L90S respectively. The vertical pixedges which describe the boundary of the lines L1-90, L2-90, L3-90 and L4-90 are in the same position as the vertical pixedges E1-90, E2-90, E3-90, and E4-90 that were created from an unrotated object and then rotated 90 degrees.

Shown in FIG. 14B are the lines from FIG. 13A rotated 180 degrees. L1-180, L2-180, L3-180 and L4-180 represent the 180 degree rotated versions of L1, L2, L3 and L4 respectively. Also shown are shifted versions of L1-180, L2-180, L3-180 and L4-180, denoted L1-180S, L2-180S, L3-180S and L4-180S respectively, which result from applying a −1-scanline vertical shift in line with the 180 degrees rotation rules. E1-180, E2-180, E3-180 and E4-180 represent the 180 degree rotated versions of the pixedges E1, E2, E3 and E4 (from FIG. 13A) respectively.

The following describes an example of using the 180 degrees rotation rules to achieve a pixel accurate output consistent with the unrotated case. The line segment L1-180 starts at point (8, 3) and ends at point (10, 7). According to step A of the 180 degrees rotation rules the line segment must be shifted by −1 scanlines, resulting in the line segment L1-180S. Then, according to step B of the 180 degrees rotation rules, the y floor rounding rule is used to determine the first and last scanlines on which x crossings should be calculated. The y floor rounding rule is applied to the start and end positions of the path L1-180S. The start position of the path is scanline 2, and applying the y floor rounding rule produces a result of scanline 3. The end position of the path is scanline 6, and applying the y floor rounding rule to this yields scanline 6. In step C of the 180 degrees rotation rules, the x floor rounding rule is applied to the point at which the path crosses scanlines 3, 4, 5 and then scanline 6. Table 3 shows results of applying the 180 degrees rotation rules to the lines L1-180, L2-180, L3-180 and L4-180 to determine the vertical pixedges produced. FIG. 14B shows E1-L180S, which is the pixedges that result from applying the 180 degrees rotation rules to L1-180. As may be seen, E1-L180S produces the same vertical pixedges as E1-180.

Line segment L2-180 starts at (7, 3) and ends at (5, 7). Applying step A of the 180 degrees rotation rules results in the line segment L2-180S. Then, applying step B of the 180 degrees rotation rules, the y floor rounding rule is used to determine the start and end scanlines to determine x crossings from the line segment L2-180S. Step B of the 180 degrees rotation rules yields the minimum and maximum scanline values of 3 and 6. Step C of the 180 degrees rotation rules, the x floor rounding rule, is then applied to scanlines 3, 4, 5 and 6 to determine the resulting pixedges. Refer to Table 3 for the results of applying the 180 degrees rotation rules to the line L2-180.

Line segment L3-180 starts at (4, 5) and ends at (0, 7). Applying step A of the 180 degrees rotation rules results in the line segment L3-180S. Then, applying step B of the 180 degrees rotation rules, the y floor rounding rule is used to determine the start and end scanline to determine x crossings. Step B of the 180 degrees rotation rules yields the minimum and maximum scanline numbers of 5 and 6. Step C of the 180 degrees rotation rules, the x floor rounding rule, is then applied to scanlines 5 and 6 to determine the resulting pixedges. Refer to Table 3 for the results of applying the 180 degrees rotation rules to the line L3-180.

Line segment L4-180 starts at (0, 1) and ends at (4, 3). Applying step A of the 180 degrees rotation rules results in the line segment L4-180S. Then, applying step B of the 180 degrees rotation rules, the y floor rounding rule is used to determine the start and end scanline to determine x crossings. Step B of the 180 degrees rotation rules yields the minimum and maximum scanline numbers of 1 and 2. Step C of the 180 degrees rotation rules, the x floor rounding rule, is then applied to scanlines 1 and 2 to determine the resulting pixedges. Refer to Table 3 for the results of applying the 180 degree rotation rules to the line L4-180.

The pixedges produced from the line segments L1-180, L2-180, L3-180 and L4-180, after applying the 180 degrees rotation rules, are shown in FIG. 14B as E1-L180S, E2-L180S, E3-L180S and E4-L180S respectively. Again, the vertical pixedges which describe the lines L2-180, L3-180 and L4-180 are in the exact same position as the vertical pixedges E1-180, E2-180, E3-180, and E4-180 that were created from an unrotated object and then rotated 180 degrees.

FIG. 14C shows the lines from FIG. 13A rotated 270 degrees. L1-270, L2-270, L3-270 and L4-270 represent the 270 degree rotated versions of L1, L2, L3 and L4 respectively. Also shown are shifted versions of L1-270, L2-270, L3-270 and L4-270, denoted L1-270S, L2-270S, L3-270S and L4-270S respectively, which result from applying a shift by delta-x horizontally and −1 scanline vertically in line with the 270 degrees rotation rules. E1-270, E2-270, E3-270 and E4-270 represent the 270 degree rotated versions of the pixedges E1, E2, E3 and E4 (from FIG. 13A) respectively.

The following describes an example of using the 270 degrees rotation rules to achieve a pixel accurate output consistent with the unrotated case. The line segment L1-270 starts at point (5, 8) and ends at point (1, 10). According to step A of the 270 degrees rotation rules line segment L1-270 must be shifted by −1 scanline. Also, according to step B of the 270 degrees rotation rules, since the slope of the line L1-270 is 2/−4=−0.5, the line L1-270 must be shifted by delta_x. The resulting line is shown as line L1-270S. In step C of the 270 degrees rotation rules, the y floor rounding rule is used to determine the first and last scanlines on which the x crossings should be calculated. The y floor rounding rule is applied to the start and end positions of the path L1-270S. The start position of the path is scanline 7, and applying the y floor rounding rule to this produces a result of scanline 8. The end position of the path is scanline 9, and applying the y floor rounding rule to this yields scanline 9. In step D of the 270 degrees rotation rules, the x ceiling rounding rule is applied to the point at which the path crosses scanlines 8 and scanline 9. Table 4 shows the result of applying the 270 degrees rotation rules to the lines L1-270, L2-270, L3-270 and L4-270 to determine the vertical pixedges produced. FIG. 14C shows E1-L270S, which is the pixedges that result from applying the 270 degrees rotation rules to L1-270. As may be seen, E1-L270S produces the same vertical pixedges as E1-270.

Line L2-270 starts at (1, 5) and ends at (5, 7), it has a slope of 2/4=0.5. Applying step A of the 270 degrees rotation rules results in the line segment L2-270S. Since the slope of the line L2-270 is not negative, according to step B of the 270 degrees rotation rules, the line does not need to be shifted by delta_x. So step C of the 270 degrees rotation rules is applied to the line L2-270S to determine the start and end scanlines to determine x crossings. Step C of the 270 degrees rotation rules yields the scanlines 5 and 6. Step D of the 270 degrees rotation rules, the x ceiling rounding rule, is then applied to scanlines 5 and 6. Refer to Table 4 for the results of applying the 270 degrees rotation rules to the line L2-270.

Line L3-270 starts at (1, 0) and ends at (3, 4), it has a slope of 4/2=2. Applying step A of the 180 degrees rotation rules results in the line segment L3-270S. Since the slope of the line L3-270 is not negative, according to step B of the 270 degrees rotation rules, the line does not need to be shifted by delta_x. Applying step C of the 270 degrees rotation rules, the y floor rounding rule, to L3-270S produces the minimum and maximum scanline values of 0 and 3. Step D of the 270 degrees rotation rules, the x ceiling rounding rule, is then applied to scanlines 0, 1, 2, and 3 to determine the resulting pixedges. Refer to Table 4 for the results of applying the 270 degrees rotation rules to the line L3-270.

Line L4-270 starts at (7, 0) and ends at (5, 4), and has a slope of −2. According to step A of the 180 degrees rotation rules the line segment L4-270 must be shifted by −1 scanlines. According to step B of the 270 degrees rotation rules, the line L4-270 also needs to be shifted by delta_x. The resulting shifted line is shown as L4-270S. In step C of the 270 degrees rotation rules, the y ceiling rounding rule is used to determine the start and end scanline to determine x crossings. Step C of the 270 degrees rotation rules yields the minimum and maximum scanline values of 0 and 3. Step D of the 270 degrees rotation rules, the x ceiling rounding rule, is then applied to scanlines 0, 1, 2, and 3 to determine the resulting pixedges. Refer to Table 4 for the results of applying the 270 degrees rotation rules to the line L4-270.

The pixedges produced from the line segments L1-270, L2-270, L3-270 and L4-270, after applying the 270 degrees rotation rules, are shown in FIG. 14C as E1-L270S, E2-L270S, E3-L270S and E4-L270S respectively. Again, the vertical pixedges which describe the lines L1-270, L2-270, L3-270 and L4-270 are in the exact same position as the vertical pixedges E1-270, E2-270, E3-270, and E4-270 that were created from an unrotated object and then rotated 270 degrees.

Updating Edges

In a graphics rendering system, it may be appropriate to use different edge types, depending on the object to be drawn. For example, a PostScript Edge may be used to efficiently render thin lines, because every pixel that is "touched" by a PostScript edge is turned on, whereas GDI edges can be used to efficiently define the boundary of an object. Each edge type has a different set of rules used to determine the pixels that are activated. In a page to be rendered, the graphics rendering system can choose the edge type that is to be associated with a particular type of object, depending on the required outcome. Therefore, there can be many different types of edges in a display list of a page to be rendered. Typically, the renderer updates an edge as the edge passes across the scanline. However, as mentioned earlier, this is very inefficient. A more practical approach is to group all edges of the same type together and then to update those edges in a batch at the end of the scanline according to their pixelization rule. The grouped edges are passed into their specific update function according to their edge type. The update function of the current edge type can then update each edge in the group using the same pixelization rule. This means that the update functions specific to each edge type are only ever called once per scanline, thus saving function overhead time. Such an arrangement may greatly improve the speed at which the rendered can produce pixel data.

Fast-Tracking Edges

As discussed above, not all objects in the display list will necessarily appear in the region currently being rendered. The rendering system may only be required to render a portion of a page, or the objects may actually lie outside the bounds of the page. To overcome inefficiency problems that arise in tracking off-the-page edges to the start scanline of the region to be rendered (or "current scanline"), the present arrangement can "fast track" an edge to the current scanline. The display list is read in and all the edges that are active or become active on or before the scanline to be rendered are "fast tracked" to the current scanline. This is done by determining the intersection of each edge with the current scanline and updating the x position of the edge accordingly. This is achieved by using the linear equation of a line to find the edge position at the current scanline. Any edges that do not reach the current scanline can simply be discarded. This method avoids the need to process all scanlines before the current scanline. This greatly reduces the processor effort that is needed to start rendering from the current scanline and hence speeds up the rendering process when there are edges that start outside of the current region to be rendered.

Figure 22A:
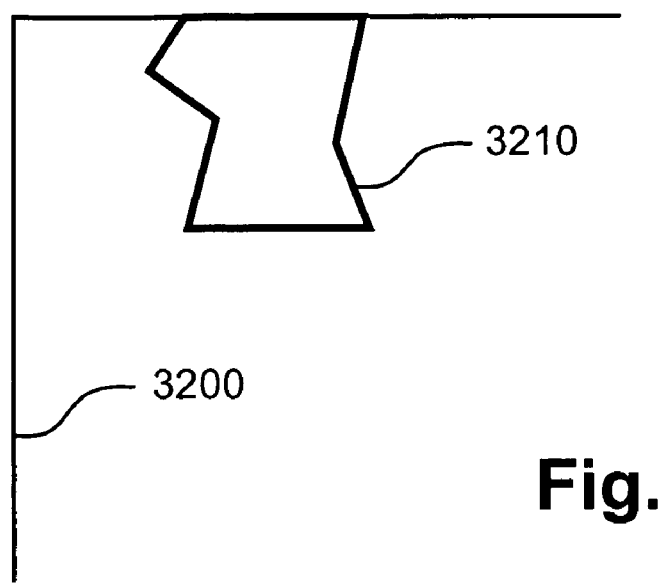
FIG. 22A shows an example of a page containing a graphic object.
Figure 22B:
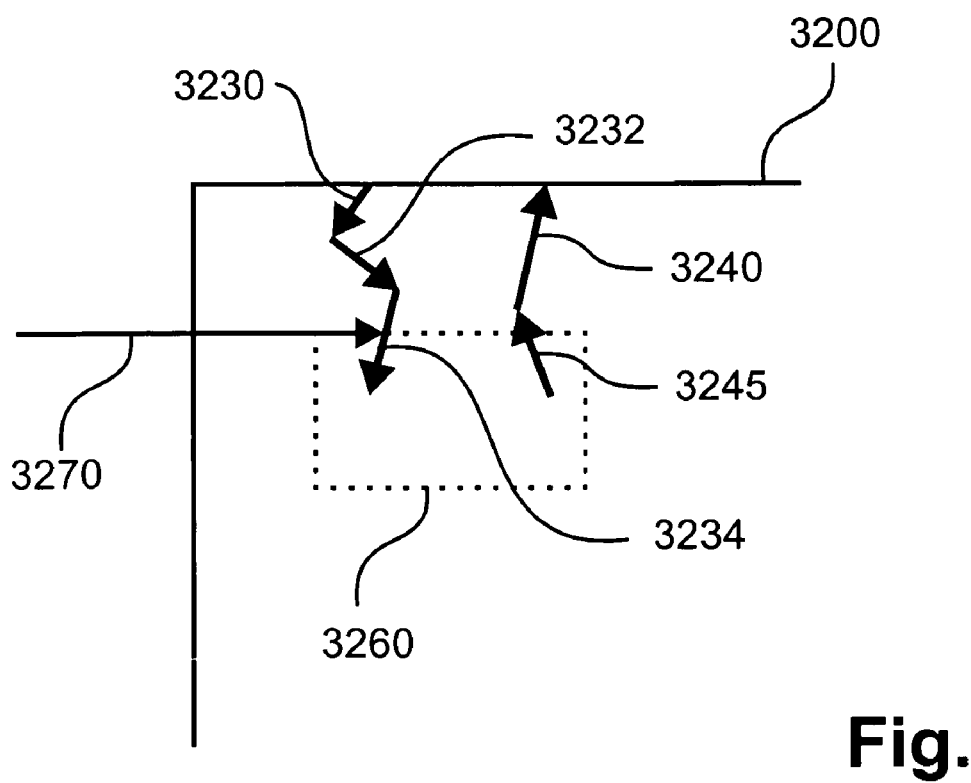
FIG. 22B shows the relationship of the graphic object of FIG. 22A and an area to be rendered.

FIG. 22A shows an example of a page 3200 to be rendered, containing graphics object 3210. The boundary of the graphics object 3210 is converted into edges as shown in FIG. 22B. FIG. 22B shows these edges as comprising a set of left segments 3230, 3232 and 3234 and a set of right segments 3240 and 3245. Also shown in FIG. 22B is an area 3260 to be rendered. The current scanline of the renderer 3270 is also shown. If the renderer were only asked to render the region 3260, then typically the renderer would need to pass along every scanline prior to scanline 3270 and update the active edges to coincide with the next scanline. By contrast, the arrangement using fast-tracking calculates the exact position of the edge without needing to pass along all the previous scanlines on which edges are active. The renderer simply determines that the third segment 3234 of the left edge crosses the scanline 3270. Then, using the starting position of this segment and its dx value, the renderer can determine the intersection of the segment with the current scanline 3270. The intersection point then becomes the position of the edge for the current scanline 3270. The same technique is used for all edges that have become active before the current scanline.

A Method of Rendering Graphical Objects

Figure 15:
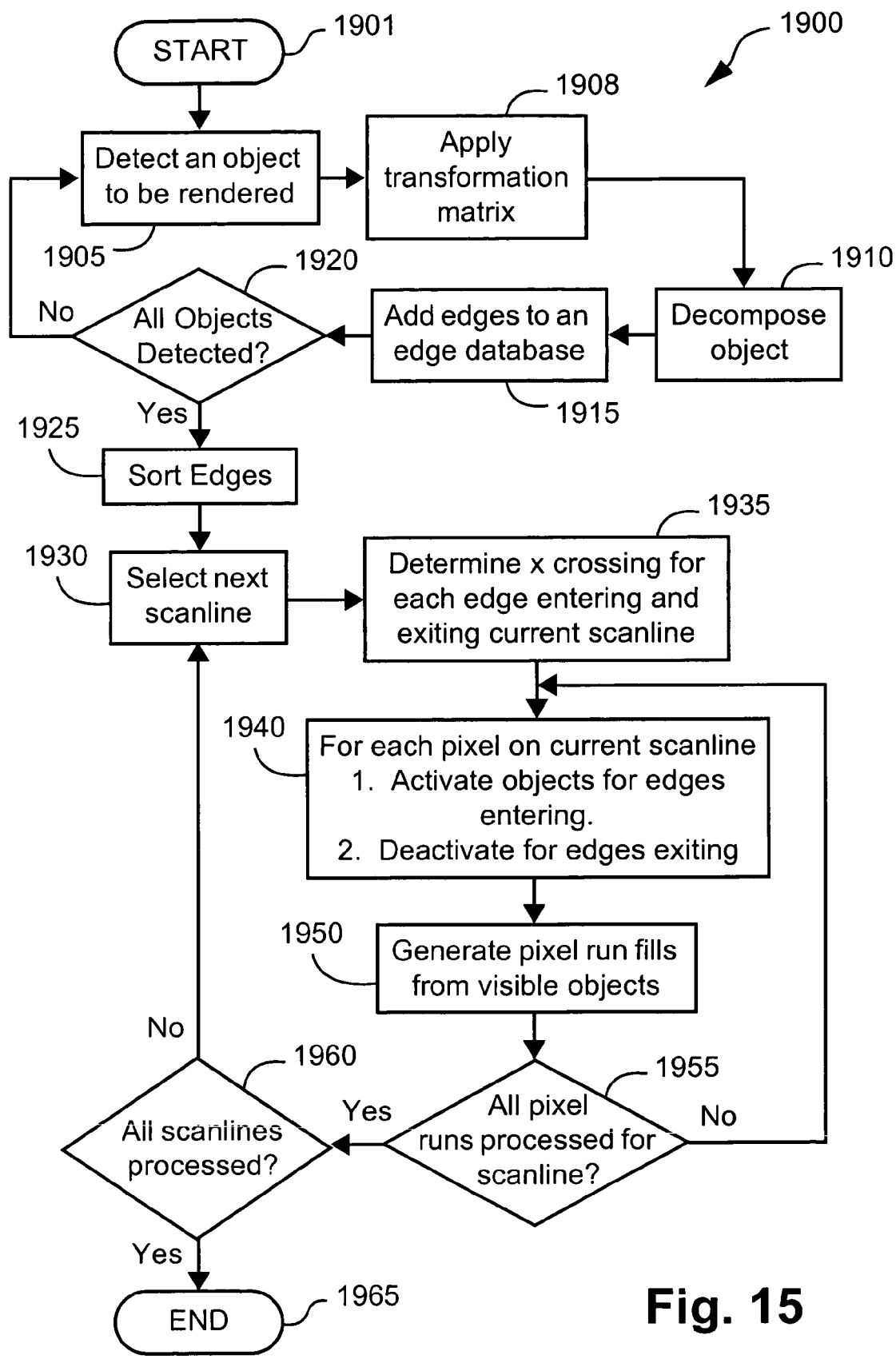
FIG. 15 shows a flow diagram of a method of rendering an object.

A method 1900 of rendering graphical objects that uses the rotation-invariant rounding rules is described below with reference to FIG. 15. The principles of the method 1900 have general applicability to the rendering of graphical objects. However, for ease of explanation, the steps of the method 1900 are described with reference to the rendering of graphical objects for printing on a page. It is not intended that the present invention be limited to the described arrangement. For example, the method 1900 may have application to the rendering of graphical objects for display on a liquid-crystal or other display device that has the characteristic that dots that comprise the displayed image are either fully present or fully absent. Such display devices are often driven by embedded computing systems having extremely constrained memory and performance.

Figure 1:
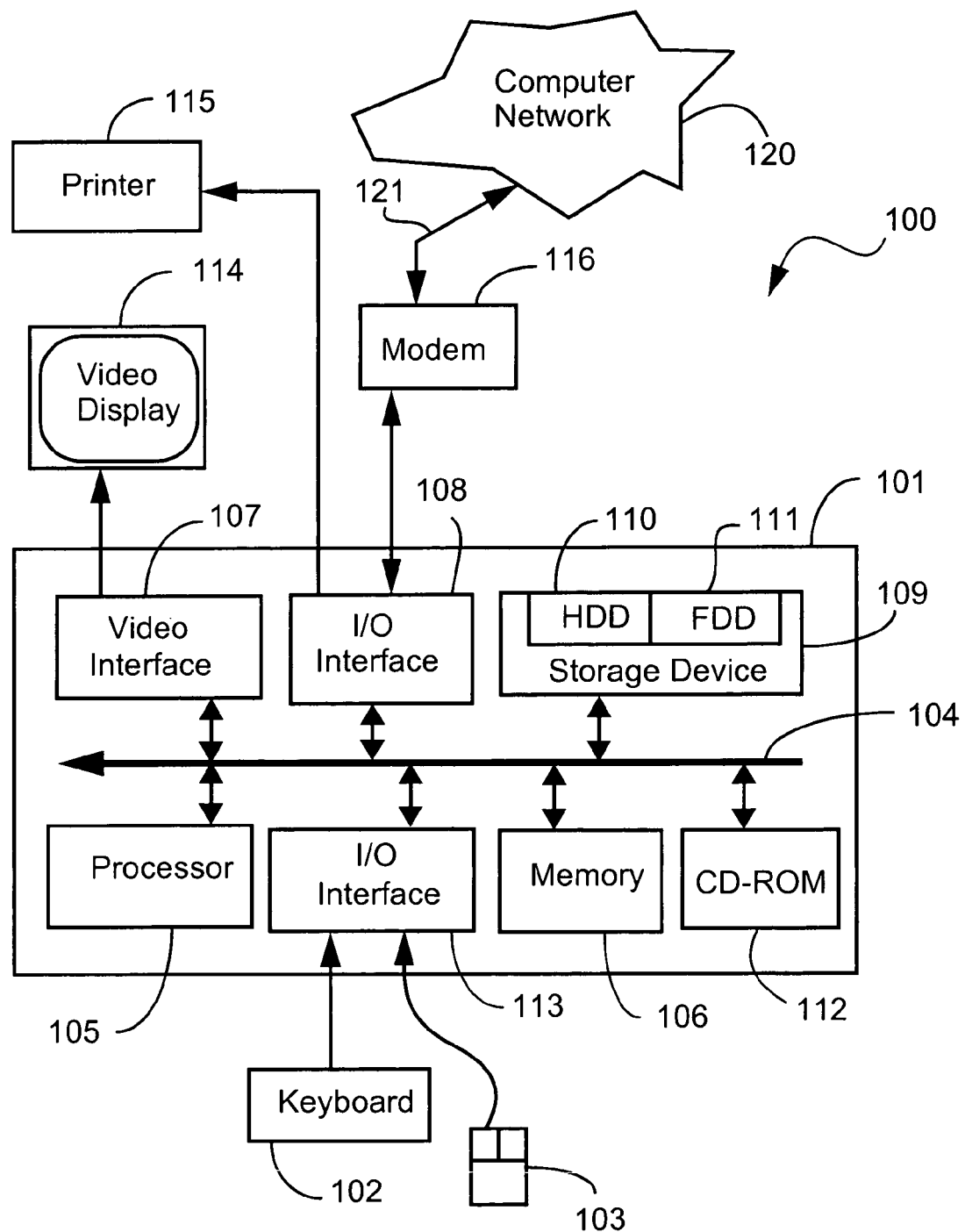
FIG. 1 is a schematic diagram of a computer system on which the methods of the present disclosure may be implemented.

The method 1900 is preferably practiced using a general-purpose computer system 100, such as that shown in FIG. 1 wherein the processes of FIGS. 15 to 24 may be implemented as software, such as an application program executing within the computer system 100. In particular, the steps of the method 1900 described below are effected by instructions in the software that are carried out by the computer. The instructions may be formed as one or more code modules, each for performing one or more particular tasks. The software may also be divided into two separate parts, in which a first part performs the method 1900 and a second part manages a user interface between the first part and the user. The software may be stored in a computer readable medium, including the storage devices described below. The software is loaded into the computer from the computer readable medium, and then executed by the computer. A computer readable medium having such software or computer program recorded on it is a computer program product. The use of the computer program product in the computer preferably effects an advantageous apparatus for implementing the arrangements described herein.

The computer system 100 comprises a computer module 101, input devices such as a keyboard 102 and mouse 103, output devices including a printer 115 and a display device 114. A Modulator-Demodulator (Modem) transceiver device 116 is used by the computer module 101 for communicating to and from a communications network 120, for example connectable via a telephone line 121 or other functional medium. The modem 116 can be used to obtain access to the Internet, and other network systems, such as a Local Area Network (LAN) or a Wide Area Network (WAN).

The computer module 101 typically includes at least one processor unit 105, a memory unit 106, for example formed from semiconductor random access memory (RAM) and read only memory (ROM), input/output (I/O) interfaces including a video interface 107, and an I/O interface 113 for the keyboard 102 and mouse 103 and optionally a joystick (not illustrated), and an interface 108 for the modem 116. A storage device 109 is provided and typically includes a hard disk drive 110 and a floppy disk drive 111. A magnetic tape drive (not illustrated) may also be used. A CD-ROM drive 112 is typically provided as a non-volatile source of data. The components 105 to 113 of the computer module 101, typically communicate via an interconnected bus 104 and in a manner which results in a conventional mode of operation of the computer system 100 known to those in the relevant art. Examples of computers on which the described arrangements can be practiced include IBM-PCs and compatibles, Sun Sparcstations or alike computer systems evolved therefrom.

Typically, the application program is resident on the hard disk drive 110 and read and controlled in its execution by the processor 105. Intermediate storage of the program and any data fetched from the network 120 may be accomplished using the semiconductor memory 106, possibly in concert with the hard disk drive 110. In some instances, the application program may be supplied to the user encoded on a CD-ROM or floppy disk and read via the corresponding drive 112 or 111, or alternatively may be read by the user from the network 120 via the modem device 116. Still further, the software can also be loaded into the computer system 100 from other computer readable media. The term "computer readable recording medium as used herein refers to any storage medium that participates in providing instructions and/or data to the computer system 100 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 101. Examples of computer readable transmission media that may communicate the instructions and/or data include radio or infra-red transmission channels as well as a network connection to another computer or networked device, and the Internet or Intranets including email transmissions and information recorded on websites and the like.

The methods 1900, 2100, 2300, 2500 and 2700 can alternatively be implemented in dedicated hardware such as one or more integrated circuits performing the functions or sub-functions of FIGS. 15, 16, 17, 18 and 19. Such dedicated hardware may include graphic processors, digital signal processors, or one or more microprocessors and associated memories.

The steps of the method 1900 are performed on a scanline basis as a rendering system generates runs of pixel data from one edge crossing to the next, and are performed on demand.

In the method 1900, an image is rendered utilizing a display list or array of graphical objects representing the image. At the final output stage, or at the time of deducing pixel runs, color correction and half-toning of the pixel data may be carried out before being output for printing on a page.

The method 1900 is preferably implemented as an application program being resident on the hard disk drive 110 and being read and controlled in its execution by the processor 105.

The method 1900 begins at step 1901 after which step 1905 is carried out. In step 1905, the processor 105 detects a first graphical object to be rendered. At the next step 1908, the graphical object is rotated according to its transform requirements. This may be a rotation of either 90, 180, 270 degrees or no rotation. For objects that are rotated 180 or 270 degrees, each object is also shifted by the equivalent of −1 scanline as per the rotation rules previously described. At the next step 1910, the graphical object is decomposed by the processor 105 into a set of edges defining the object, priority information for the object, a raster operation for the object and a corresponding winding rule for the object. The method 1900 continues at the next step 1915 where the set of edges defining the object is added to an edge database configured within memory 106. At the next step 1920, if all objects of the image have been received by the processor 105, then the method 1900 continues at the next step 1925. Otherwise, the method 1900 returns to step 1905 to process further objects.

At step 1925, the edges stored in the edge database configured within memory 106, are sorted according to ascending y-coordinate, ascending x-coordinate, and ascending priority order (ie z-order). At the next step 1930, the processor 105 selects a scanline for the image to be rendered and continues to step 1935. In step 1935, the discrete x crossing positions for edges entering and exiting the scanline are calculated using method 2100, 2300, 2500 or 2700 depending on the rotation of the object represented by the active edges. For objects that have not been rotated, the method 2100 is used to determine the x crossing positions of the edges. For 90, 180 and 270 degrees rotation the methods 2300, 2500 and 2700 are used respectively.

In step 1935, when applying method 2100, 2300, 2500, or 2700, a shift by delta_x that has been applied to the current segment does not affect the starting position of the next segment. A copy of the original segment is shifted so as not to affect the position of any other segment. At step 1935, if the current scanline is the first scanline to be rendered but there are one or more edges that start before this scanline, then the method to fast track these edges to the current scanline can be used. This involves determining the intersection of each edge that starts before the current scanline with the current scanline. Since the starting position and the slope of the edge is known at any point, the intersection can easily be determined by simple linear equations. An example of fast edge tracking is shown later.

Once the discrete edge positions have been determined in step 1935 for the current scanline, the method 1900 proceeds to step 1940. In step 1940, for each pixel run on the scanline selected at step 1930, objects having an edge entered by the scanline are activated and objects having an edge exited by the scanline are de-activated. The method 1900 then proceeds to step 1950. At step 1950, fill data for all visible objects of the current pixel run is composited together to generate data for the pixel run. Also at step 1950, the data for the current pixel run may be halftoned and/or color corrected before being output for printing. At the next step 1955, if all pixel runs have been processed for the current scanline, then the method 1900 continues at the next step 1960. Otherwise, the method 1900 returns to step 1940 to process further pixel runs.

At step 1960, if all scanlines have been processed for the image to be rendered, then the method 1900 concludes at step 1965. Otherwise, the method 1900 returns to step 1930 where a next scanline is selected by the processor 105.

Figure 16:
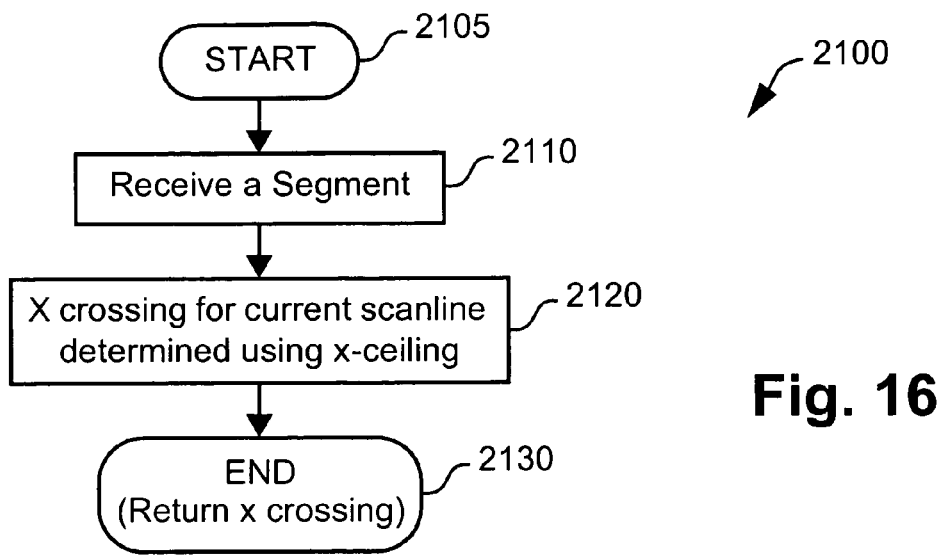
FIG. 16 shows a flow diagram of a method for determining the integer x-crossing value for the current scanline for unrotated objects.

FIG. 16 shows a method 2100 that is used to determine an x crossing in step 1935 for the current scanline from a line segment of an object that has not been rotated.

The method 2100 starts at step 2105, after which step 2110 is carried out. At step 2110 a segment is received from step 1935 of method 1900. The method 2100 then proceeds to step 2120.

At step 2120, the x ceiling rule is used to determine the x crossing point for the segment at the current scanline. The method 2100 then proceeds to step 2130, in which the x crossing is returned to step 1935 of the method 1900.

Figure 17:
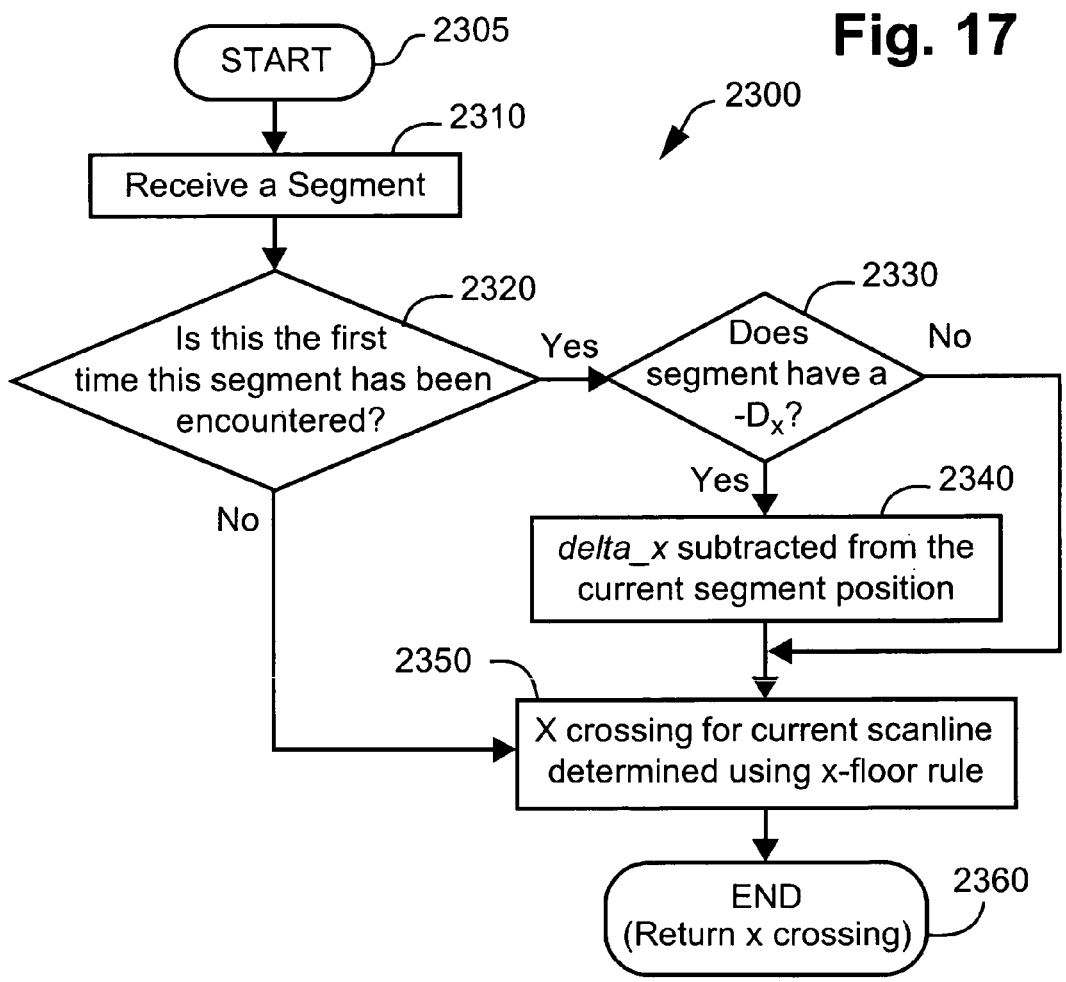
FIG. 17 shows a flow diagram of a method for determining the integer x-crossing value for the current scanline for objects that have been rotated by 90 degrees.

FIG. 17 shows the method 2300 which is used to determine an x crossing for the current scanline from the segment of an object that has been rotated 90 degrees.

The method 2300 starts at step 2305, after which step 2310 is carried out. At step 2310 a segment is received from step 1935 of method 1900. The method 2300 then proceeds to step 2320. At step 2320, if this is the first time this segment has been encountered by method 2300, the method 2300 proceeds to step 2330, otherwise the method 2300 proceeds to step 2350.

At step 2330, if the segment has a negative slope, the method 2300 proceeds to step 2340, otherwise the method 2300 proceeds to step 2350.

At step 2340, delta_x=$(1/(2^B D_y))$ is subtracted from the current edge x position. Since delta_x is dependent on $D_y$, the value of delta_x is calculated to determine the maximum shift which the renderer may apply to the segment. If the renderer can shift the points by delta_x or less without needing to increase the precision of the segment then the current precision is used. If the current precision cannot shift the line by delta_x or less, then the precision used to calculate the segment position is increased in proportion to the required precision. The segment is then shifted by delta_x using the increased precision. The fixed point space, in one implementation, is 28.4, so delta_x is equivalent to $1/(16 \cdot D_y)$ for the lowest precision case. The method 2300 then proceeds to step 2350.

At step 2350 an integer x crossing for the segment is determined for the current scanline using the x floor rule. The method 2300 then proceeds to step 2360, in which the x crossing is returned to the step 1935 of the method 1900.

Figure 18:
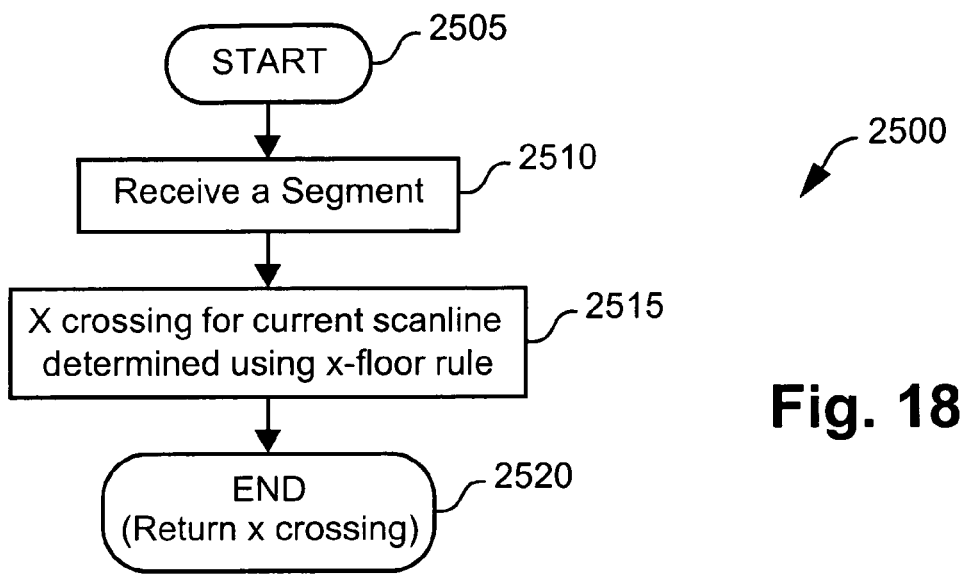
FIG. 18 shows a flow diagram of a method for determining the integer x-crossing value for the current scanline for objects that have been rotated by 180 degrees.

FIG. 18 shows the method 2500 which is used to determine an x crossing for the current scanline from the segment of an object that has been rotated 180 degrees.

The method 2500 starts at step 2505, after which step 2510 is carried out. At step 2510 a segment is received from step 1935 of method 1900. The method 2500 then proceeds to step 2515. At step 2515, the x floor rule is used to determine the x crossing point for the segment at the current scanline. The method 2500 then proceeds to step 2520, in which the x crossing is returned to the step 1935 of the method 1900.

Figure 19:
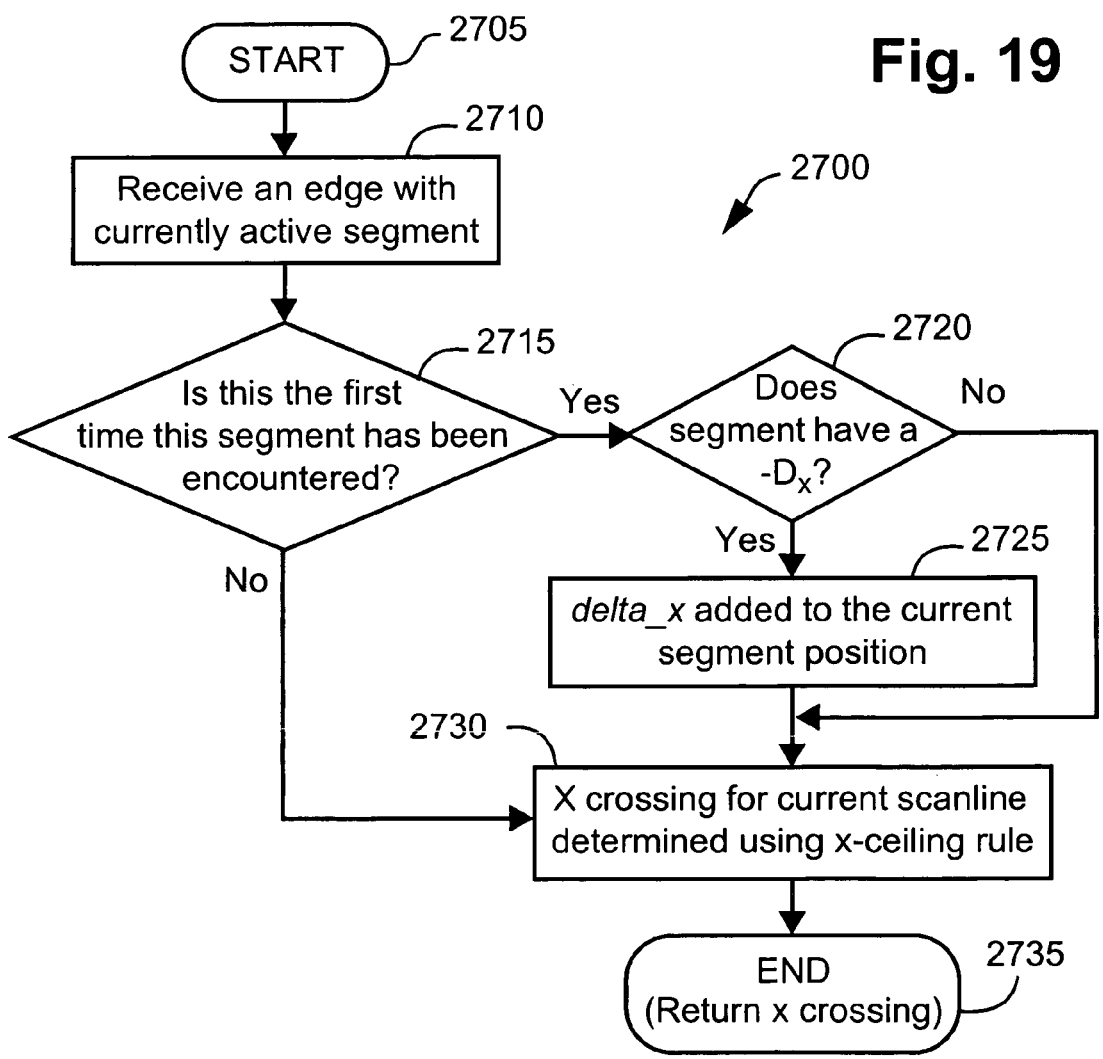
FIG. 19 shows a flow diagram of a method for determining the integer x-crossing value for the current scanline for objects that have been rotated by 270 degrees.

FIG. 19 shows the method 2700 which is used to determine an x crossing for the current scanline from the segment of all object that has been rotated 270 degrees.

The method 2700 starts at step 2705, after which step 2710 is carried out. At step 2710 a segment is received from step 1935 of method 1900. The method 2700 then proceeds to step 2715. At step 2715, the method 2700 determines if this is the first time this segment has been encountered, and if so, the method 2700 proceeds to step 2720. If the segment has been previously encountered, the method 2700 proceeds to step 2730. At step 2720, the segment is tested to see if it has a negative $D_x$, i.e. whether the slope of the segment is negative. If the slope is negative, then the method 2700 proceeds to step 2725, otherwise the method 2700 proceeds to step 2730.

At step 2725, delta_x $(1/(2^B D_y))$ is added to the current edge x position. Since delta_x is dependent on $D_y$, the value of delta_x is calculated to determine the maximum shift which the renderer may apply to the segment. If the renderer can shift the points by delta_x or less without needed to increase the precision of the segment then the current precision is used. If the current precision cannot shift the line by delta_x or less, then the precision used to calculated the segment position is increased. The segment is then shifted by delta_x using the increased precision. The fixed point space, in one implementation, is 28.4, so delta_x is equivalent to $1/(16 \cdot D_y)$ for the lowest precision case. The method 2700 then proceeds to step 2730.

At step 2730, the x ceiling rule is used to determine the x crossing point for the edge at the current scanline. The method 2700 then proceeds to step 2735, in which the x crossing is returned to step 1935 of the method 1900.

Figure 20:
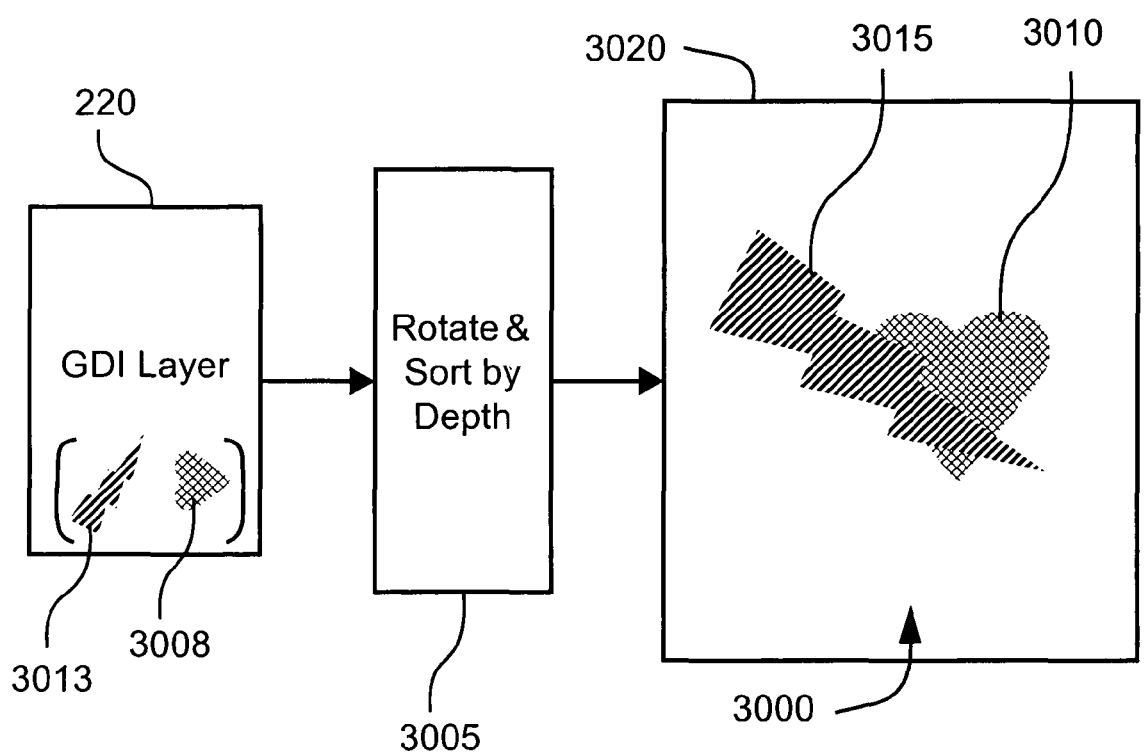
FIG. 20 shows an example of rendering objects that are rotated by 90 degrees.
Figure 21:
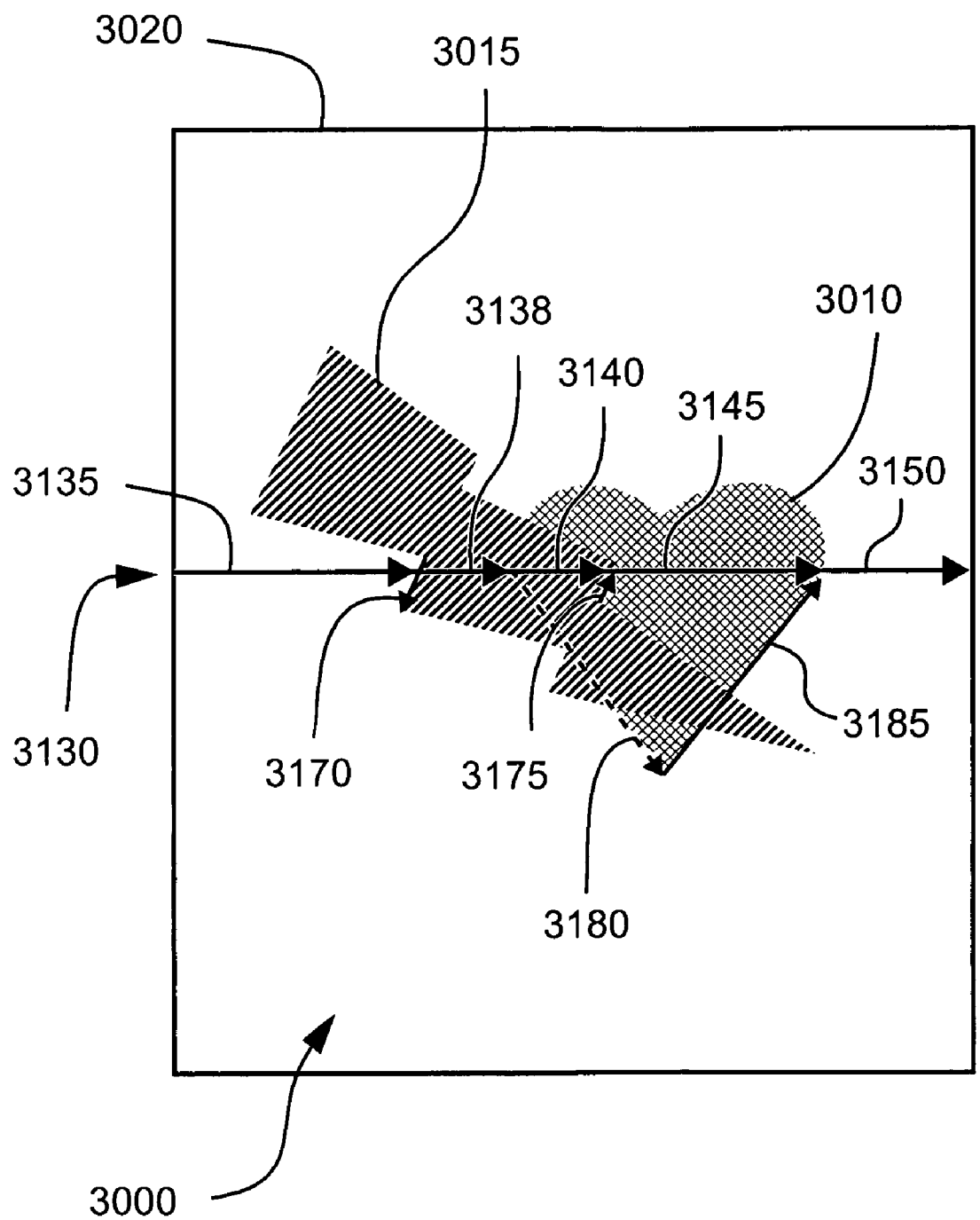
FIG. 21 shows an example of rendering a single scanline for the page which contains the objects of FIG. 20.

FIGS. 20 and 21 show an example of rendering a scanline with the method 1900. Two objects 3013 and 3008 are shown in this example. Objects 3013 and 3008 are passed by the GDI layer 220 to the renderer. The objects are received by the method 1900 in step 1905 whereafter, in step 3005 which corresponds to steps 1908 to 1925, the objects are rotated 90 degrees, decomposed and sorted, ready to be rendered on a scanline per scanline basis. The resulting page 3020 and the final rendered image 3000 can be seen in both FIGS. 20 and 21. The original objects 3008 and 3013 have both been rotated by 90 degrees to form the rotated objects 3010 and 3015 respectively. Opaque object 3015 has a higher priority than object 3010 and lies over the lower left-hand portions of object 3010.

FIG. 21 shows the details of rendering scanline 3130, on which pixel runs 3135, 3138, 3140, 3145 and 3150 are generated. Scanlines are preferably generated downwards from the top of a page 3020 to be rendered. However, a person skilled in the relevant art would appreciate that scanlines can also be generated from the bottom of the page 3020. FIG. 21 shows the step 1930 of method 1900 selecting scanline 3130 as the next scanline to render. For the scanline 3130, edges 3170 and 3180 enter the scanline 3130, whereas edges 3175 and 3185 exit the scanline 3130. Edges 3170 and 3175 are, respectively, the left edge and the right edge of object 3015 on scanline 3130. Edges 3180 and 3185 are, respectively, the left and the right edge of object 3010 on scanline 3130.

For simplicity only the edges that are entering and exiting the scanline 3130 are shown. Also, each edge that is shown is made up of one exactly one segment. Step 1935 of method 1900 determines the x position of the edges for the current scanline. Typically, the position of an edge on a scanline is determined from the x position of the edge on the previous scanline and the slope of the edge using the general edge tracking equation $X_r(n)$. Step 1935 then uses the x crossing positions of the edges to determine the discrete position of the edge (i.e. the pixedge) by using either method 2100, 2300, 2500 or 2700 depending on the rotation of the original objects. In this example, all the objects have been rotated by 90 degrees and so the method 2300 is called upon to determine the discrete position of the edges on scanline 3130. Method 2300 accepts segments, and, since each edge in this case consists of a single segment, the edge can be passed to method 2300. Method 2300 uses the 90 degrees rounding rules to determine the discrete position of each edge on scanline 3130. After step 1935 is carried out, the discrete position of the edges has been determined for the current scanline and the method 1900 can proceed to step 1940. Steps 1940, 1950 and 1955 are then carried out and repeated for each pixel run on the current scanline. Hence, pixel runs 3135, 3138, 3140, 3145 and then 3150 are rendered sequentially to produce the rendered pixels of scanline 3130. Pixel run 3135 is the run of pixels from the left of the page to the left edge of object 3015. No objects are active and so the background fill is rendered. Pixel runs 3138 and 3140 extend from the left edge 3170 to the right edge 3175 of object 3015. The fill of object 3015 is rendered in pixel run 3138. Pixel run 3145 extends from the right edge 3175 of object 3015 to the right edge 3185 of object 3010. Object 3010 is visible in pixel run 3145. Finally, pixel run 3150 contains the background fill from the right edge 3185 of object 3010 to the right of the page 3020.

Rotation of Individual Objects

In many cases, a page has a single rotation related to it such that all objects on the page are rotated by the same amount. For example all objects on the page may be rotated by 270 degrees. It is, however, feasible to relate a rotation to an edge, such that individual objects may be handled differently depending on the rotation of its edges.

Simplified Implementation of Rotation Invariant Rounding

The aim of the method described above is to shift a segment off an integer position (under certain circumstances). A point must lie exactly on an integer position to be regarded as lying on the integer value. In some systems in which the method is implemented, the exact position of a segment cannot be determined. Consider the segment $(0, 0) \rightarrow (3, 9)$, which has a slope of 9/3 or 3/1. The equation for the segment is $y=3/1*x$, and accordingly $x=1/3*y$. Exact integer crossings occur when y is a multiple of 3 or is 0. However, a computer renderer may use a less precise slope, for example 0.33. Then the x crossing position for the segment on scanline 3 would be calculated as 0.99. If a rendering system is able to track the exact position of a segment with guarantee of no overflow or loss of precision, or to determine when a segment passes through an exact integer position, then the alternative simplified method may be used to track and pixelise the segment. The following rules may be used if the exact position of a segment can be determined, in particular if it can be determined that segment passes through a scanline at an integer position. It is no longer necessary to calculate a shifted version of entire segments, but instead a shift is performed only for those crossings that pass through integer points, in the circumstances described in the following rules.

No Rotation (i.e. the Reference Pixelization Rule):
  Apply the y ceiling rounding rule to determine first and last scanline on which x crossings are to be determined.
  Apply the x ceiling rounding rule to the segment on the set of scanlines determined in the previous step.

90 Degrees Rotation:
  Apply the y ceiling rounding rule to determine the first and last scanline on which x crossings are to be determined.
  If the segment has a negative slope and the current x position is an exact integer position, then take floor(x)−1, otherwise take floor(x) to determine the edge position.

180 Degrees Rotation:
  Apply the y floor rounding rule to determine the first and last scanline on which x crossings are to be determined.
  Apply the x floor rounding rule to the segment on the set of scanlines determined in the previous step.

270 Degrees Rotation:
  Apply the y floor rounding rule to determine the first and last scanline on which x crossings are to be determined.
  If the segment has a negative slope and the current x position is an exact integer position, then take ceiling(x)+1, otherwise take ceiling(x) to determine the edge position.

Figure 23:
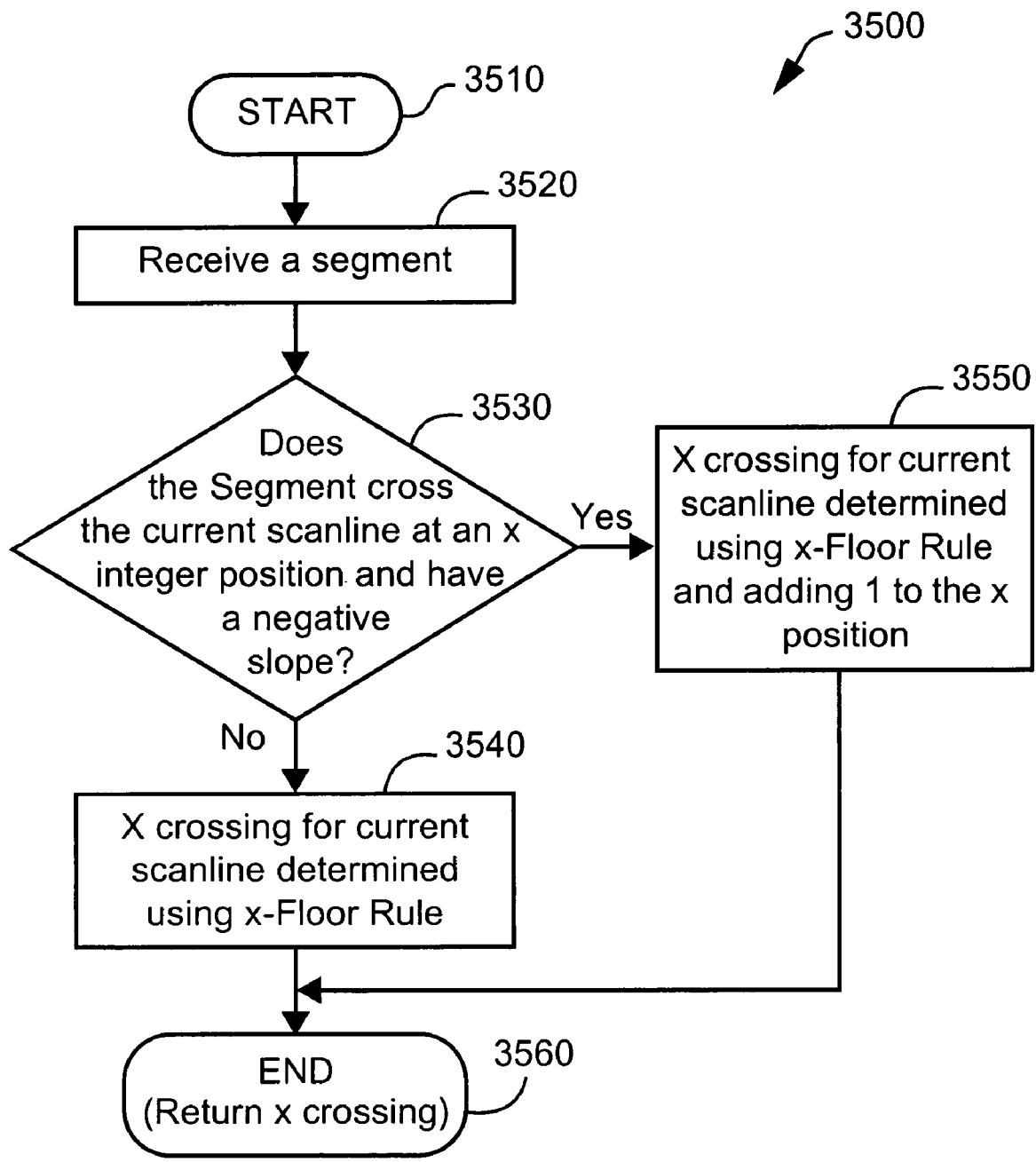
FIG. 23 shows a flow diagram of a further method for determining the integer x-crossing value for the current scanline for objects that have been rotated by 90 degrees.

FIG. 23 shows a method 3500 which is used to determine an x crossing for the current scanline, using the simplified method, from the segment of an object that has been rotated 90 degrees. The method of FIG. 23 is used in conjunction with the method of FIG. 15.

The method 3500 starts at step 3510, after which step 3520 is carried out. At step 3520 a segment is received from step 1935 of method 1900. The method 3500 then proceeds to step 3530. At step 3530, the method 3500 determines if the current segment crosses the scanline at an x integer position and has a negative slope. If so, the method 3500 proceeds to step 3550, otherwise the method 3500 proceeds to step 3540.

At step 3550, the x floor rule is used to determine an x crossing point, from which one is subtracted to determine the x crossing position for the edge at the current scanline. Once the x crossing position has been determined, the method 3500 then proceeds to step 3560.

At step 3540, the x floor rule is used to determine the x crossing position for the edge at the current scanline. The method 3500 then proceeds to step 3560, in which the x crossing is returned to the step 1935 of the method 1900.

Figure 24:
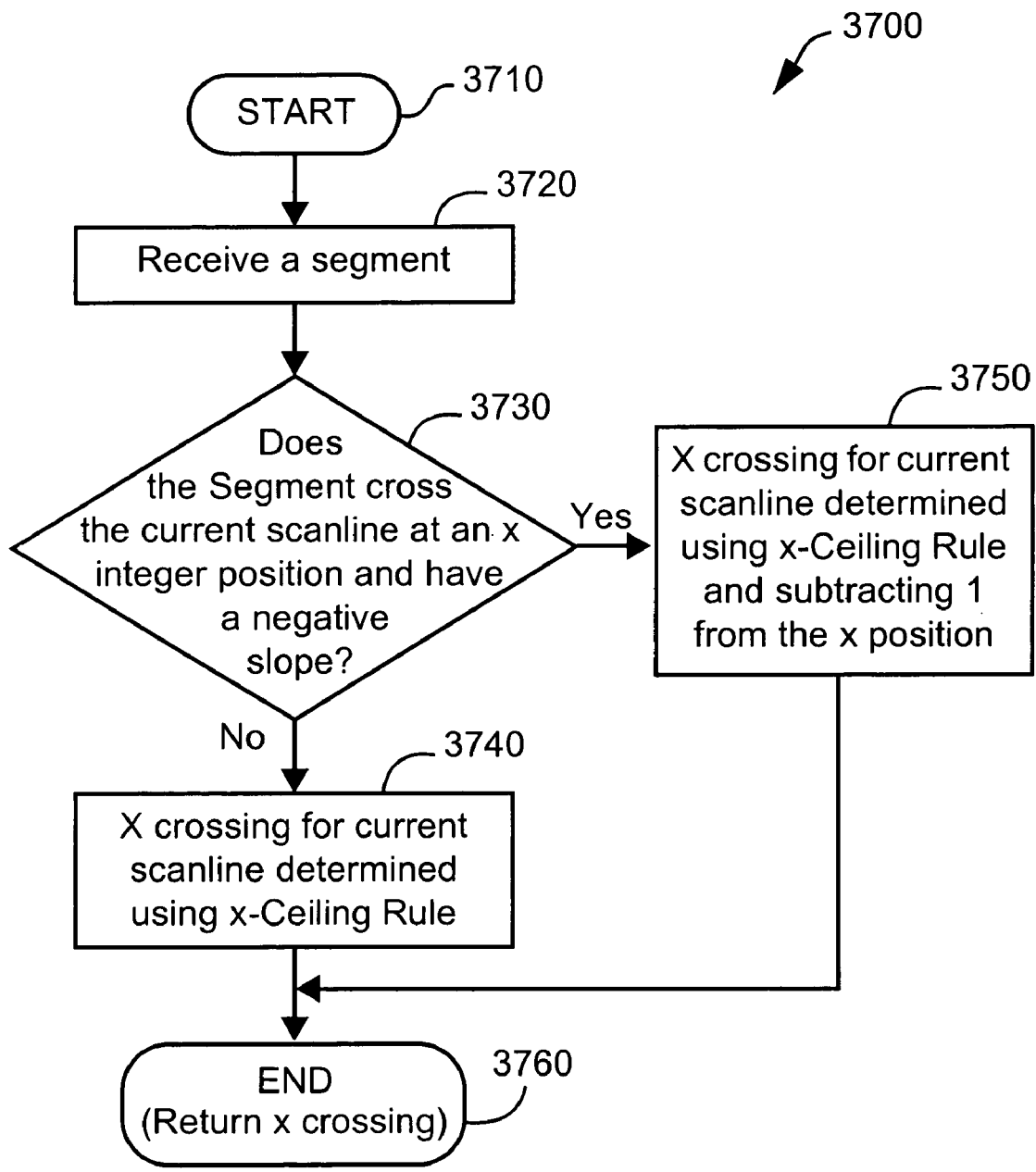
FIG. 24 shows a flow diagram of a further method for determining the integer x-crossing value for the current scanline for objects that have been rotated by 270 degrees.

FIG. 24 shows a method 3700 which is used to determine an x crossing for the current scanline, using the simplified method, from the segment of an object that has been rotated 270 degrees. The method of FIG. 24 is used in conjunction with the method of FIG. 15.

The method 3700 starts at step 3710, after which step 3720 is carried out. At step 3720 a segment is received from step 1935 of method 1900. The method 3700 then proceeds to step 3730. At step 3730, the method 3700 determines if the current segment crosses the scanline at an x integer position and has a negative slope. If so, the method 3700 proceeds to step 3750, otherwise the method 3700 proceeds to step 3740.

At step 3750, the x ceiling rule is used to determine an x crossing point, to which one is added to determine the x crossing position for the edge at the current scanline. Once the x crossing point has been determined, the method 3700 proceeds to step 3760. At step 3740, the x ceiling rule is used to determine the x crossing position for the edge at the current scanline. The method 3700 then proceeds to step 3760, in which the x crossing is returned to step 1935 of the method 1900.

The aforementioned methods comprise particular control flows. There are many other variants of the method which use different control flows without departing the spirit or scope of the invention. Furthermore one or more of the steps of the methods may be performed in parallel rather than sequentially.

The foregoing describes only some embodiments of the present invention, and modifications and/or changes can be made thereto without departing from the scope and spirit of the invention, the embodiments being illustrative and not restrictive.

For example, the described methods may easily be modified to:

be realized in hardware or software;

used to determine the highest shifting accuracy needed for any particular page, before the page is to be rendered;

Apply the rules at any point in the rendering pipeline; and

Modify the rules for the case that the reference rounding rule is a floor rounding rule.

The methods of the present disclosure have the advantage of minimizing the amount of work required to rotate an object. There is no need, using the described methods, to produce a bitmap, or a discrete outline, to produce an accurately rendered object that has a rotation invariant boundary.

The methods of the present disclosure determine the precision of the shift needed at render time, such that different segment lengths and different resolutions can be handled at the most efficient precision.

APPENDIX A

Tables Illustrating the Example of FIGS. 14A-C

TABLE 1

|  | Unrotated | | | |
|---|---|---|---|---|
|  | Line | | | |
|  | L1 | L2 | L3 | L4 |
| Starting Position | (0, 1) | (5, 1) | (10, 1) | (6, 5) |
| First Scanline Crossing Calculation (Ceiling (y)) | 1 | 1 | 1 | 5 |
| Ending Position | (2, 5) | (3, 5) | (6, 3) | (10, 7) |
| Last Scanline Crossing Calculation (Ceiling (y) − 1) | 4 | 4 | 2 | 6 |
| Scanline Crossing Points | (0, 1) (0.5, 2) (1.0, 3) (1.5, 4) | (5.0, 1) (4.5, 2) (4.0, 3) (3.5, 4) | (10, 1) (8, 2) | (6, 5) (8, 6) |
| Resulting Vertical Pixedges (Ceiling (x)) | (0, 1) => (0, 2) (1, 2) => (1, 3) (1, 3) => (1, 4) (2, 4) => (2, 5) | (5, 1) => (5, 2) (5, 2) => (5, 3) (4, 3) => (4, 4) (4, 4) => (4, 5) | (10, 1) => 10, 2) (8, 2) => (8, 3) | (6, 5) => (6, 6) (8, 6) => (8, 7) |

TABLE 2

|  | 90 Degrees Rotation | | | |
|---|---|---|---|---|
| Original Line | L1-90 | L2-90 | L3-90 | L4-90 |
| Shifted Line | L1-90S | — | — | L4-90S |
| Starting Position | (7 − delta_x, 0) | (3, 3) | (5, 6) | (3 − delta_x, 6) |
| First Scanline Crossing Calculation (Ceiling (y)) | 0 | 3 | 6 | 6 |
| Ending Position | (3 − delta_x, 2) | (7, 5) | (7, 10) | (1 − delta_x, 10) |
| Last Scanline Crossing Calculation (Ceiling (y) − 1) | 1 | 4 | 9 | 9 |
| Scanline Crossing Points | (7 − delta_x, 0) (5 − delta_x, 1) | (3, 3) (5, 4) | (5, 6) (5.5, 7) (6, 8) (6.5, 9) | (3 − delta_x, 6) (3.5 − delta_x, 7) (2 − delta_x, 8) (2.5 − delta_x, 9) |
| Resulting Vertical Pixedges (floor (x)) | (6, 0) => (6, 1) (4, 1) => (4, 2) | (3, 3) => (3, 4) (5, 4) => (5, 5) | (5, 6) => (5, 7) (5, 7) => (5, 8) (6, 8) => (6, 9) (6, 9) => (6, 10) | (2, 6) => (2, 7) (2, 7) => (2, 8) (1, 8) => (1, 9) (1, 9) => (1, 10) |

TABLE 3

180 Degrees Rotation

| | | | | |
|---|---|---|---|---|
| Original Line | L1-180 | L2-180 | L3-180 | L4-180 |
| Shifted Line | L1-180S | L2-180S | L3-180S | L4-180S |
| Starting Position | (8, 2) | (7, 2) | (4, 4) | (0, 0) |
| First Scanline Crossing Calculation (floor (y) + 1) | 3 | 3 | 5 | 1 |
| Ending Position | (10, 6) | (5, 6) | (0, 6) | (4, 2) |
| Last Scanline Crossing Calculation (floor (y)) | 6 | 6 | 6 | 2 |
| Scanline Crossing Points | (8.5, 3)<br>(9, 4)<br>(9.5, 5)<br>(10, 6) | (6.5, 3)<br>(6, 4)<br>(5.5, 5)<br>(5, 6) | (2, 5)<br>(0, 6) | (2, 1)<br>(4, 2) |
| Resulting Vertical Segments (floor (x)) | (8, 3) => (8, 4)<br>(9, 4) => (9, 5)<br>(9, 5) => (9, 6)<br>(10, 6) => (10, 7) | (6, 3) => (6, 4)<br>(6, 4) => (6, 5)<br>(5, 5) => (5, 6)<br>(5, 6) => (5, 7) | (2, 5) => (2, 6)<br>(0, 6) => (0, 7) | (2, 1) => (2, 2)<br>(4, 2) => (4, 3) |

TABLE 4

270 Degrees Rotation

| | | | | |
|---|---|---|---|---|
| Original Line | L1-270 | L2-270 | L3-270 | L4-270 |
| Shifted Line | L1-270S | L2-270S | L3-270S | L4-270S |
| Starting Position | (5 + delta_x, 7) | (1, 4) | (1, −1) | (7 + delta_x, −1) |
| First Scanline Crossing Calculation (floor (y) + 1) | 8 | 5 | 0 | 0 |
| Ending Position | (1 + delta_x, 9) | (5, 6) | (3, 3) | (5 + delta_x, 3) |
| Last Scanline Crossing Calculation (floor (y)) | 9 | 6 | 3 | 3 |
| Scanline Crossing Points | (3 + delta_x, 8)<br>(1 + delta_x, 9) | (3, 5)<br>(5, 6) | (1.5, 0)<br>(2, 1)<br>(2.5, 2)<br>(3, 3) | (6.5 + delta_x, 0)<br>(6 + delta_x, 1)<br>(5.5 + delta_x, 2)<br>(5 + delta_x, 3) |
| Resulting Vertical Segments (Ceiling (x)) | (4, 8) => (4, 9)<br>(2, 10) => (2, 10) | (3, 5) => (3, 6)<br>(5, 6) => (5, 7) | (2, 0) => (2, 1)<br>(2, 1) => (2, 2)<br>(3, 2) => (3, 3)<br>(3, 3) => (3, 4) | (7, 0) => (7, 1)<br>(7, 1) => (7, 2)<br>(6, 2) => (6, 3)<br>(6, 3) => (6, 4) |

I claim:

1. A method of determining a discrete boundary for an object to be rendered into a raster pixel image having a plurality of scanlines, the method comprising:
   using a processor to perform the steps of:
   receiving the object for rendering;
   rotating the object by a predetermined amount;
   decomposing an outline of the rotated object into line segments;
   determining, for each scanline to be rendered, points of intersection between the line segments and the scanline; and
   rounding each point of intersection to an adjacent position selected from a finite set of positions on the scanline using a rule chosen according to the amount of rotation, wherein the rounded points of intersection delimit the discrete boundary of the rotated object.

2. A method according to claim 1, wherein the predetermined amount is an integer multiple of 90 degrees.

3. A method according to claim 2 wherein said predetermined amount is an odd multiple of 90 degrees and said method includes, before said rounding step, the steps of:
   identifying points of intersection that satisfy a predetermined criterion; and
   shifting the identified points of intersection.

4. A method according to claim 3 wherein an x-axis indicates a direction along a scanline and an orthogonal y-axis indicates a direction across scanlines and, for an unrotated object, the discrete boundary is determined using a y-ceiling rule and an x-ceiling rule, and wherein the predetermined criterion is satisfied if:
   the line segment on which the intersection point lies has a negative slope; and
   the intersection point is at an integer x-position.

5. A method according to claim 4 wherein, if the predetermined amount of rotation is 90 degrees, said shifting step shifts the identified points of intersection by minus one pixel location in the x direction, and said rounding step uses an x-floor rounding rule to round the points of intersection.

6. A method according to claim 4 wherein, if the predetermined amount of rotation is 270 degrees, said shifting step shifts the identified points of intersection by one pixel location in the x-direction, and said rounding step uses an x-ceiling rounding rule to round the points of intersection.

7. A method according to claim 3 wherein said shifting step shifts at least one identified intersection point in the x-direction a distance less than or equal to:

$$\text{delta}\_x = 1/(2^B D_y),$$

where an x-axis indicates a direction along a scanline; an orthogonal y-axis indicates a direction across scanlines; each line segment has a start point and an end point represented as fixed-point numbers; B is a number of bits used to represent the fractional part of the fixed-point numbers; and Dy is the difference between a y-value of the end point of a line segment on which the identified intersection point lies and a y-value of the start point of the line segment.

8. A method according to claim 7 wherein, for an unrotated object, the discrete boundary is determined using a y-ceiling rule and an x-ceiling rule, and wherein the predetermined criterion is whether the line segment on which the point of intersection lies has a negative slope such that the x-value of the line segment decreases as the y-value increases.

9. A method according to claim 8 wherein, if the predetermined amount of rotation is 90 degrees, said shifting step shifts the identified points of intersection by less than or equal to (−1)*delta_x, and said rounding step uses an x-floor rounding rule to round the points of intersection.

10. A method according to claim 8 wherein, if the predetermined amount of rotation is 270 degrees, said shifting step shifts the identified points of intersection by less than or equal to delta_x, and said rounding step uses an x-ceiling rounding rule to round the points of intersection.

11. A method according to claim 1 further comprising the steps of:
identifying line segments that become active on or before a first scanline of a region to be rendered;
calculating intersections of the identified line segments with the first scanline of the region using linear equations of the line segments.

12. A method according to claim 1, further comprising the steps of:
grouping line segments of the same type that are active on a current scanline; and
calling, at the end of the current scanline, an update function for each group of line segments to update the position of the active line segments for a following scanline.

13. A method of determining a discrete boundary for an object to be rendered into a raster pixel image having a plurality of scanlines, the method comprising:
using a processor to perform the steps of:
receiving the object for rendering;
rotating the object by a predetermined amount;
decomposing an outline of the rotated object into line segments, wherein each line segment has a start point and an end point;
shifting line segments that satisfy a predetermined criterion by a distance less than or equal to a value dependent on a difference between the end point and the start point of the line segment and on a precision with which the line segment is represented;
determining, for each scanline to be rendered, points of intersection between the line segments and the scanline; and
rounding the points of intersection to an adjacent position selected from a finite set of positions on the scanline using a rule chosen according to the amount of rotation, wherein the rounded points of intersection delimit the discrete boundary of the rotated object.

14. A method of determining a discrete boundary for an object to be rendered into a raster pixel image having a plurality of scanlines, the method comprising:
using a processor to perform the steps of:
receiving the object for rendering; rotating the object by a predetermined amount; decomposing an outline of the rotated object into line segments;
determining, for each scanline to be rendered, points of intersection between the line segments and the scanline;
identifying points of intersection that lie on integer values along the scanline;
shifting the identified points of intersection if the identified points of intersection lie on line segments having a negative slope; and
rounding each point of intersection to an adjacent integer position on the scanline using a rule chosen according to the amount of rotation, wherein the rounded points of intersection delimit the discrete boundary of the rotated object.

15. An apparatus for determining a discrete boundary for an object to be rendered into a raster pixel image having a plurality of scanlines, the apparatus comprising:
means for receiving the object for rendering, wherein the object is stored in a memory;
means for rotating the object by a predetermined amount;
means for decomposing an outline of the rotated object into line segments;
means for determining, for each scanline to be rendered, points of intersection between the line segments and the scanline; and
means for rounding each point of intersection to an adjacent position selected from a finite set of positions on the scanline using a rule chosen according to the amount of rotation, wherein the rounded points of intersection delimit the discrete boundary of the rotated object.

16. An apparatus for determining a discrete boundary for an object to be rendered into a raster pixel image having a plurality of scanlines, the apparatus comprising:
means for receiving the object for rendering, wherein the object is stored in a memory;
means for rotating the object by a predetermined amount;
means for decomposing an outline of the rotated object into line segments, wherein each line segment has a start point and an end point;
means for shifting line segments having a negative slope, wherein the line segment is shifted by a distance less than or equal to a value dependent on a difference between the end point and the start point of the line segment and on a precision with which the line segment is represented;
means for determining, for each scanline to be rendered, points of intersection between the line segments and the scanline; and
means for rounding the points of intersection to an adjacent position selected from a finite set of positions on the scanline using a rule chosen according to the amount of rotation,
wherein the rounded points of intersection delimit the discrete boundary of the rotated object.

17. An apparatus for determining a discrete boundary for an object to be rendered into a raster pixel image having a plurality of scanlines, the apparatus comprising:
- means for receiving the object for rendering, wherein the object is stored in a memory;
- means for rotating the object by a predetermined amount;
- means for decomposing an outline of the rotated object into line segments;
- means for determining, for each scanline to be rendered, points of intersection between the line segments and the scanline;
- means for identifying points of intersection that lie on integer values along the scanline;
- means for shifting the identified points of intersection if the identified points of intersection lie on line segments having a negative slope; and
- means for rounding each point of intersection to an adjacent integer position on the scanline using a rule chosen according to the amount of rotation, wherein the rounded points of intersection delimit the discrete boundary of the rotated object.

18. A computer-readable recording medium storing a computer program product comprising machine-readable program code, for controlling the operation of a data processing apparatus on which the program code executes to perform a method of determining a discrete boundary for an object to be rendered into a raster pixel image having a plurality of scanlines, the method comprising the steps of:
- receiving the object for rendering;
- rotating the object by a predetermined amount;
- decomposing an outline of the rotated object into line segments;
- determining, for each scanline to be rendered, points of intersection between the line segments and the scanline; and
- rounding each point of intersection to an adjacent position selected from a finite set of positions on the scanline using a rule chosen according to the amount of rotation, wherein the rounded points of intersection delimit the discrete boundary of the rotated object.

19. A computer-readable recording medium storing a computer program product comprising machine-readable program code, for controlling the operation of a data processing apparatus on which the program code executes to perform a method of determining a discrete boundary for an object to be rendered into a raster pixel image having a plurality of scanlines, the method comprising the steps of:
- receiving the object for rendering;
- rotating the object by a predetermined amount;
- decomposing an outline of the rotated object into line segments, wherein each line segment has a start point and an end point;
- shifting line segments that satisfy a predetermined criterion by a distance less than or equal to a value dependent on a difference between the end point and the start point of the line segment and on a precision with which the line segment is represented; and
- determining, for each scanline to be rendered, points of intersection between the line segments and the scanline; and
- rounding the points of intersection to an adjacent position selected from a finite set of positions on the scanline using a rule chosen according to the amount of rotation, wherein the rounded points of intersection delimit the discrete boundary of the rotated object.

20. A computer-readable recording medium storing a computer program product comprising machine-readable program code, for controlling the operation of a data processing apparatus on which the program code executes to perform a method of determining a discrete boundary for an object to be rendered into a raster pixel image having a plurality of scanlines, the method comprising the steps of:
- receiving the object for rendering;
- rotating the object by a predetermined amount;
- decomposing an outline of the rotated object into line segments;
- determining, for each scanline to be rendered, points of intersection between the line segments and the scanline;
- identifying points of intersection that lie on integer values along the scanline;
- shifting the identified points of intersection if the identified points of intersection lie on line segments having a negative slope; and
- rounding each point of intersection to an adjacent integer position on the scanline using a rule chosen according to the amount of rotation, wherein the rounded points of intersection delimit the discrete boundary of the rotated object.

21. A system for determining a discrete boundary for an object to be rendered into a raster pixel image having a plurality of scanlines, the system comprising:
- a data storage that stores information about the object, wherein the information has a predetermined precision; and
- a processor in communication with said data storage and programmed to:
- rotate the object by a predetermined amount;
- decompose an outline of the rotated object into line segments having a start point and an end point and being represented at the predetermined precision;
- shift line segments that satisfy a predetermined criterion by a distance less than or equal to a value dependent on a difference between the end point and the start point of the line segment and on the predetermined precision; and
- determine, for each scanline to be rendered, points of intersection between the line segments and the scanline, wherein the points of intersection are rounded to an adjacent position selected from a finite set of positions on the scanline using a rule chosen according to the amount of rotation, and wherein the rounded points of intersection delimit the discrete boundary of the rotated object.

* * * * *